United States Patent
Williams et al.

(10) Patent No.: US 6,202,096 B1
(45) Date of Patent: Mar. 13, 2001

(54) METHOD AND APPARATUS FOR DEVICE INTERACTION BY PROTOCOL

(75) Inventors: Peter Michael Williams, Portishead (GB); Patrick Simon Arnold, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/059,867

(22) Filed: Apr. 14, 1998

Related U.S. Application Data

(60) Provisional application No. 60/054,047, filed on Jul. 18, 1997.

(30) Foreign Application Priority Data

Apr. 15, 1997 (GB) .................................................. 9707551

(51) Int. Cl.$^7$ .................................................. G06F 15/16
(52) U.S. Cl. .................................................. 709/230; 709/227
(58) Field of Search .................................................. 709/203, 227, 709/220, 230, 204, 224, 229

(56) References Cited

U.S. PATENT DOCUMENTS

| | | | | |
|---|---|---|---|---|
| 5,123,063 | * | 6/1992 | Ohkubo ............................... | 382/318 |
| 5,537,417 | * | 7/1996 | Sharma et al. ....................... | 709/228 |
| 5,577,172 | * | 11/1996 | Vatland et al. ....................... | 395/114 |
| 5,636,333 | * | 6/1997 | Davidson, Jr. et al. .............. | 395/114 |
| 5,647,056 | * | 7/1997 | Barrett et al. ........................ | 709/220 |
| 5,674,003 | * | 10/1997 | Andersen et al. .................... | 709/228 |
| 5,710,908 | * | 1/1998 | Man ....................................... | 709/230 |
| 5,720,013 | * | 2/1998 | Uda et al. ............................. | 395/114 |
| 5,760,775 | * | 6/1998 | Sklut et al. ........................... | 345/349 |
| 5,768,483 | * | 6/1998 | Maniwa et al. ...................... | 395/114 |
| 5,784,622 | * | 7/1998 | Kalwitz et al. ...................... | 710/200 |
| 5,787,237 | * | 7/1998 | Reilly .................................... | 395/112 |
| 5,818,603 | * | 10/1998 | Motoyama ............................ | 358/296 |
| 5,826,027 | * | 10/1998 | Pedersen et al. .................... | 709/221 |
| 5,909,183 | * | 6/1999 | Borgstahl et al. .............. | 340/825.22 |
| 5,996,029 | * | 11/1999 | Sugiyama et al. ................... | 710/15 |

OTHER PUBLICATIONS

Peter Williams, "Surface Interaction: A Paradigm for Object Communication," Building Interactive Systems: Architecture and Tools, Springer–Verlag, New York, 1992, pp. 23–34.

* cited by examiner

*Primary Examiner*—Kevin J. Teska
*Assistant Examiner*—William D. Thomson

(57) ABSTRACT

There is provided a method of passing information between two or more information handling devices, such as a printer, a personal computer or a scanner. There exists a means for communication of information such as network with network connection means between the information handling devices. Each passage of information consists of one or more interactions from an interaction set, none of the interactions of the interaction set being dependent on the function to be carried out on the information by any of the information handling devices. This is particularly advantageous where each passage of information relates to sharing of a surface between a first device and one or more second devices, wherein the surface is a representation of an internal state of the first device. Preferably, each surface comprises data and a set of formats in which the data can be provided by the first device, and further comprises a property set, the property set defining to which interactions of the set of interactions the first device is adapted to respond.

4 Claims, 37 Drawing Sheets

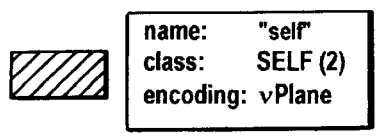
*Fig. 15*
| | Sender | Receiver | |
|---|---|---|---|
| 1 | | ← SurfaceMsg (id1, "in", class:IN, ...) | |
| 2 | | [← SurfaceRequestMsg (...,target:id1)] | This message only applies to a pull mode job. |
| 3 | SurfaceMsg (id2, ..., target:id1) → | | |
| 4 | | ← SurfaceRequestMsg ("...", req1) | |
| 5 | SurfaceMsg (id3, ... ,req1) → | | |
| 6 | | ← ContentRequestMsg (id3, ...,req2) | |
| 7 | ContentReplyMsg (req2, ...) → | | |
| | ContentReplyMsg(req2, ...) → | | |
| 8 | | ← SurfaceReleaseMsg (id3) | |
| 9 | | ← SurfaceReleaseMsg (id2) | |
*Fig. 16*
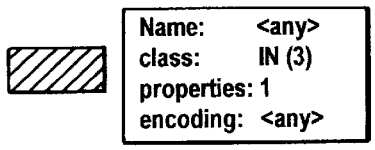
*Fig. 17*
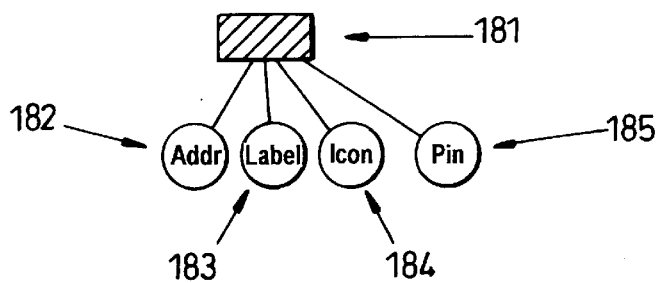
*Fig. 18*

METHOD AND APPARATUS FOR DEVICE INTERACTION BY PROTOCOL

This application claims benefit of provisional application Ser. No. 60/054,047 filed Jul. 18, 1997.

The present invention relates to methods and apparatus for device interaction, in particular for passing of information between devices.

The requirement for efficient and successful passage of information between devices is pervasive. For communication between electronic appliances, such as a scanner and a printer, a storage device and a viewing device, or a camcorder and a television set, an application specific protocol is required. In the first two cases, it will also be normal that a computing device such as a personal computer mediates communication. A personal computer requires device specific drivers for each electronic appliance (normally those considered as "peripherals" for a personal computer) to allow this communication to occur.

In the physical world, interaction with physical devices does not require special protocols. A small set of generic instructions are used, and the effect of these interactions is determined by the device interacted with. For example, the interaction of a user with a telephone and a photocopier is (typically) essentially the same: the pressing of a series of buttons. In the telephone, this results in the establishment of a connection with a remote telephone and an open communication channel, whereas in the photocopier the result is the reproduction of a number of images. In each case, the fundamental interaction (pressing buttons) is the same, but the result is very different.

The present invention seeks to achieve the passing of information between devices with the same ease and effectiveness as is achieved in the physical world. In particular, the present invention seeks to enable rich and effective communication to be achieved with generic instructions.

Accordingly, the invention in a first aspect provides a method of passing information between two or more information handling devices, there being a means for communication of information between said information handling devices, wherein each passage of information consists of one or more interactions from an interaction set, none of the interactions of the interaction set being dependent on the function to be carried out on the information by any of the information handling devices.

This is particularly advantageous where each passage of information relates to sharing of a surface between a first device and one or more second devices, wherein the surface is a representation of an internal state of the first device. Preferably, each surface comprises data and a set of formats in which the data can be provided by the first device, and further comprises a property set, the property set defining to which interactions of the set of interactions the first device is adapted to respond.

Preferably, the interaction set comprises interactions relating to transfer of content between a surface in a first device and the corresponding surface in one or more second devices and interactions relating to deletion or modification of surfaces in one or more second devices corresponding to a surface in a first device.

An advantageous development is for each device to possess a surface designated as an identity surface, wherein the identity surface contains information about that device, and wherein means are provided to enable exchange of this surface with other devices when information exchange sessions are established between devices. It is advantageous in this context for specific devices comprise directory means for storage of information from identity surfaces of other devices.

It is also of benefit if job receiving devices capable of processing information according to a device function possess a job receiving surface designated for receiving information for processing from a job sending device. Also beneficial is the possibility that a job receiving device capable of processing information according to a device function possesses a status indicating surface, and is adapted to share the status indicating surface with any other device capable of sending a job to that job receiving device.

In a second aspect, the invention provides a protocol for communication between information handling devices, said protocol comprising interactions from an interaction set, none of the interactions of the interaction set being dependent on a function to be carried out on the information by any of the information handling devices.

Application of the invention enables device independent information exchange. The protocol allows two devices to connect, exchange information, negotiate data types, provide status about their operation, and so on. The invention is also readily implementable to provide a platform independent protocol, and can thus be built into any device which has a potential need to connect to other devices regardless of its function. This could extend from obvious communication and rendering appliances (such as fax machines, printers, whiteboards) through to domestic appliances such as thermostats, washing machines and toasters. The present invention also provides a protocol not dependent on transport type for its application, and can be built upon essentially any bidirectional transport. Embodiments of the invention can employ a single protocol for communication between any appliance, and it is guaranteed in such cases that devices able to handle the same type of information can pass information of some form.

Appropriate use of the invention allows guaranteed exchange of information with existing and future devices. It is also possible for devices to communicate even if they have no knowledge of each other—no element of preprogramming is required, as is the case for host-peripheral environments. Further advantages are that system components can be developed separately (for example, a printer can be developed without consideration of creation of drivers for a personal computer). Moreover, preferred application of the invention is such that product features are defined by the developer, not the protocol: the protocol is merely a pipe through which information is exchanged and has no knowledge of devices or implementations.

Specific embodiments of the invention will be described below, by way of example, with reference to the accompanying drawings, of which:

FIG. 15 shows a graphical representation of a self-surface as an example of a well-known surface;

FIG. 16 shows a sample document transmission according to the job policy;

FIG. 17 shows a graphical representation of a well-known surface;

FIG. 18 shows the structure of a generic self-surface;

The present invention is embodied in the JetSend architecture of Hewlett-Packard Company. An introduction to this architecture is provided on the World Wide Web at http://www.jetsend.hp.com/, and a full description is provided in the HP JetSend Communications Technology Protocol Specification, available from Hewlett-Packard Company and incorporated herein by reference.

The basic elements of the JetSend architecture will be discussed below. The individual elements will then be discussed individually in greater detail to the extent necessary to illustrate the invention and advantageous features thereof. Reference to preferred and required features below relates to preferred and required features of the JetSend architecture, rather than to preferred and required features of the invention itself.

Fundamental to the JetSend architecture are four principles which define how the system operates. These are as follows:

Peer to peer interaction—When network transport allows it, devices must be able to address other devices directly. Devices should not require the presence of a PC or any other intermediary device to enable an information exchange between two non-PC devices. Users can thus connect with a minimum configuration and can perform ad hoc information transfers.

Device and Device Type Independence—No device specific information about other devices should be preprogrammed into any device. A device should not be required to behave differently for a specific device or set of devices it may encounter. In the JetSend architecture, a device can perform generic operations, such as sending information or observing status, which do not in themselves have any device specific aspect. This allows any two JetSend enabled devices to interact without using drivers that are specific to a device or device type.

Negotiation—Devices are to negotiate data encodings to the highest common denominator that the sender and receiver support. There must be a default encoding for each data type that all senders and receivers using that data type must support. The ability to negotiate ensures that devices can implement high end and even proprietary data types, while the default encoding ensures that meaningful data exchange will always take place. Negotiation should be flexible and open ended.

Consistency—The same protocol is used regardless of whether the devices are exchanging control, transferring data, exchanging status information or passing any other form of information.

Figure 34:
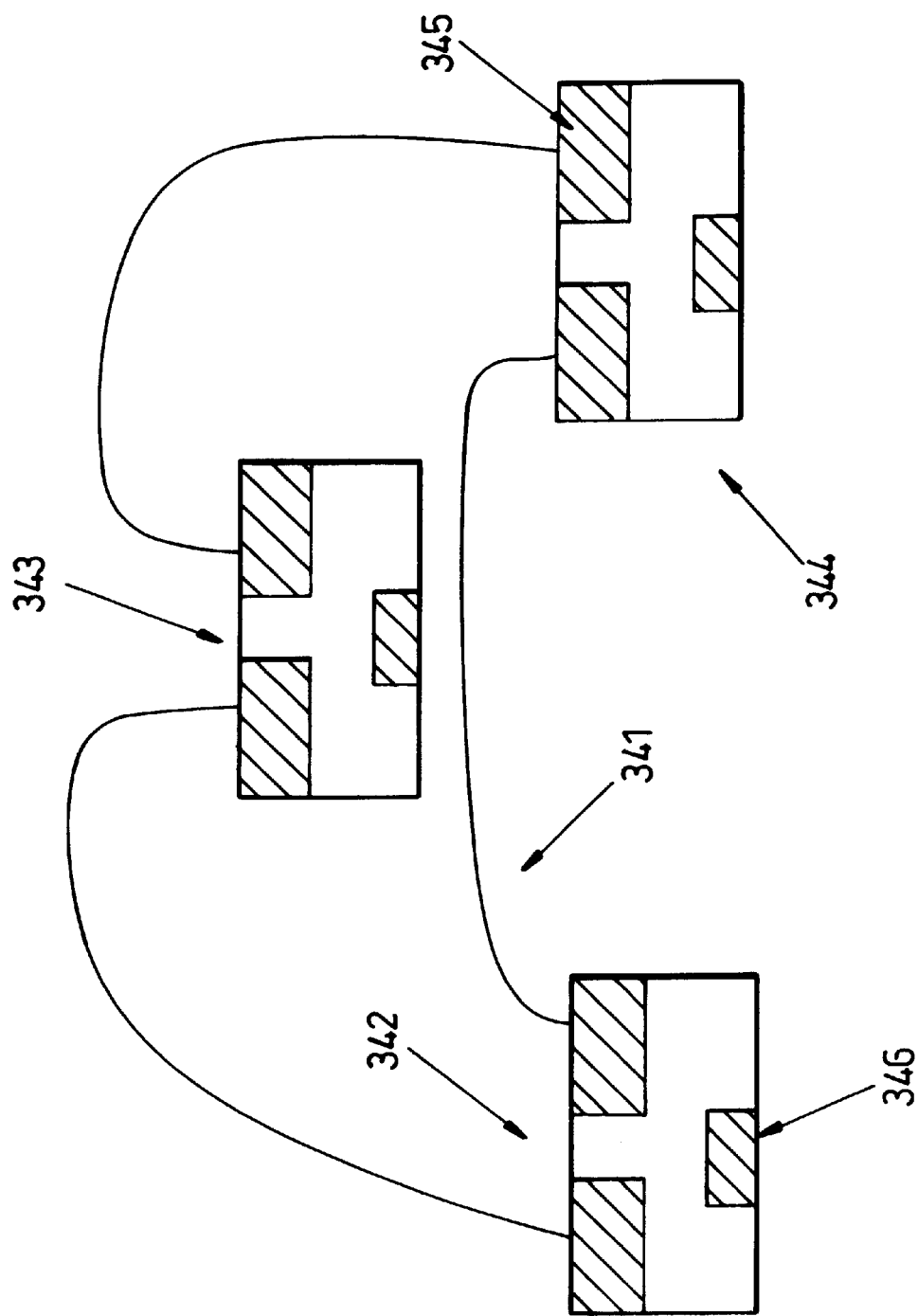
FIG. 34 illustrates communication between devices to which the present invention is applicable.

FIG. 34 illustrates the environment in which JetSend devices operate. A network 341 of some kind exists between devices such as a printer 342, a personal computer 343, and a scanner 344. Each of these devices must possess a processor 346 of some kind, together of course with a connection means 345 to allow interface with the network 341. It is necessary in this implementation for each of the devices to have some measure of processing capacity, as such capacity is necessary for processes integral to JetSend.

The basis for communication between devices in JetSend is the surface interaction model. A surface is a representation of some aspect of internal state possessed by a device. The representation is universal, and is not determined by the functions performed by the device. A surface in this context is analagous to the surface provided by a physical object (such as a telephone, or a brick). The way in which the object operates is determined by how the "functional" parts of the object connect to the surface, but the surface itself can be described in a simple universal way, irrespective of function, and provides the medium through which the object is connectable to other physical objects in the world—the nature of the connection between physical objects being independent of any device function. In JetSend, the surface is the fundamental unit of information exchange, and images, documents, status messages, device labels and the like are all transferred through use of one or more surfaces. A surface consists of a number of elements: description, content, properties and class—these will be discussed further below.

The surface interaction model defines mechanisms for creating, sharing, modifying and deleting surfaces. Only a fixed number of generic operations can be performed on a surface, using the messages defined by the JetSend Interaction Protocol (JIP), which will be discussed further below.

The original copy of a surface is here termed an expression. There is one expression involved in any surface interaction. Devices that have information to share with other devices create one or more expressions to represent that information.

Surface expressions can be impressed on other devices. This creates an impression of that surface—also known as sharing the surface. Impressions are copies of other device's expressions, and connections are maintained between the devices to ensure that impressions are up-to-date with their corresponding expression. Typically, two devices will share several surfaces at a given time; surfaces that represent the elements of a job, status information from each device, security information, and so forth.

Figure 1:
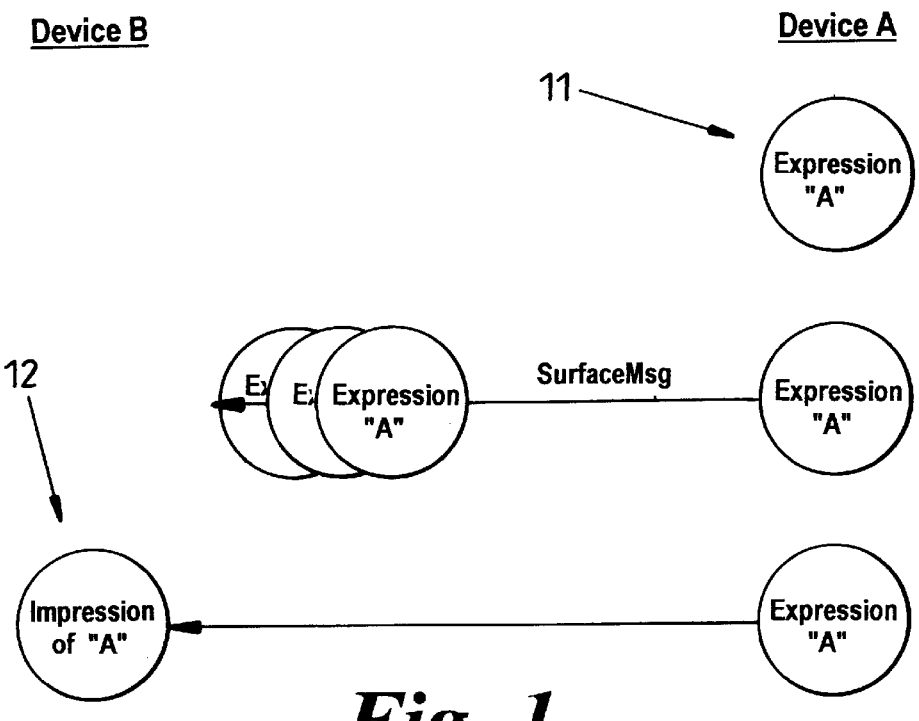
FIG. 1 shows the creation of a surface impression on one device from the surface expression of another.

FIG. 1 shows how an expression 11 on one device (Device A) is shared with another device (Device B), thereby creating a new impression 12. The same expression can be impressed multiple times on multiple devices. This creates multiple impressions of the same surface expression. When the expression changes, or is deleted, all impressions will be notified. This is here termed change propagation.

Change propagation enables interesting dynamic features, such as status information, to be implemented for devices in the architecture. For example, a device with status information creates a surface expression containing a status string which is impressed on a number of connected devices. The device with the status changes the surface depending on its state. All the JetSend devices that have an impression of the status surface will receive update messages with the current status. This functionality is built into the architecture and its use by device designers is optional.

From an implementation standpoint, an expression is defined by the state that is kept about a given surface (its name, its description, its content and the set of impressions that have been made on remote devices). It will be shown later that from a protocol standpoint, an expression is defined by the surface handle used to exchange JIP messages about it.

A surface comprises a description of the surface, and the content contained within the surface. The distinction is fundamental to JetSend and of significance in aspects of the present invention, because it provides a mechanism for content negotiation.

The surface description establishes the full range of possible forms in which information associated with a surface (this information being provided as surface content data) can be shared with another device. The description consists of a data format hierarchy, and can be represented as a tree structure with a number of nodes each representing a definable aspect of the data format (referred to as an attribute, and discussed in greater detail elsewhere). A specific data format for the information associated with the surface is a path through this tree structure from a root node down to a terminal node (a leaf node of the tree). Such specific paths are reached through a process of negotiation. The process of negotiation, in this context, comprises the surface owner sharing the surface description, or a part of the surface description, with another device. The other device then chooses the options it prefers (generally such options will be selected so that the receiving device can use its own functionality in the richest manner available given the choices offered, but this is essentially a matter for the designer of any given device) and this process continues until a specific path, and thus a specific data format, is chosen.

The surface content is the information associated with the surface, and is provided in a format determined by negotiation as indicated above. The content data can be provided in all the formats indicated by the data format hierarchy embodied in the surface description, but for a given surface interaction will generally only be provided in one of the formats available. There does exist the possibility of providing information in more than one format for a single impression: a case where this may prove useful is in retrieval of information from a storage device, where initially, for example, an image may be provided initially as a thumbnail at low resolution, and later, after confirmation that the image is desired, provided at full size and high resolution without change of impression. Request for further content would be normal in such a situation, however. Content data need not exist prior to completion of the negotiation: for some or all of the choices in the data format hierarchy the data may only be generated after the format choice is known. Alternatively, for some choices the content data may be provided directly together with the description identifying a particular point in the data format hierarchy as a part of the negotiation process (so no separate step of provision of content is required for that format choice). This is termed providing content data in-line.

As indicated above, descriptions are sent along with the original surface impression, but in the general case content is requested separately. For example, a surface representing a raster image might define a surface description with choices about color spaces, resolutions, and compressions for the image. The receiver of the impression will request the actual pixel data (the content), specifying a preferred encoding for the receiver from the choices available.

A surface description can also contain references to other surfaces. These surfaces are known as sub-surfaces (or child surfaces) and they must be requested separately from the owner of the parent surface. Each sub-surface contain its own description and content, independent of its parent. A document, for example, can be encoded as multiple surfaces each representing a separate page. The document itself is represented as a surface containing references to these page surfaces.

A document, in this context, has a broader meaning than a collection of pages bound or otherwise held in a single unit. Here, a document is any collection of information held in such a form that it can be provided by one device for processing by another device. In the specific context of JetSend, a document comprises one or more surfaces where each surface is connected to all the other surfaces either directly by a single parent-child relationship or indirectly through a chain of parent-child or child-parent relationships.

A surface reference, or a surface name, is simply an ASCII string—like a URL. All surfaces are identified by their name, and may belong to a particular class. All surfaces possess a class. Class is a property indicating the purpose for which the surface is used: in the present implementation, each surface must have one, and only one, class. Classes of surfaces include the self-surface, in-surface, status-surface and address-surface. Specific rules exist, or may be devised, for use of surfaces of a particular class. Classes are used particularly in the context of specific policies. For example, the job policy employs one particular class of surface, the in-surface, as a means to provide jobs to a job processing device. A printer has an in-surface, and surfaces that are impressed onto the in-surface will be treated as new jobs and printed. A PC, a camera, or some other sending device may be impressing surfaces on to this in-surface. Where a particular class of surface plays a fundamental role in execution of a given policy, surfaces of that class are termed "well-known surfaces" for that policy.

A policy, or interaction policy, is a set of conventions for use of generic surface interactions to achieve a particular task. The advantage of using a policy for a particular task is that it enables all JetSend devices adapted to perform, or require another device to perform, the particular task to interact successfully and in a predictable way with other devices in order to achieve that particular task. This does not exclude the possibility of, for example, a pair of devices adapted to perform such a task in a different way not open to other JetSend devices using a different class of surface to do so. However, it is desirable that such devices still support the relevant JetSend policy so that they can achieve this task with other JetSend devices too.

All surface interaction between two devices are done with the following messages:

SurfaceRequestMsg—request a surface of a particular name (and class)

SurfaceMsg—impress a surface (send its description)

ContentRequestMsg and ContentReplyMsg—transfer surface content

DescriptionRequestMsg and DescriptionReplyMsg—transfer additional description

SurfaceChangeMsg—notify and request changes to a surface

SurfaceReleaseMsg—remove the connection between an impression and its expression The format of these messages and their implementation is described at a later point.

E-material, a term coined as a shortened version of "electronic material", is the form taken by information through which surfaces are expressed and shared. It comprises description and content. The description indicates a hierarchy of choices of format in which the associated content data can be provided. The content is the data associated with the surface itself. The description indicates the ways in which the data can be presented, whereas the content is the information itself, presented in a form chosen to be suitable for the device sending it and the device receiving it. The existence of this choice is key to the concept of e-material, and the mechanism by which this choice is made is discussed further below.

Surface interaction and e-material are at the heart of the JetSend architecture and aspects of the present invention are of particular relevance to the implemented combination of surface interaction and e-material. The two concepts are separate, but closely related. Surface interaction is the protocol for exchanging information encoded as e-material. It is the combination of surfaces and e-material that allow JetSend devices to negotiate data types, and exchange information in a device independent fashion.

E-material is not a file format. E-material defines the format of the data that devices exchange, but it does not define how devices process or store that data. Devices that consume e-material do so on a manner that is specific to that device. For example, a receiving device such as a printer will process e-material differently than a receiving device such as a PC. The PC may put the e-material into some kind of a file format, while the printer may convert it to PCL or PostScript™, and eventually to dots on a page. Likewise, devices that produce e-material will do so in a manner that is specific to that device. The most fundamental division of e-material types is into encodings. An encoding is an e-material representation of a fundamental form in which information can be presented in the world. The idea of a "fundamental form" can be illustrated by the different encodings so far defined.

vText relates to presentation of information in the form of written text. A string of ASCH or Unicode text that fills a rectangular plane (no font or spacing information). The simple text encoding is used mainly for status information, but can be used to mark pages as well. The symbol set is negotiable.

vImage relates to presentation of information in the form of graphical images. The encoding relates to a raster image, for which there is the possibility of negotiating qualities such as color space, pixel depth, resolution, pixel encoding, and compression.

vPlane represents to presentation of information on a planar object, of which the commonest form in life is a sheet of paper—as in real life, vPlane relates to planar objects with two sides. More specifically, this encoding provides a two-dimensional rectangular plane with a background colour, and an ordered "layer" of child elements on its front and back. A page is a plane containing other encodings such as images or text.

vFile relates to presentation of information in the form of a binary file. Binary files include such things as documents in application specific formats, executables, etc. A file name, mime-type and an icon can be associated with the data. The mime-type can be negotiated.

vAssociation relates to presentation of information in the form of an assembly of information presented in one or more formats (which will each be represented by their own encoding). Essentially, an association is an ordered sequence of child elements. A conventional document might be represented as an association of pages.

Further encodings can readily be devised in accordance with the present invention, and will be appropriate for device types and functions not addressed in the existing JetSend specification: for example, voice or sound encodings may be devised to represent information in the form of human voice or sound more generally. It should also be noted that the term "encoding" is used here not only to signify fundamental format types, but also to any specific data format hierarchy (for example, one reached at the end of a particular negotiation process). Such uses of the term "encoding" are however readily distinguishable by context.

For each encoding (vImage, vText etc.) there is defined a single default encoding. This ensures that all devices which are able to exchange data of a particular type (for example, all devices which can represent images in some form—personal computers, printers, scanners, but not a microphone) are able to exchange data in some form. In the case of an image, the base encoding in the present implementation is vImage.vGray.1.(300,300).vRLE: all devices which are capable of using image information can exchange information in this format.

There will generally be a better format available for the exchange of data than the default encoding—which must, of course, be available for use by the devices with the least rich function set. It is nonetheless desirable to have standard formats which will generally be available for exchange by devices of higher functionality. Such encodings are termed base encodings: base encodings will not be supported by all devices, but it would be expected that all devices with sufficiently rich functionality to do so would support exchange of data according to a base encoding.

An attribute is a feature of a piece of e-material that is defined in the e-material description (or defined for the piece of e-material after the completion of the negotiation process). Essentially, each node in the data format hierarchy provided in the e-material description represents an attribute. From this equivalence between nodes and attributes there is derived the concept of an "attribute level": essentially, an attribute level is shared by all nodes equally distant from the root node of the data format hierarchy. Attributes comprise a quality that can be provided for the e-material content, and a choice or value for that quality: this can range from the size in which an image is provided, or the language in which text is provided, to somewhat less tangible qualities (such as the order in which elements are rendered on a plane), and the choice or value may itself represent a further attribute (a quality requiring a choice or value). The quality itself is represented by an attribute name (sometimes shortened to "attribute" in this description), whereas the choice or value is represented by an "attribute value" (sometimes shortened to value in this description): consequently the nodes of the data format hierarchy can be considered as providing a specific quality and either a specific choice or a range of choices for that quality. Attribute names are keywords, for which the available values or choices are predefined, so the options offered in a given surface description for a given keyword must be some selection from these predefined choices. For different encodings, certain attributes will be required, others will be optional, and others not used at all.

E-material thus expresses the encoding choices of a surface with a number of attribute-value pairs arranged in a hierarchy. All surface descriptions contain the attribute vEncoding (all attribute and value names are prefixed with a lower case v). As indicated above, this determines the overall encoding of the surface—for example, if it is raster image, vEncoding will be vImage. It can also be a list of choices, where the owner of this surface can provide its contents in more than one encoding.

Each encoding has a number of standard attribute-value pairs associated with it. For example, vImage defines attributes such as resolution, pixel size, colour space, and compression. Some of these attributes can also contain choices. In fact, the owner of the surface can express quite complex choices by adding options to many of the attributes in the surface description.

The attributes are arranged in a hierarchy, which allows different choices for a certain attribute depending on previous choices. For example, if an image encoding is offered for a surface, it might contain a choice of JPEG or JPEG-LS compression if SRGB is chosen as the colour space, but RLE or Group3 fax compression if monochrome is the colour space.

Surface descriptions that list encoding choices are written in a tabular form, termed a description table. Examples of description tables will be shown later in this specification. Once a device receives a surface description, it is faced with the decision as to which encoding it prefers for that surface. Once made, the choice is sent to the owner of the surface, with a request for the actual content data.

The description table lists the attributes in three columns: the level, the attribute and its value. The level specifies the values of other attributes that a given attribute applies to. For example, the attribute "vResolution" with the value "(150, 150)" may only apply if the selections "vImage.vSRGB.24" have been made for previous attributes listed in the same description.

All encodings can be negotiated with respect to the vLanguage attribute. Any surface can be offered in multiple languages for localization purposes. For each language, different choices about the encoding can be given. It is even possible to offer, say, text for one language and image for another.

The JetSend specification here described is focused on modeling static two-dimensional visual information. It therefore specifies encodings that are useful for representing information that can be contained on physical paper. E-material is not limited to this type of information, and new encodings can readily be devised within the context of the present invention applicable to, in principle, any form of information that can be exchanged between devices. It is also possible to invent proprietary encodings as long as certain rules are followed. This allows effective communication between pairs or groups of devices.

Figure 2:
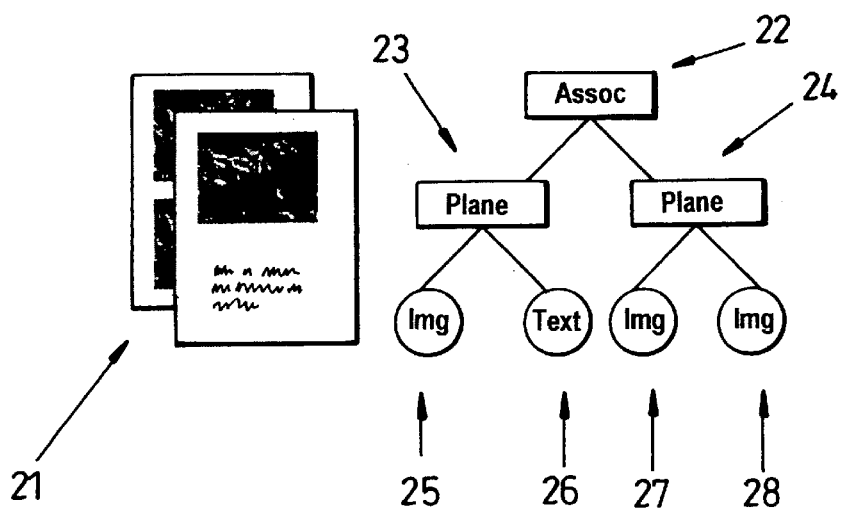
FIG. 2 shows a depiction of a two-page document in a visual and a surface representation.

FIG. 2 depicts a two-page document. A visual representation 21 is shown on the left, and its surface representation on the right. In this case, it is represented using seven surfaces, each with its own encoding. The rectangles are surfaces that contain references to other surfaces. The top-level surface 22 is an association with a reference to each of the two pages of the document. Each page is represented as a plane encoding 23, 24. Each plane contains two references to surfaces that represent the information on the pages. The first plane 23 points to an image surface 25 and a text surface 26. The second plane 24 points to two image surfaces 27, 28.

Each image surface is negotiated separately, and might contain different encoding offerings. This is just one way that this document can be represented using surfaces and e-material. In this case it is broken down into the elements that are visible on the page—i.e., the three images and the text segment. Another possibility is to encode the information as two planes, each with one large image region covering the entire page. It is a design choice of the owner of a document how to encode its information.

As indicated above, incorporated into this architecture is the principle of provision of a default encoding. For each encoding there is a default set of attributes that all JetSend devices are required to support. The default encoding ensures that any combination of devices that exchange the same class of information will be able to communicate. It also ensures forwards compatibility: new devices can implement smarter encodings as long as they support the default one.

All devices are required to support the association encoding, which is simply a container for surfaces with other encodings. Also, all devices that deal with static two-dimensional information are required to support the plane encoding.

The default encoding for imaging devices is 300×300 dpi, monochrome, RLE compressed raster. That means that all JetSend image devices (printers, scanners, copiers, cameras, whiteboards, etc.) must be able to send and/or receive this encoding. Text and File encodings are optional for such devices. As devices supporting other classes of data are implemented, default encodings for those data types will also be introduced. This would include such data types as audio and video. The default is intended as the lowest common denominator for a given encoding.

As further indicated above, in addition to default encodings, an optional but advantageous feature is the provision of base encodings. These are recommended, higher-level encodings that ensure better results for devices with higher capabilities. For instance, for colour imaging devices there is a base encoding for colour images that these devices should support, in addition to the default encodings. A device is free to offer additional encodings as long as the default encodings are offered as well. The device may provide better level of performance or quality by also implementing the base encodings best suited to that particular device type.

The JetSend protocols are designed to be independent of device type, platform and transport. A brief overview of each of the functional components of JetSend appliances. Appliance is a term widely used throughout this specification, and is given a more specific meaning than device. An appliance is a device with a dedicated function, which is capable of substantially independent handling of the data provided to it to achieve that dedicated function. It thus has a broader utility than a pure peripheral to a personal computer, for example. An appliance is generally not reprogrammable, and will generally require only a minimum quantity of configuration to operate. Devices such as scanners and printers will desirably function as appliances when adapted to support the present implementation of the present invention.

Figure 3:
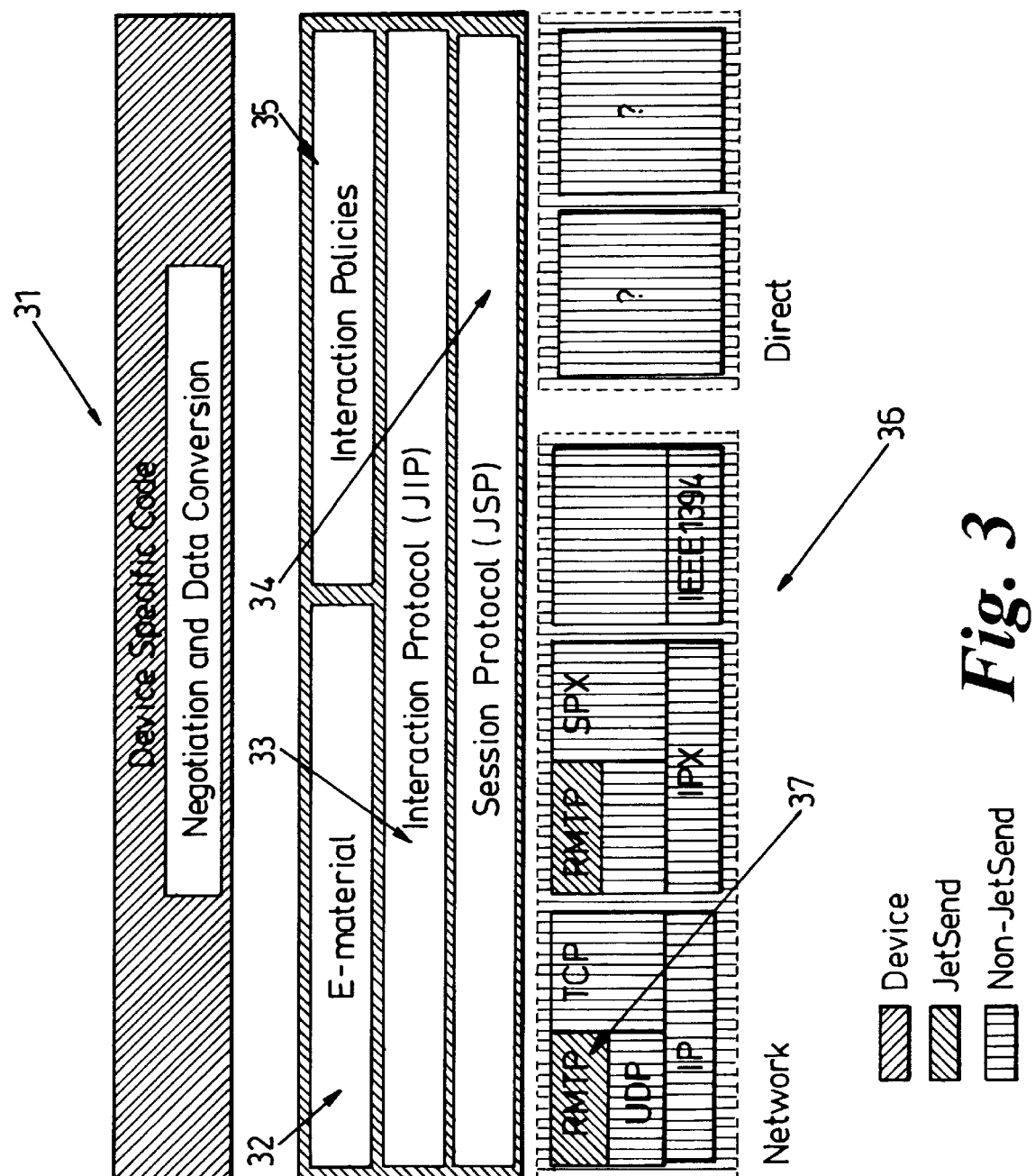
FIG. 3 shows the components of the JetSend architecture and their logical relationship to each other.

There are three primary areas of functionality that make up a JetSend appliance; the transports in the device, the JetSend protocols themselves, and device specific code. FIG. 3 identifies the components of the JetSend architecture and their logical relationships to each other. This is followed by an overview of each of the components. Details for each component are provided at a later point. It should be noted that FIG. 3 is not an implementation diagram. It shows the relationship between the protocol, not between software components. Actual implementations can have similar components, or combine the implementation of multiple protocols into a single module.

The JetSend architecture is applicable independent of transport. JetSend devices can address each other directly over any bi-directional transport 36 using unique addressing. It is necessary for the transport to be reliable: therefore for an unreliable transport such as UDP, a further protocol layer must be added to make transmissions over the transport reliable (a further protocol here termed Reliable Message Transport Protocol (RMTP) 37 is used for this purpose). Possible transports include TCP/IP, SPX/IPX, IrDA, IEEE1284, IEEE1394, and others. A device can implement one or more transports, allowing it to communicate with other devices using those same transports.

Communication between JetSend appliances occurs using a number of layered protocols, as can be seen from FIG. 3. These layers are similar to most networking systems, where each protocol layer communicates with the equivalent layer in the other device. The layers that comprise the JetSend protocol are the Interaction Policies 35, the Interaction Protocol 33, the Session Protocol 34 and the RMTP Protocol 37.

The Interaction Policies define various typical sequences of interactions that devices will follow. The interaction policies are used in as generic building blocks to accomplish more specific information exchanges between devices. The following interaction policies have been defined and are discussed further below:

Job Policy—How to send documents between senders and receivers.

Self Policy—How to exchange global information about a device such as label, icon and passwords.

Status Policy—How to give status about a device and about jobs.

Address Policy—How to program devices with new destination addresses.

Devices are not required to implement any of the policies, but most devices will implement the job policy. Further policies can be developed within the JetSend architecture to address different areas where it is desirable to establish a generic behaviour in communication.

The interaction protocol uses the session protocol to exchange information about surfaces. The JetSend Interaction Protocol contains messages for requesting and transferring surface descriptions, transferring content data for a surface, and updating surfaces. In conjunction with E-material, this provides the mechanism for negotiating data types between devices.

The session protocol defines messages for setting up sessions and channels between two devices. A session manages the establishment and termination of data transport between the two JetSend entities. It can create logical channels within that context for communications. All these interactions take place over whatever transport is provided by the transport layer below. JSP is also used in gateways between JetSend and non-JetSend devices.

When a channel uses an unreliable transport such as UDP, RMTP provides the reliability service for that channel. RMTP is a reliable, sequenced delivery protocol. RMTP is not transport specific, and a single instance of it can maintain connections through all of the transport stacks simultaneously.

The Device Code is the term used for the logic needed to tie the JetSend protocols into an actual device. The Device Code 31 in FIG. 3 can exist in any device that is capable of either producing or consuming information. Typical producing devices are scanners and PC applications. Typical consumers are printers and PC viewers. A device must be able to convert between the device specific information/data formats and the e-material used by the JetSend protocols.

The negotiating done by JIP is specific to a particular class of data. Each device will have its own preferences for data encodings, and thus will negotiate for different attributes and make different choices. All devices use the JetSend protocols for negotiation, a process in which the sender makes an offer, the receiver chooses its preferred encoding and makes a request, and the sender fulfils the request. The device code is the very device-specific implementation of the component that interacts between the JetSend protocols and the actions of the devices. Functionality that is left up to the device to implement includes:

User-interface implementation and control

E-material negotiation and consumption (in the sense of providing e-material encodings in order of preference and in handling incoming e-material)

E-material production

Error notification and recovery

Figure 4:
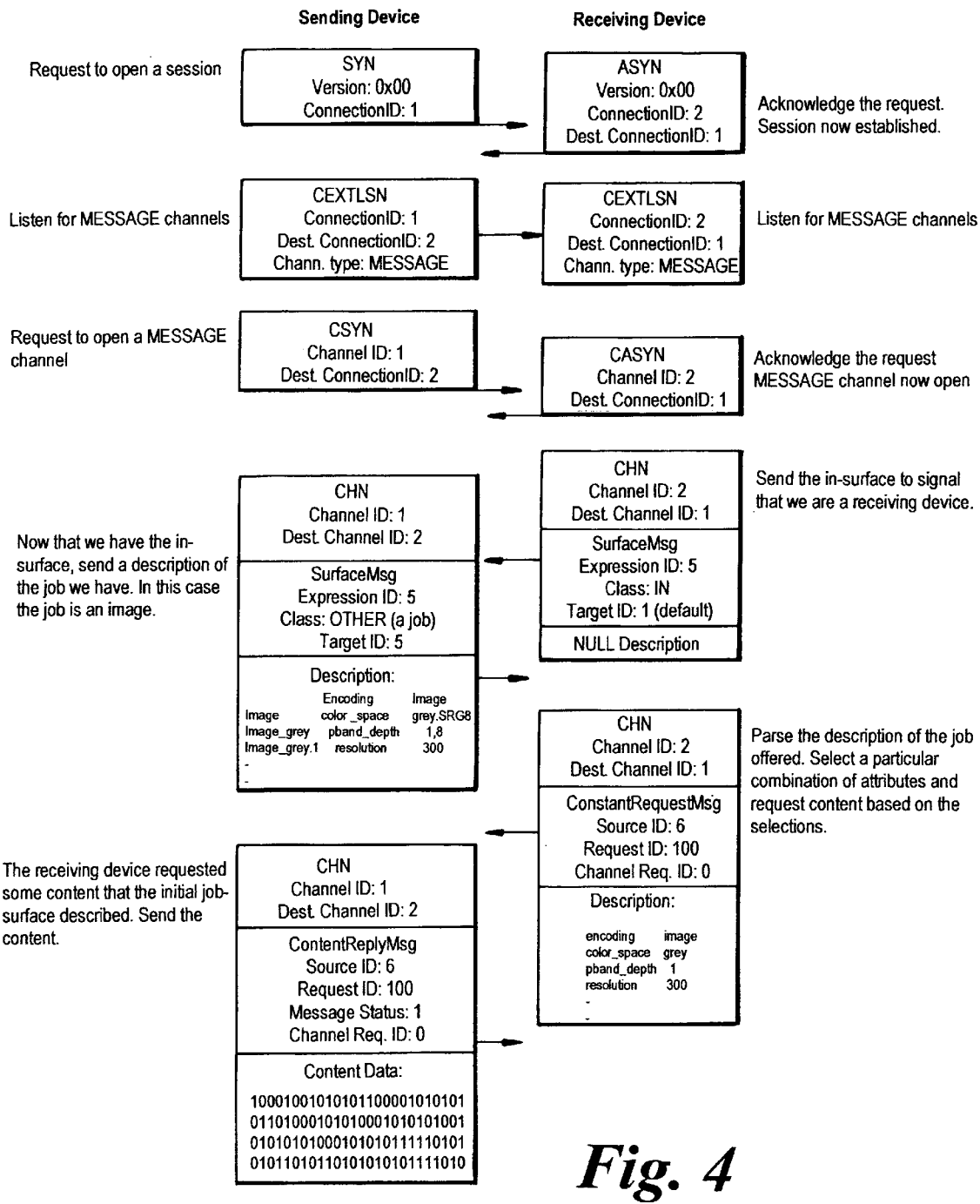
FIG. 4 shows a transcript of messages exchanged by two devices when they establish a session.

FIG. 4 shows a transcript of the messages that two devices exchange when they establish a session, send an image from one to the other, and end the session. The messages are not complete, in the sense that only a couple of salient message fields have been specified in the headers (more complete examples are provided at a later point in the specification). Every message has a JSP header: each message must be received in the order sent, hence the requirement for a reliable data channel. Each JSP header contains the JSP message type (SYN, ASYN, CSYN, CHN etc—these message types will be discussed further below). The CHN message contains the JIP header and potentially some E-material data. The JIP header contains a message type including SurfaceMsg, ContentRequestMsg and ContentReplyMsg. The SurfaceMsg message contains the e-material encoding offering for a surface.

The JetSend Session Protocol can support multiple transport layers such as TCP/IP, IPX/SPX, IrDA, loop-back, etc. It is up to the developer of any given device to determine which transports are made available. The transport implementation must be compatible with the transport code in a JetSend device. There are two specific areas of code that must implemented be for compatability with JetSend transport code. These are the session layer of the protocol, and the provision of some reliable messaging system.

The transport architecture comprises the JetSend Session Protocol in conjunction with the transports that the device decides to support. Devices implementing JetSend using TCP/IP must implement the JetSend Session Protocol and RMTP for unreliable datagram services. The network implementation of JetSend is briefly discussed below.

Figure 5:
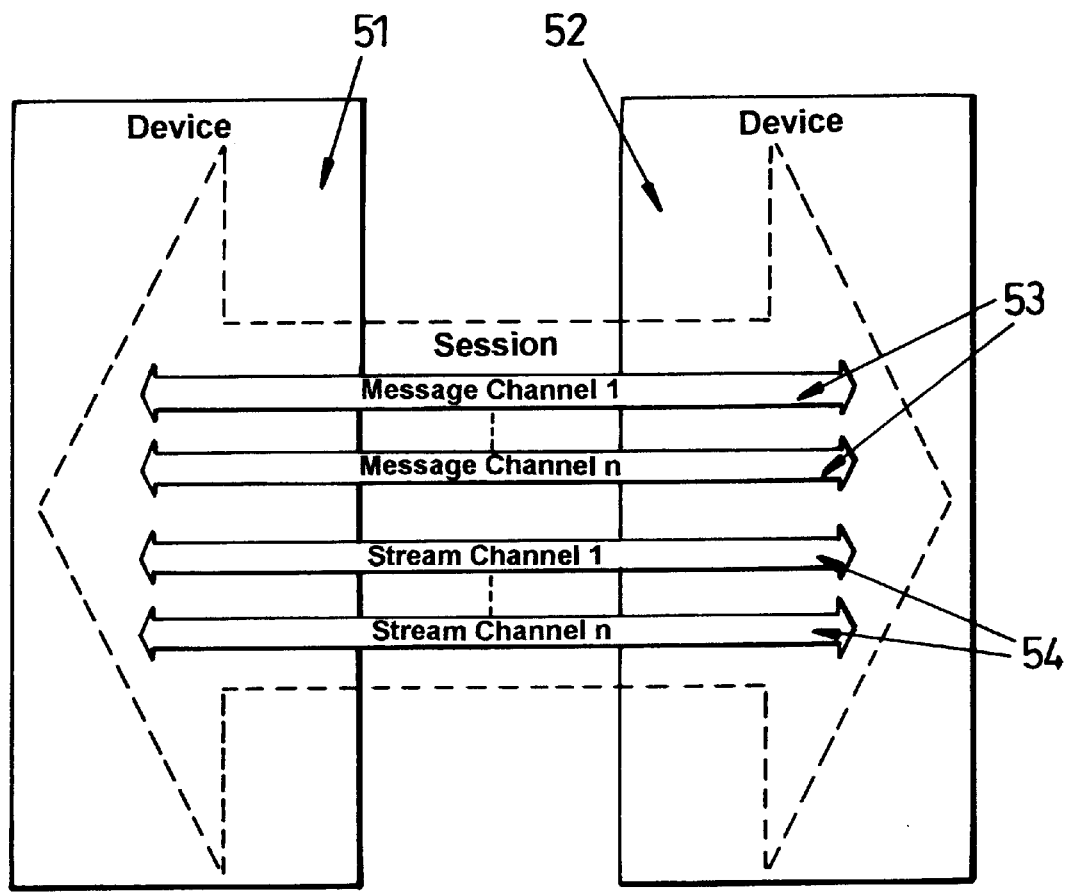
FIG. 5 shows a schematic depiction of a session between two JetSend devices.

JetSend Session Protocol (JSP) is a session layer that allows devices to establish multiple simultaneous sessions with other JetSend devices. For each open session, multiple data channels are opened for data transfer and for sending JIP messages. FIG. 5 illustrates a session with multiple channels between two JetSend devices 51, 52. Two message channels 53 and two stream channels 54 are provided.

A JetSend session is an agreement between two JetSend devices that allows either device to open channels to the other. For two JetSend devices to communicate, a session must be established between them. Establishing a session involves opening a MESSAGE connection between the devices and using the JSP session establishment protocol over the connection to negotiate a session into existence. The architecture of JSP allows any JetSend device to both actively and passively establish sessions. For session establishment to occur one side must start out passively listening for a session and the other side must actively try to establish the session with the passive side. JSP will deny a session establishment request if a session already exists between the two devices unless one of the devices is a JetSend gateway (a JetSend gateway is not the same as an IP gateway: a JetSend gateway is a device that translates between devices which "speak" the JetSend protocols and those which do not (for example, a remote fax machine). If the JIP that is the target of the request is not listening for session establishment requests on the network through which the request arrived, JSP will deny the request. This situation can exist if a user has disabled the device.

The architecture of JSP allows any JetSend device to establish simultaneous sessions with multiple other JetSend devices. Any JetSend device may have—at the same time—both sessions that it passively created and sessions that it actively created.

Either side of a session may initiate termination of the session. The requesting side is not required to wait, but should if it can, until it has no buffered data before requesting the termination. When a termination is requested, both sides stop sending data through all open channels and tear them down immediately.

JIP can open two types of channels through a JSP session, STREAM and MESSAGE channels. Both types of channel offer a reliable-ordered-delivery service. STREAM channels require more overhead to maintain than MESSAGE channels because they are implemented using connection-oriented transport protocols like TCP. MESSAGE channels are implemented using RMTP. STREAM channels offer higher performance than MESSAGE channels for the delivery of large amounts of data. JIP must support MESSAGE channels: however, the JIP can choose to use either channel type for anything it wants to do. Some implementations may only support a very limited number of STREAM channels, or may not support STREAM channels at all.

A JetSend session by itself does not transmit or receive JIP data. The JIP must request that JSP open channels on its behalf for communicating with its JIP peer through the session. A pair of JIPs can have an open session between them without having any channels open through the session. The JIP at either end of the session may initiate the opening and closing of channels. Both JIPs can open and close channels through the session at will. There are no architectural limits to the number or mix of STREAM and MESSAGE channels within a session. If a particular JetSend implementation is not able to accommodate a request to open a new channel, it will reply to the request indicating that it cannot open any more channels of that type.

RMTP is a reliable, sequenced delivery protocol. It is implemented by adding a minimal reliability mechanism and sequence numbering to a datagram transport protocol such as UDP or IPX. RMTP does not promise the same level of performance or reliability that STREAM protocols like TCP and SPX do. Depending on the networks that a particular implementation of JetSend supports, RMTP implementations may run over one or more of the following unreliable transports: UDP, IPX, etc. Its function is to provide a full-duplex communications channel between the two ports of each transport connection, and it attempts to reliably deliver all user messages and will report a failure to the user if it cannot deliver a message. RMTP extends the datagram service of UDP (and/or other datagram protocols) to include reliable delivery. It attempts to detect and discard all damaged and duplicate messages and provides sequenced delivery of user messages.

RMTP is a transport protocol. It extends the end-to-end services that a datagram transport protocol like UDP or IPX provides to include reliability and ordered delivery. RMTP accepts data from JSP in units of messages. RMTP packages for transport each submitted JSP message as a single RMTP segment and passes the segment through the datagram transport for delivery. To package a JSP message into a RMTP segment, RMTP prepends its own header to the JSP message. Each RMTP segment is packaged as an RMTP header and one or more octets of data. RMTP will not attempt to fragment a large JSP message into smaller segments and reassemble the message on the receiving end. This differs from a byte-stream protocol such as TCP, which supports the transfer of an indeterminate length stream of data between ports, buffering data until it is requested by the receiver.

RMTP is required to make an unreliable transport reliable. RMTP is not fundamental to the architecture of JetSend, and the invention can be carried out without recourse to RMTP—RMTP is however advantageous in extending the range of transports available.

As indicated above, a JetSend gateway is a device that can communicate with JetSend devices on one end, and devices of another type on the other. Gateways translate between the JetSend protocol and non-JetSend protocols. This includes converting e-material data types to data types appropriate for a given gateway. A gateway has its own JetSend address, which a JetSend sending device will use to establish a session with it. The sender must also pass the ultimate destination address to the gateway. This is known as the alias address and will be specific to a given type of gateway. For example, a fax gateway will require a phone number to be passed as the alias address. The address of gateways can be pre-configured into sending devices. Gateways can also broadcast their presence to devices on their local sub-net.

Specific aspects of the JetSend architecture will now be described in greater detail below in the context of the overview set out above. The discussion will lead from the lower layers of protocol upwards: first RMTP will be briefly discussed, then JetSend Session Protocol, JetSend Interaction Protocol, JetSend Interaction Policies, and E-Material.

Reliable Message Transport Protocol

Reliable Message Transport Protocol (RMTP) is not fundamental to JetSend, but the requirement for a reliable transport is. RMTP is therefore advantageous as a lightweight protocol layer for making an existing unreliable transport reliable.

RMTP is a connection-oriented protocol in which each connection acts as a full-duplex communication channel between two processes. Segments from a sender a redirected to a port on the destination host. RMTP may be implemented using any transport protocol. It is intended for implementation using the services provided by a datagram transport such as UDP or IPX. It adds value to datagram transports by implementing reliability and ordered delivery.

RMTP uses the common Internet 3-way handshake to establish a connection. RMTP uses this connection handshake procedure to negotiate maximum segment sizes, synchronize sequence numbers and exchange connection identifiers. It also contains a procedure for negotiation of RMTP versions between hosts.

At the RMTP level, outgoing segments, as they are created, are queued as input to the datagram layer. Each segment is held by the sending RMTP until it is acknowledged by the foreign host. Incoming segments are queued as input to the user process. Segments are acknowledged when they have been queued as input to the user process or in certain cases when they have been accepted by the receiving side.

The receiving end of each connection specifies the maximum segment size it will accept. Any attempt by the sender to transmit a larger segment is an error. If RMTP determines that a buffer submitted with a Send request exceeds the maximum size segment permitted on the connection, RMTP will return an error to the user. In addition, RMTP will abort a connection if an incoming segment contains more data than the maximum acceptable segment size. No attempt will be made to recover from or otherwise overcome this error condition.

Reliable messaging is implemented through a number of mechanisms as follows:

Segment Sequence Numbers—Each segment transporting data has a sequence number that uniquely identifies it among all other segments in the same connection. The initial sequence number is chosen when the connection is opened. Each time a segment containing data is transmitted, the sequence number is incremented.

Checksums—Checksums are included in packets in order that errors encountered during transmission may be detected. For Internet protocols such as UDP this is especially important because packets may have to cross wireless networks such as the Packet Radio Network and Atlantic Satellite Network where packets may be corrupted.

Positive Acknowledgement of Segment—RMTP assumes it has only an unreliable datagram service to deliver segments. To guarantee delivery of segments in this environment, RMTP uses positive acknowledgment and retransmission of segments. Each segment containing a unique sequence number is acknowledged when it is correctly received and accepted by the destination host. Segments containing only an acknowledgment are not acknowledged. Damaged segments are discarded and are not acknowledged. Segments are retransmitted when there is no timely acknowledgment of the segment by the destination host.

Retransmission Timeout—Segments may be lost in transmission for two reasons: they may be lost or damaged due to the effects of the lossy transmission media; or they may be discarded by the receiving RMTP. The positive acknowledgment policy requires the receiver to acknowledge a segment only when the segment has been correctly received and accepted. To detect missing segments, the sending RMTP must use a retransmission timer for each segment transmitted. The timer is set to a value approximating the transmission time of a segment in the network. When an acknowledgment is received for a segment, the timer is canceled for that segment. If the timer expires before an acknowledgment is received for a segment, that segment is retransmitted and the timer is restarted.

JetSend Session Protocol

JetSend Session Protocol (JSP) is a session-oriented protocol within which two processes may open multiple full-duplex communication channels between themselves. Messages from a sender are directed to a JSP port on the destination host. JSP may be implemented to support multiple simultaneous sessions, although this is not a requirement.

JSP session management is implemented over a specific transport. The transport is responsible for providing the functionality that actually transmits and receives the JSP messages. The transport must support a mechanism of reliable, ordered delivery for proper message exchange. Over an IP network, for instance, the JSP would use the Reliable Message Transport Protocol (RMTP) to provide these needed MESSAGE channels.

In addition to the required MESSAGE channels, the JSP implementation can also provide STREAM channels. These may be implemented using any reliable, ordered delivery transport protocol such as TCP, TTP, or SPX. Note, however, that support of STREAM channels is optional and is not a required part of the protocol.

Figure 6:
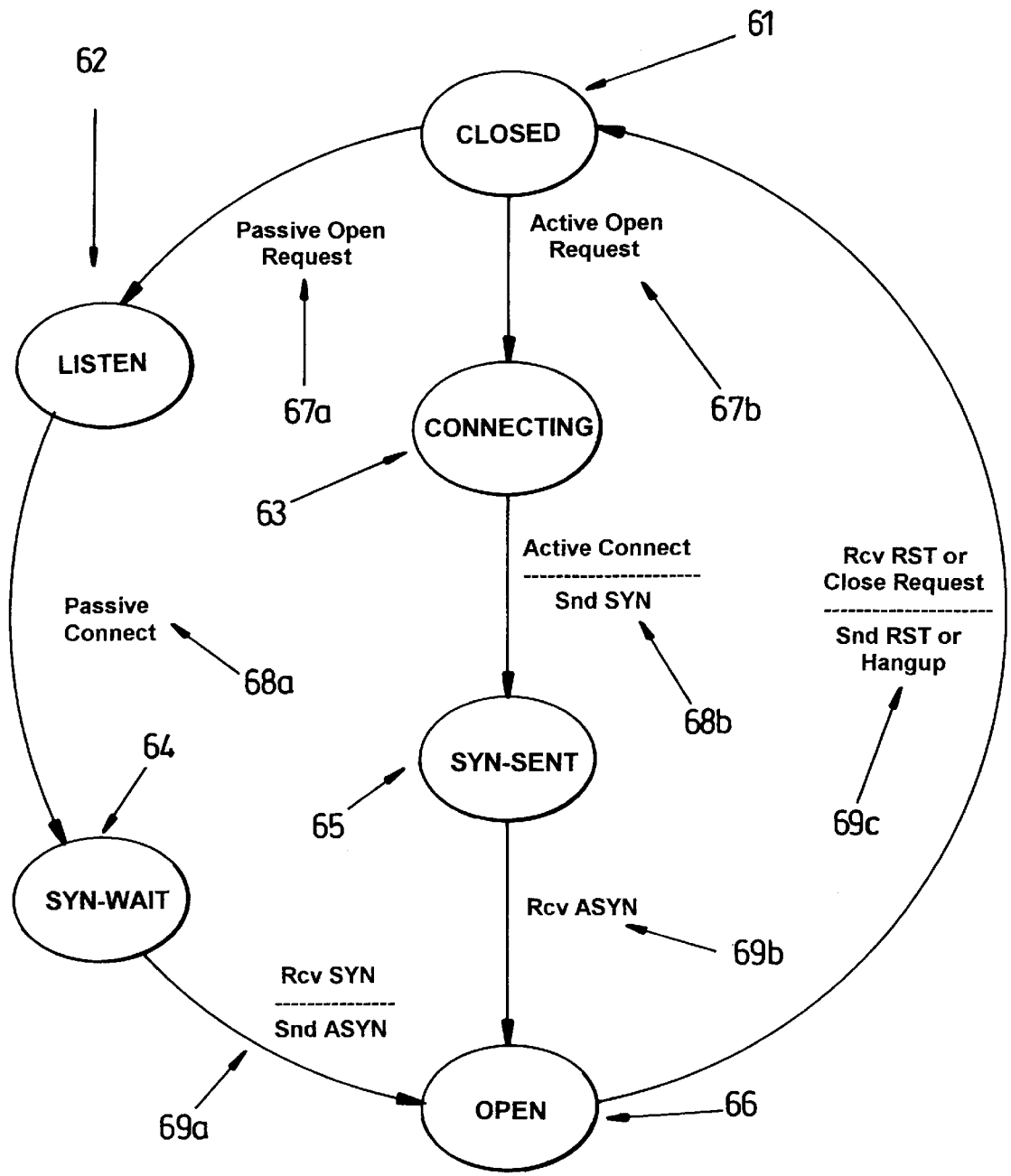
FIG. 6 shows a schematic illustration of the states in a JetSend Session Protocol session.

Each JSP session will progress through a series of states during its lifetime. The states are shown in FIG. 6 and are individually described below. In FIG. 6, the ellipses represent the states of the JSP finite state machine and the arcs represent changes in state. Each arc is annotated with the event causing the state change and the resulting output.

CLOSED

The CLOSED state 61 exists when no session exists.

LISTEN

The LISTEN state 62 is entered after a passive open request 67a is processed. The JSP waits for an active request to establish a transport connection from a remote host.

CONNECTING

The CONNECTING state 63 is entered after an active open request 67b is processed. The JSP attempts to actively open a transport connection to a remote host.

SYN-WAIT

The SYN-WAIT state 64 is entered after passively opening a transport connection. The JSP then waits in the SYN-WAIT state for a SYN message to arrive from the remote host.

SYN-SENT

The SYN-SENT state 65 is entered after actively opening a transport connection. A SYN message 68b is sent to the remote host. The JSP then waits in the SYN-SENT state 65 for acknowledgment (ASYN message 69b) of its Open request.

OPEN

The OPEN state 66 may be reached from either the SYN-WAIT state 64 or the SYN-SENT state 65. It is reached from the SYN_WAIT state 64 when a SYN message is received 69a from the remote host. It is reached from the SYN_SENT state 65 when an ASYN for the SYN is received 69b from the remote host. In the Open state 66 channels may be opened and data may be sent between the two parties of the session.

Sessions are opened by issuing the Open request, which can be either active or passive. A passive Open request 67a puts the JSP into the LISTEN state 62, during which it passively listens for a request to open a session from a remote host. The active Open request 67b attempts to establish a session with a specified JSP port at a remote host. Essentially, a JSP is passive when it is listening for a connection and it is active when it initiates the opening of a connection with another JSP.

In specific cases, implementation of JSP may be such as to support only passive connects, only active connects, or both types of connections. However, this implementation decision will effect the available functionality of the upper layers of the JetSend protocol.

Figure 7:
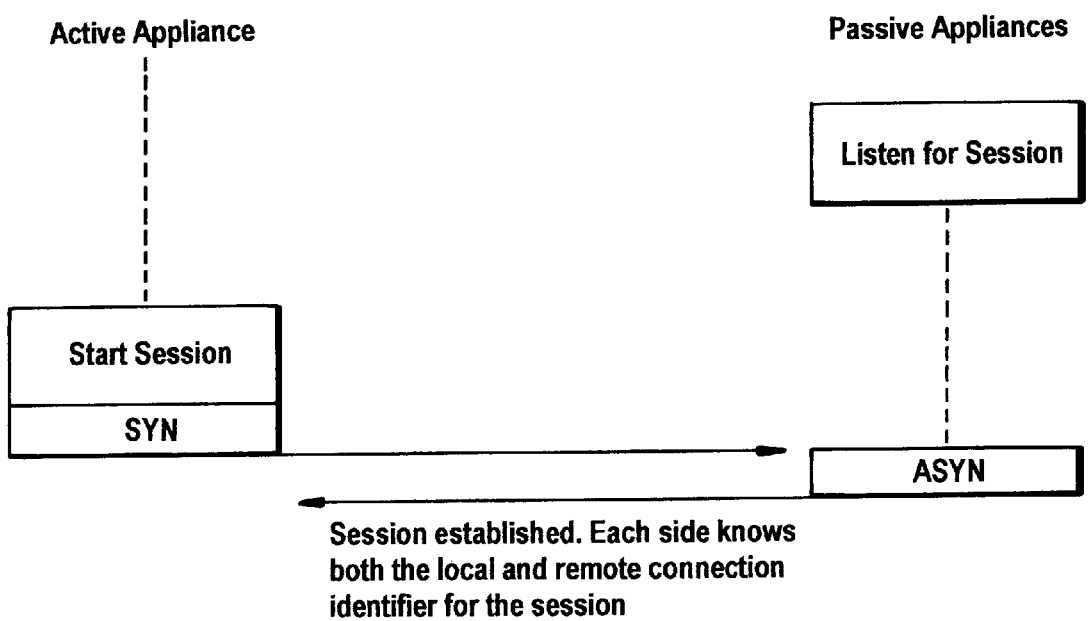
FIG. 7 shows a schematic illustration of starting a JetSend Session Protocol session.

JSP requires the side that actively opened the transport connection to also actively open the session. The session open negotiation exists to exchange session identifiers and prevent sessions from being created when a non-JetSend network entity accidentally opens a transport connection with a JetSend appliance. FIG. 7 shows a schematic example of starting a session.

Firstly, passive session opening is described.

The JetSend Interaction Protocol, identifying itself with an assigned JSP port number (variously referred to as JetSend device number, JetSend sub-address, and JIP Handle), makes a request to the JSP to listen for a session (a passive Open request). The JSP responds by making its own listen call to the underlying MESSAGE transport service. The JSP, remembering the JSP port number that goes with this listen call, waits for the underlying transport to give notifying Passive Connect replies. Each Passive Connect reply should have a unique connection handle (connHandle) assigned to it. Also, for each resulting Passive Connect, the JSP should create a new session control block (SCB) and stores the JSP port number and the connHandle in it.

With the connection established and the SCB set-up, the JSP then waits for the active side to send it a SYN message. If the first arriving message is not a SYN message or a SYN message does not arrive within a specified time period (preferably 2 minutes), the JSP closes the connection and destroys the SCB. If the first message is a SYN message and it arrives within the waiting period, the JSP sends an ASYN or a NSYN over the connection to the remote host. The JSP sends an ASYN to accept the session if the SYN message specified the same JSP port number as the one stored in the SCB. It sends a NSYN to reject the session otherwise.

If the JSP rejected the session (NSYN), it waits until the NSYN is successfully sent to the remote host and then closes the connection and destroys the SCB. If the JSP is supporting multiple JIPs, and more than one JIP requests that the JSP listen for a session on the same network, JSP should only call a Listen on that network once. It maintains a list of the JSP port numbers for which it is listening on that network. When a transport connection is created from the Listen and the SYN is received, JSP will reject the session request if the JSP port number in the SYN does not match any of those in the list.

If the JSP accepted the session (ASYN), it leaves the connection open, waits 4 times the RoundTripTime, and then returns a session handle to the JIP. (The RoundTripTime is the time period starting from when the SYN was sent and stopping when the corresponding ASYN was received.) This wait is to ensure that any renegotiation of the JSP protocol version is handled before notifying the JIP of the new session handle. A mechanism is provided within the JSP to allow for negotiation of version during the handshaking procedure to ensure that communication occurs under the same versions of JSP.

Now active session opening will be described.

The JIP, identifying itself with a JSP port number and its target with an address string, makes a request to the JSP to open a session (an active Open request).

The JSP responds by making its own Active Call to the underlying MESSAGE service. The JSP, remembering the JSP port number that goes with the Active Call, waits for the Active Call to generate an Active Connect response from the underlying transport. Each Active Connect should be assigned a unique connection handle. For the resulting Active Connect, the JSP creates a new session control block (SCB) and stores the JSP port number and the corresponding connection handle in it.

With the connection established and the SCB set-up, The JSP then sends a SYN message to the passive side. The SYN message contains the passive JSP port number, which the JSP derived from the target's JMN form address. The JSP measures the amount of time that it takes for the underlying MESSAGE transport to confirm that it successfully sent the SYN message (RoundTripTime). It then waits for the passive side to send it a ASYN or NSYN message. If the first arriving message is not an ASYN or NSYN message, the JSP closes the connection and destroys the SCB. If the ASYN or NSYN does not arrive within the larger of 1 minute or 4 times the RoundTripTime, the JSP closes the connection and destroys the SCB.

Waiting for 4*RoundTripTime ensures that the responding side has plenty of time to respond over a slow link. Waiting 1 minute ensures that the responding side has plenty of time to respond if it is a relatively slow machine and is communicating over a fast link.

If the remote host accepted the session (ASYN), the JSP leaves the connection open and returns a session handle to the JIP. If the remote host rejected the session (NSYN), the JSP closes the connection and destroys the SCB.

For any one session, the JSP will maintain no more than one transport message connection but it may maintain more than one transport stream (TCP, SPX, etc.) connection with the remote host. The JSP will multiplex all additional MESSAGE Channels over the single message connection. All additional STREAM Channels will correspond directly to additional transport stream connections.

After the session is established, a MESSAGE connection already exists. It gets created during the process of establishing the session. If the JIP makes a request to JSP to open a MESSAGE channel, JSP negotiates the channel into existence over this existing MESSAGE connection.

When the JIP makes a request to passively listen for STREAM channels, the JSP must first post a listen on its local well known stream transport port. Thereafter, when a remote JIP requests to open a STREAM channel, the JSP will create the channel over a newly created transport connection.

When the JIP makes a request to actively open a STREAM channel, the JSP opens a new stream transport connection to the well known stream transport port on the remote host. If the remote host is listening for a connection on that port, the connection is created using a new transport connection. When the channel is closed, JSP will close the transport stream connection.

The physical MESSAGE connection is never closed during the lifetime of the session.

When the JSP closes a session, it must close all of the transport connections it has open within the session and cancel any transport listens that are active. The JSP will close a session in three situations: it receives a Close request from a layer above; it receives a RST message from the remote host; or its transport MESSAGE connection fails.

If the JSP has been told to close the session, it sends a RST message over its MESSAGE connection, closes all its transport connections, cancels all its listens, and destroys the SCB. This simple session closing facility requires that the higher-layers in the JetSend protocol have determine that all data has been reliably delivered before requesting a close of the session.

If the JSP has received a RST message over its MESSAGE connection, it closes all its transport connections, cancels all its listens, and destroys the SCB.

If the JSPs MESSAGE connection fails, it closes all its transport connections, cancels all its listens, and destroys the SCB. Note that JSP will NOT close the session if its STREAM transport connection fails. The reason for this is that a MESSAGE connection is required while a STREAM connection is only an optional way of sending/receiving data.

If one side of a session crashes, the session may be left with the other side still active. This situation is termed to be an half-open session.

To ensure that half open sessions/connections do not remain open and consume resources, the JSP will send keep-alive messages during long periods of inactivity in the session. If there has been no activity on any channel within the session for longer than 10 minutes, the JSP will send a keep-alive message (NUL message) to the other side over the MESSAGE connection. If the MESSAGE connection fails (the JSP receives a Disconnect notification from the underlying transport), the session is terminated. To prevent keep-alive messages from piling up in the MESSAGE transport, the JSP will not send another keep-alive message until it receives a notification from the underlying transport that the last one was sent.

The JSP provides the abstraction of channels running through a session. When the session protocol is in the OPEN state, the JSP may open channels of available types. Each JSP channel acts as a full-duplex communication channel between two JetSend devices. Messages from a sender are directed to a channel end-point on the destination host.

Channels are opened by issuing the Open request, which can be either active or passive. A passive Open request causes the JSP to passively listen for a request to open a channel from a remote host. The active Open request sends a request to open a channel to a remote host.

Before the JSP can attempt to actively open a channel, it must know which channels, if any, are available for opening. The CEXTLSN message is used by the JSP for this purpose. Once a session has been established through the above-mentioned handshaking, the JSPs involved in the session should each send out a CEXTLSN message containing the channel types which it has available for opening. A JSP may not attempt to actively open a channel with another JSP until this mess age has been received.

Once the CEXTLSN has been received, the JSP can attempt to open a channel. The channel open request is carried in a SYN message with the CHN bit also set (CSYN message). It includes the channel number from the sending side. The response to the CSYN is a SYN message with the CHN and ACK bits also set (CASYN message). It contains the channel number from the responding side. The passive side of a channel open receives a CSYN message from the active side. The passive side records the active side's channel number in a channel control block (CCB). It then sends a CASYN back to the active side. It includes its own channel number (a handle to its CCB) in the CASYN. From that point forward, all messages that the passive side sends to the active side will contain the active side's channel number in the Destination Channel field.

The active side of a channel open creates a CCB and sends a CSYN message to the passive side. It includes its own channel number (a handle to its CCB) in the CSYN. It then receives a CASYN back from the passive side. The active side records the passive side's channel number in its CCB. From that point forward, all messages that the active side sends to the passive side will contain the passive side's channel number in the Destination Channel field.

The passive side may respond to a CSYN with a SYN message with the CHN and NAK bits also set (CNSYN message). This is a rejection of the channel open. No channel is created.

Closing a channel can be initiated by a Close request from the JIP or by receipt of a CRST message from the other end of the channel. In the case of the Close request, the JSP will send a CRST message to the other side of the channel and then closes its end of the channel. The JSP discards messages directed to a closed channel. This simple channel closing facility requires that users determine that all data has been delivered before requesting a close of the channel.

Figure 8:
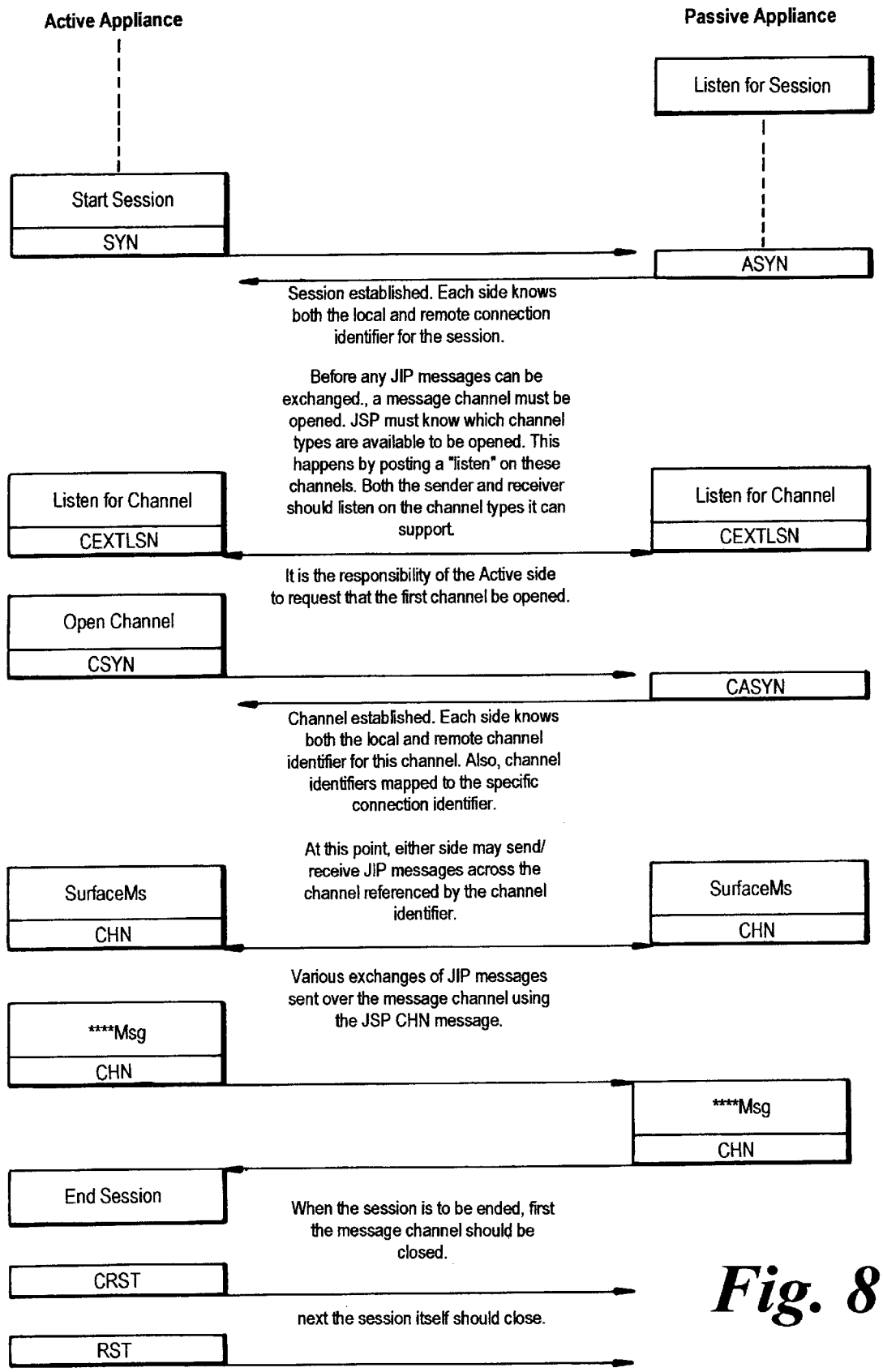
FIG. 8 shows a schematic illustration of the opening and closing of a channel in JetSend Session Protocol.

A visual example of opening and closing a channel is shown in FIG. 8.

Data flows through a JSP channel in the form of CHN messages. All CHN messages have the Last Fragment bit (LF) set except for non-terminal fragments. At the JSP level, outgoing messages, as they are created, are queued as input to the transport layer. Each message is reliably delivered by the underlying transport. If it cannot be delivered, the transport will generate a disconnect event on that connection and as a result the JSP will close all channels running over that connection. In addition to closing all the open channels, the JSP will also close the session.

In order for information to be passed between two devices, in this implementation all data must be sent and received on a 4-byte boundary. These blocks of data will be identified as Task Block Control Buffers (TBCB) throughout the rest of this document. NULL padding must be added in the cases where the TBCB is not divisible by four. When the JSP sends data from a TBCB to a foreign peer, it should include the padding.

When the JSP opens a connection, one of the items of information that it needs to receive from the underlying transport is the maximum message size for that connection. This max_transport_buff is the size of the largest message that the transport will accept for sending from the JSP on that connection. If the JSP receives from JIP a request to send a buffer of data that is larger than the maximum message size, JSP will fragment the data into multiple JSP messages. It prepends its header to each of the multiple messages, sets the LF bit to 0 on all but the last one, which it sets to 1, and sends them to the underlying transport for transmission. The receiving side reassembles the messages into one block of data for delivery to the JIP.

Figure 9:
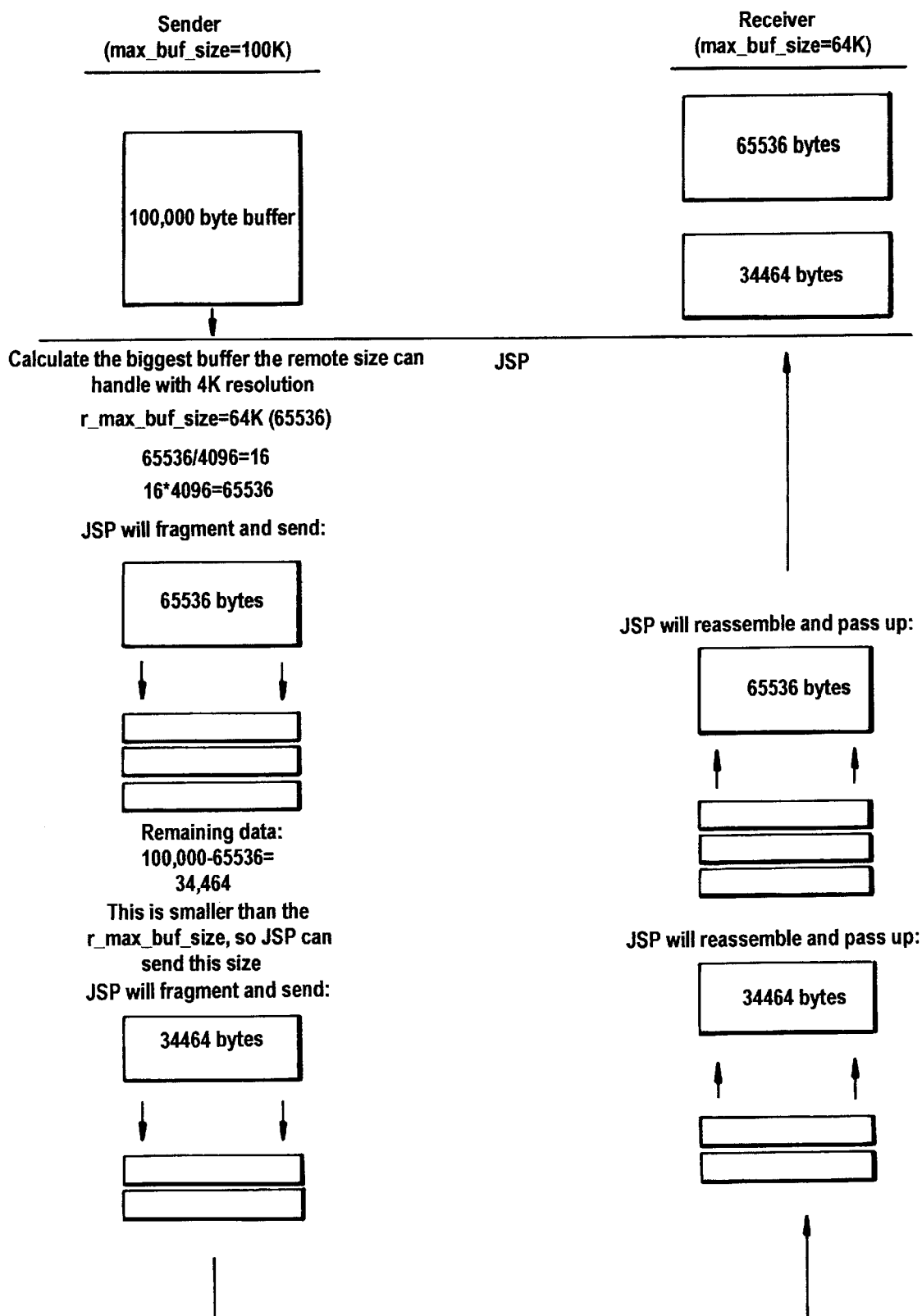
FIG. 9 shows a schematic illustration of partial message fragmentation in JetSend Session Protocol.

As part of the JSP protocol, the CSYN and CASYN packets exchange information about the maximum buffer size that each JIP can manage (max_buf_size). The JSP will need to take the remote max_buf_size (remote_max_buf_size) into consideration prior to fragmenting the buffer, especially since the two sizes may be different. JSP should never send a buffer larger than the remote_max_buf_size to the remote device. In a case where the max_buf_size on the local JIP is larger than the remote_max_buf_size, JSP receives a buffer of max_buf_size (this_buf_size) to send to a remote device. JSP will need to send buffers (which may also need to be fragmented) up to remote_max_buf_size to the remote device for the this_buf_size buffer. The remote JIP will receive the correct amount of data (this_buf_size), not in a single buffer, but in partial messages that add up to this_buf_size. Moreover, as 4K is the minimum record size that can be interpreted by the JIP, JSP needs to ensure that the partial messages are a multiple of this record size as well: otherwise, the remote JIP might not be able to interpret the data received in a partial message. An example of such message fragmentation is shown in FIG. 9.

JSP only adds a JSP header to a message if it is going over a MESSAGE channel. Data blocks that are written to a stream channel by JIP never have the JSP header added. It is a property of STREAM channels that data blocks are not necessarily delivered to the other end of the connection exactly as they were written at the sending end. So for example what was written as 2 blocks of 64 kilobytes each may be delivered as a single block of 128 kilobytes. However, the ordering of the bytes in the stream is preserved.

JetSend devices typically interact peer to peer across a single network type (e.g. IP or IPX only). This means that JetSend devices of one network type can only communicate with JetSend devices of the same network type, which are physically connected to the same network. The problem occurs when a JetSend device needs to connect to a device that is on a network not supported by the first device or is running a protocol that is not supported by the first device. There are two approaches to solving this problem.

The first approach is to load multiple communications stacks onto a single JetSend device. This allows the device to interact with any type of JetSend device provided it has an appropriate communications stack. This approach works well for the situation where the underlying transport is different, but the devices understand the full JetSend protocol (for example in the IP and IPX case).

A second solution to the problem of multiple networks is to use a gateway. A gateway is a device that sits invisibly in the network and translates from one network type to another. The gateway approach is suitable for a situation where the destination devices are not JetSend compliant, and each source device would then have to model the destination in order to communicate with it. This is the case for fax and e-mail. Rather than overload the device with the ability to talk to legacy networks, this functionality is put into the gateway, which can usually be hosted on a programmable device.

When the JIP wants to establish a session with a remote device that requires a JetSend gateway to access, JSP hides the existence of the gateway from JIP. The JSP creates the session with the gateway instead and passes it the remote device's address in the SYN message. From that point forward, when the gateway receives the JIP data through any of the channels in the session, it relays the data to the remote device over the gateway link.

When the JIP wants to create a session to a second remote device that is accessed through the same gateway, the JSP simply opens a second session with the gateway as indicated above.

The JSP implementation should maintain an internal table that contains a mapping of gateway types to gateway addresses so that the device can connect to a gateway by address.

The JSP broadcasts a gateway request by sending out a GWY message over a datagram port. (When JSP is running over an IP network, this is done by opening a UDP port to send/receive the gateway message over.) After broadcasting the GWY message, the JSP then listens for a reply on the same local address (or UDP port) through which it sent the broadcast. A JetSend gateway listens for broadcasts on its well-known datagram transport port. When it receives a gateway broadcast (GWY packet), it makes sure it can support the version in the version field. If the version is not supported it will throw the packet away. If the version is supported, it looks to see if the destination is "all gateways" (0xFF) or this particular gateway. If there is a match, it then checks if it is the type of gateway requested. If the type requested is NULL, then all gateways of all types should respond. If it is non-null, then only the gateways of that type should respond. If the gateway determines it should respond, it replies to the broadcast using a GACK message. This GACK is sent over a datagram port in the same manner as a GWY message.

If JSP receives a GACK response to its GWY, it ensures it can support the version in the version field. If not, it ignores the packet. If the JSP can support the version, it caches the gateway information in its internal table and notifies the JIP of the new gateway. JIP is now able to open a session with the new gateway.

Figure 10:
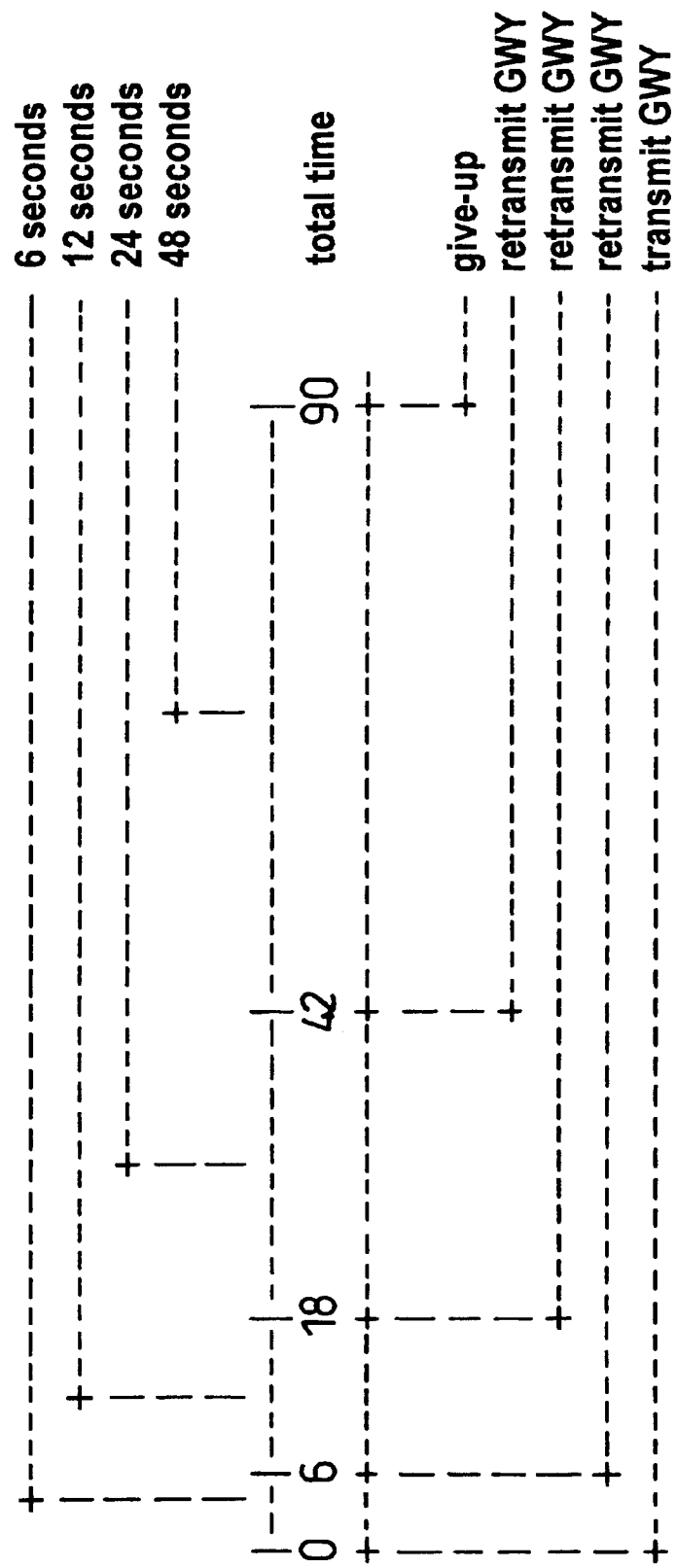
FIG. 10 shows user of a timer in scheduling gateway broadcast messages using JetSend Session Protocol.

If a GACK does not arrive in a timely manner after JSP broadcasts a GWY message, JSP will use a timer to retransmit a GWY as shown in FIG. 10. When JSP sends the first GWY, it sets a timer for 6 seconds. When the 6 seconds elapses and JSP has not received a GACK, it doubles the timer to 12 seconds and retransmits. Each time it retransmits it doubles the timer. When the total elapsed time reaches 90 seconds, JSP gives up. It will at this time reply to the JIP that it cannot set up a session to the remote device.

Typically the gateway broadcast will be made in response to a request from JIP. Note, however, that there is no way for a gateway device to announce its presence. In other words, sending an unsolicited GACK message is not allowed by the protocol in this implementation.

Figure 11:
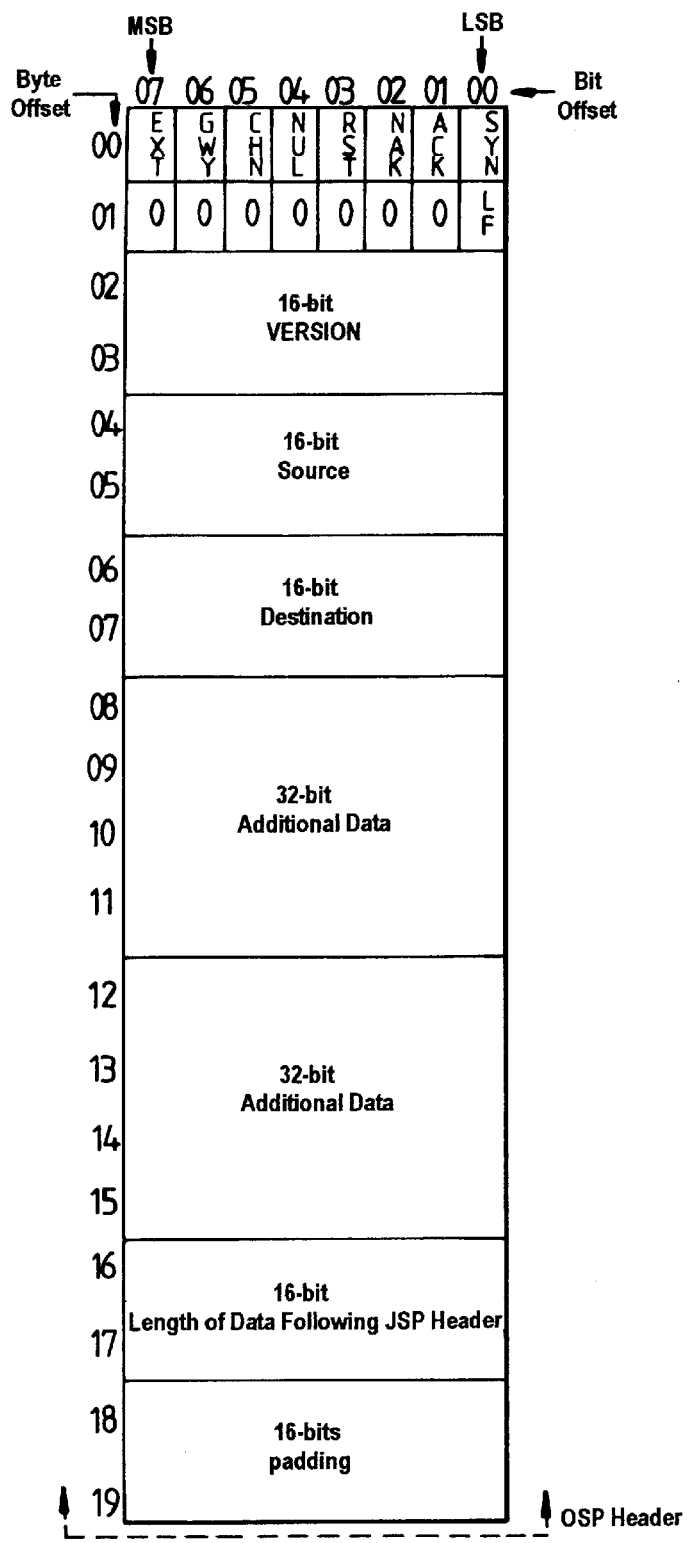
FIG. 11 shows the generic format of a JetSend Session Protocol Message Header.

JSP Header Formats will now be described, together with a brief description of the header for each specific JSP message. Every JSP message is prefaced with a 20-byte JSP header. The "generic" format of the header is shown below in FIG. 11, and a general description of each field follows.

Some of the fields are used in every JSP message, while others are needed only by a few. Octet (Byte) offsets from the beginning of the message are numbered from top to bottom. Bit positions are numbered from right to left beginning with the least significant bit and ending with the most significant bit. The numerical value of a set bit is two raised to the power of the bit position. All multi-byte words in a segment are transmitted across the network in network byte order—which is in big-endian form.

JSP Header Fields will now be described. The 16-bit Control Bits field occupies bytes 0 and 1 of the header. It is bit encoded with the following bits currently defined:

1. SYN Establish session or channel.
2. ACK Accept Session or channel.
3. NAK Reject session or channel.
4. RST Close the session or channel.
5. NUL Keep-alive.
6. CHN The message is directed to a specific channel.
7. GWY The message is a gateway broadcast or reply.
8. EXT Extended Header. Byte 8 contains additional control bits (see CEXTLSN).
9. LF Fragment flag. If it is 0, this is not the last fragment. If it is 1, this is the last fragment.
10. Unused—set to 0.
11. Unused—set to 0.
12. Unused—set to 0.
13. Unused—set to 0.
14. Unused—set to 0.
15. Unused—set to 0.
16. Unused—set to 0.

The control bits are used in combinations to create the message types shown in Table 1 below (The EXT bit is 0 in all these combinations):

TABLE 1

JSP Message Types

| SYN | ACK | NAK | RST | NUL | CHN | Name | Meaning |
|---|---|---|---|---|---|---|---|
| 1 | 0 | 0 | 0 | 0 | 0 | SYN | Request for session |
| 1 | 1 | 0 | 0 | 0 | 0 | ASYN | Accept session request |
| 1 | 0 | 1 | 0 | 0 | 0 | NSYN | Reject session request |
| 0 | 0 | 0 | 1 | 0 | 0 | RST | Close session |
| 0 | 0 | 0 | 0 | 1 | 0 | NUL | Keep-alive |
| 0 | 0 | 0 | 0 | 0 | 1 | CHN | Data for channel |
| 1 | 0 | 0 | 0 | 0 | 1 | CSYN | Request for channel |
| 1 | 1 | 0 | 0 | 0 | 1 | CASYN | Accept channel request |
| 1 | 0 | 1 | 0 | 0 | 1 | CNSYN | Reject channel request |
| 0 | 0 | 0 | 1 | 0 | 1 | CRST | Close channel |

TABLE 2

JSP Gateway messages

| ACK | CHN | Name | Meaning |
|---|---|---|---|
| 0 | 1 | GWY | Gateway broadcast |
| 1 | 1 | GACK | Gateway broadcast reply |

The 16-bit Version Number field occupies the bytes 2 and 3 of the header. It contains the version of the JSP Protocol that has been or is being negotiated. The version is assumed to be a 16-bit signed integer.

The 16-bit Source field occupies bytes 4 and 5 of the header. It contains the source identifier of the packet, and depending on the JSP message type this could be either the JSP port number, connection identifier or channel identifier. The source is assumed to be a 16-bit signed integer.

The 16-bit Destination field occupies bytes 6 and 7 of the header. It contains a destination identifier for the JSP packet. Again, depending on the JSP message type, this could be either an JSP port number, connection identifier or channel identifier. The destination is assumed to be a 16-bit signed integer. In the case of a GWY packet, it is set to 0xFF, as a sign for all gateways to respond.

The 32-bit Additional Data field occupies bytes 8 through 11 of the header. It is used by the JSP to hold additional data required by certain JSP packets. A further such field occupies bytes 12 through 15 of the header. For example, in CEX-TLSN the first 8 bytes are used for specific codes to indicate whether listening for message and/or stream channels has started or stopped.

The 16-bit Length field occupies bytes 16 and 17 of the header. It contains the length (in bytes) of any data that follows the JSP header. The length is assumed to be a 16-bit unsigned integer.

The last 16-bit field, the Padding field, occupies bytes 18 and 19 of the header. This is padding used to ensure the JSP header falls on a 4-byte boundary, This is the end of the JSP header.

The JetSend Interaction Protocol (JTP) and the messages forming the protocol will now be described. Use of the JSP by the JIP to allow appliances to exchange and share information will also be discussed.

Fundamental to the JIP is the concept of surface exchange. One way of picturing the concept is to think of "a surface" as being the surface of a block of modeling clay. This block of clay may be moulded into any shape by its owner. An observer sees the surface of this object as represented by its surface: in other words, the owner of the clay moulds the block into a shape whose surface describes what the object is.

Assume the observer has another, unmoulded, block of clay. The owner of the original moulded block of clay can impress his shaped block onto the surface of the observer's unmoulded block. The observer now has an exact replica of the original moulded shape impressed upon its own clay block (strictly, the metaphor breaks down at this point: in surface exchange the observer has an exact copy of the original, not an inverse or mirror image). So, the owner of the original block of clay (the expressive device) has impressed upon the observer's block of clay (the impressive device) a copy of the original surface.

The JIP is made up of a small number of messages that allow any number of devices to share pieces of information termed surfaces and exchanged according to the surface exchange model. In any interaction one device owns the surface. The owner's copy is referred to as the expression of the surface, and the owner itself is known as the expressive device. All other copies of the surface are referred to as impressions, and the devices holding them are called impressive devices. The messages provided by the JIP allow the expressive device to create and destroy expressions, the impressive devices to destroy impressions they hold, and any device to modify the original surface expression.

In order to implement the concept of surfaces, expressions, impressions and so forth, a list of messages has been created. It is through the use of these messages that all "surface-interaction" takes place. The following messages make up the Interaction Protocol:

SurfaceMsg (Impress)—creates new impressions of surfaces on target device, also used to reject requests for impressions.

SurfaceDeleteMsg (Delete)—notifies impressive devices that the expressive device has deleted the original expression SurfaceReleaseMsg (Unimpress)—notifies the expressive device that an impressive device has deleted an impression SurfaceRequestMsg (Surface Request)—allows a device to request an impression of a named surface DescriptionRequestMsg (Description Request)—allows a device to request the description for a surface it has an impression of DescriptionReplyMsg (Description Reply)—transmits the description for an impression in response to a description request ContentRequestMsg (Content Request)—allows an impressive device to request some content data from the expressive device ContentReplyMsg (Content Data)—transmits some content data from the expressive device to an impressive device in response to a content request: there may be a sequence of these messages in response to a content request, and this message is also used to reject a content request SurfaceChangeMsg (Change)—notifies a device that the information has changed (ie by expressive devices to notify impressive devices of a change, and by impressive devices to request a change an expression—also rejections of these requests)

A surface has a number of attributes. They are a name, an identifier, a class, a set of properties, a description, some content data and a version. The name is a NULL terminated ASCII string. The identifier is allocated to each surface and uniquely identifies it in the JIP. The class is used to determine the purpose of the surface. The set of properties controls what JIP messages an expressive device will respond to. The description contains a description of the formats the data is available in, or which the expressive device is willing to provide. The content data contains the actual bytes of the information itself. The version is used by the change mechanism so expressive and impressive devices know which version of a surface a change relates to.

A typical interaction proceeds as follows. First, the device with information to transfer, which will be the expressive device, creates an expression. To do this it needs to create a name, allocate a unique identifier, create a set of properties, and create a description. At this point it does not need to create any content data, although it must be able to produce the content described in the surface description. Next, the expressive device uses these attributes and attempts to create impressions of this surface by sending a SurfaceMsg to the target device or devices. Note that such SurfaceMsgs may be sent out unsolicited or they may be sent in response to an earlier SurfaceRequestMsg received from another device. Also note that in order to create an impression using the SurfaceMsg, the expressive device must have a "target surface" on which to "impress" the expression. When the SurfaceMsg is in response to an earlier SurfaceRequestMsg, this target-surface identifier can be found in the SurfaceRequestMsg. If, however, the expressive device is creating an unsolicited impression, the target-surface identifier can be that of an existing impression, in which case the expression must already exist, or it may be set to the "default target" identifier.

The default target identifier is sometimes referred too as the "work surface". The existence of such a default is important for proper implementation of JIP. Otherwise, there is a bootstrap problem when an expressive device is first sending a message to an impressive device: the expressive device does not know where to create an impression on the impressive device (of which it has no knowledge at this point), and the impressive device cannot conveniently tell the expressive device (without sending some kind of global message) as it is not aware that the expressive device wishes to create an impression. The solution is the existence for all devices accepting impressions of a default or work surface with a default target identifier (in this implementation the default target identifier has been set at 1). This enables any expressive device to create an impression on an impressive device by setting the target identifier field to 1. The impressive device can then enter into communication with the expressive device (for example, with a SurfaceRequestMsg message requesting impressions to a new target surface).

Figure 12A:
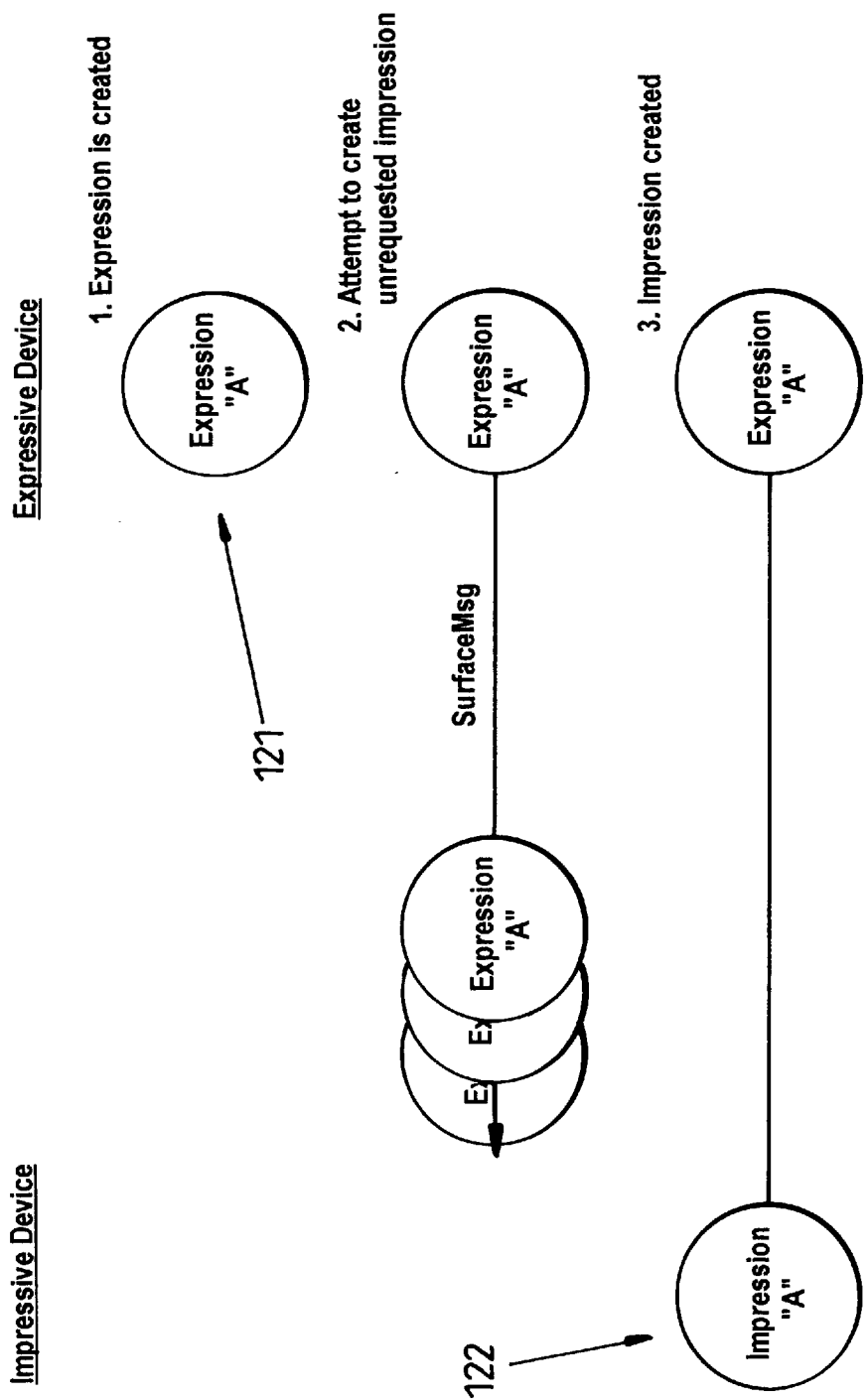
FIGS. 12a to 12k show the use of messages of the JetSend Interaction Protocol in exchange of information between appliances.
Figure 12B:
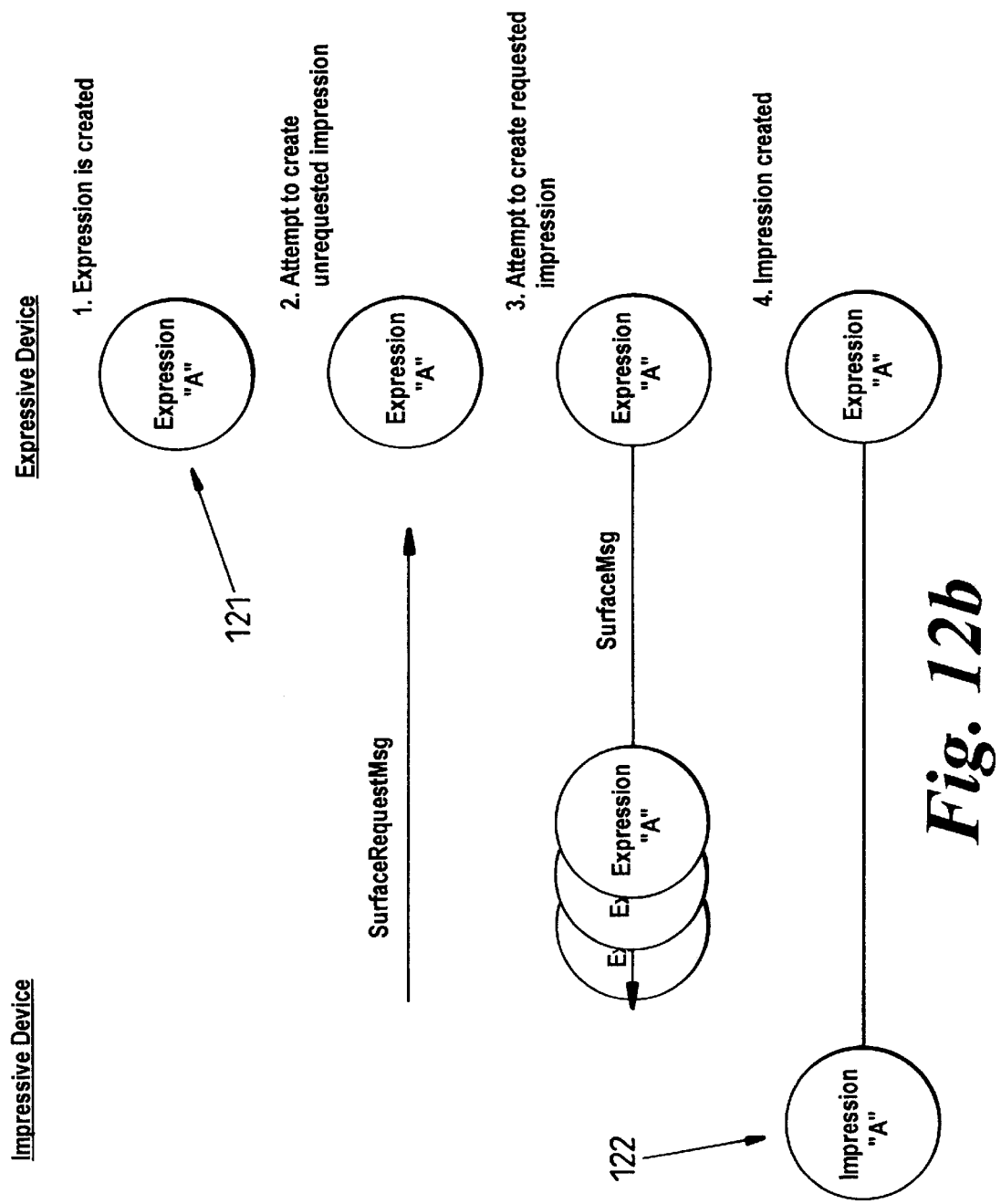
Figure 12C:
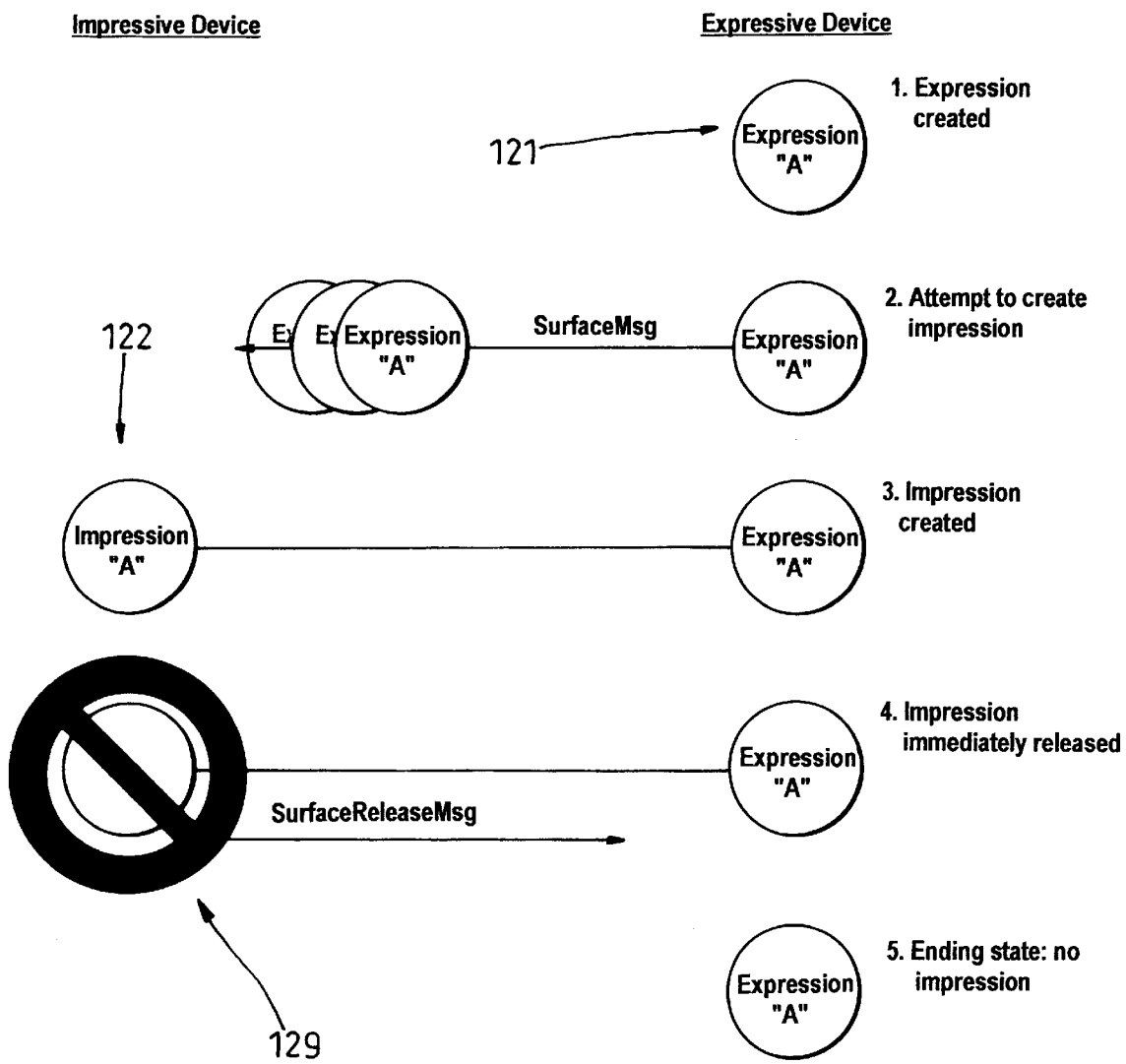
Figure 12D:
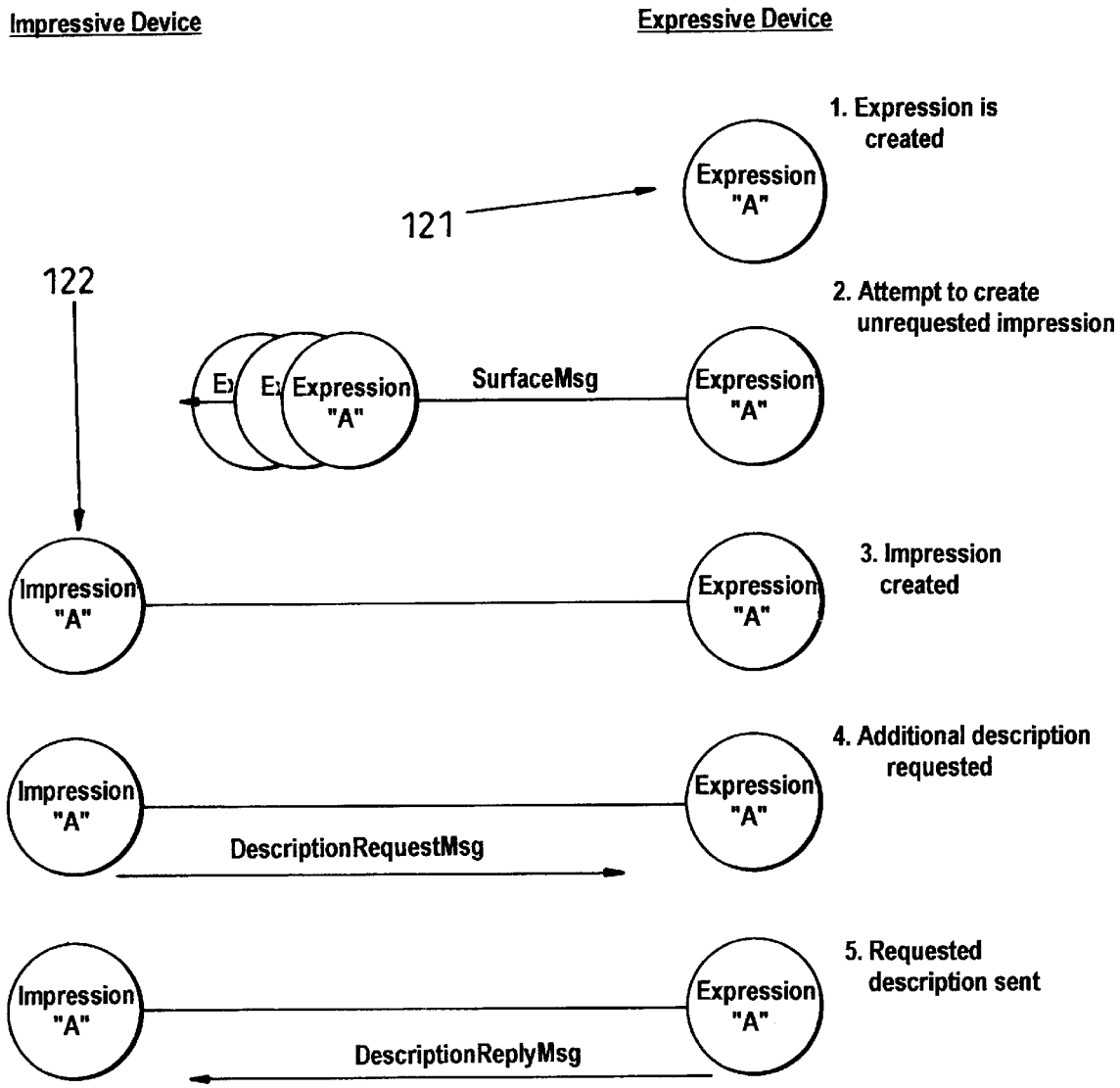
Figure 12E:
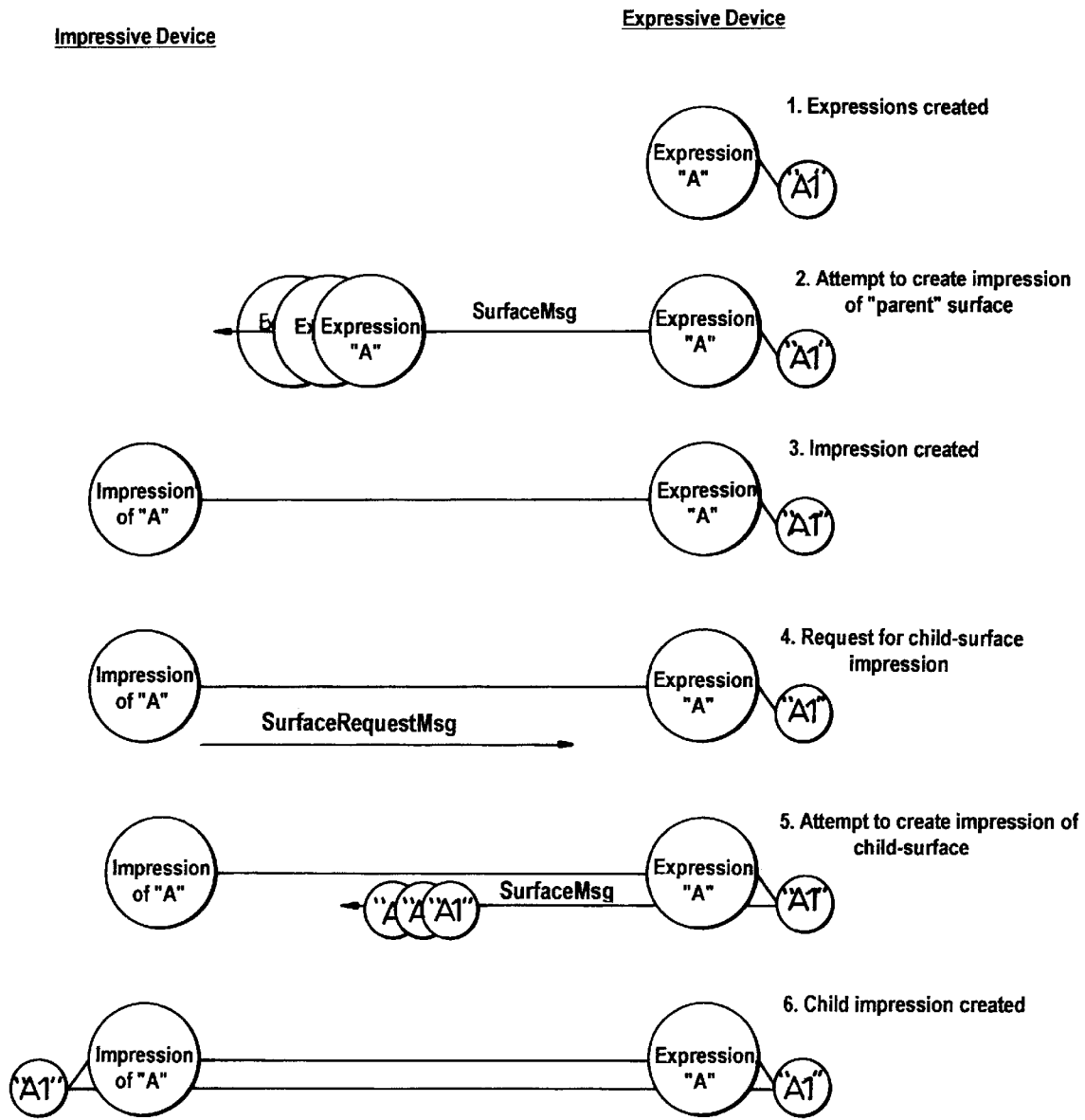
Figure 12F:
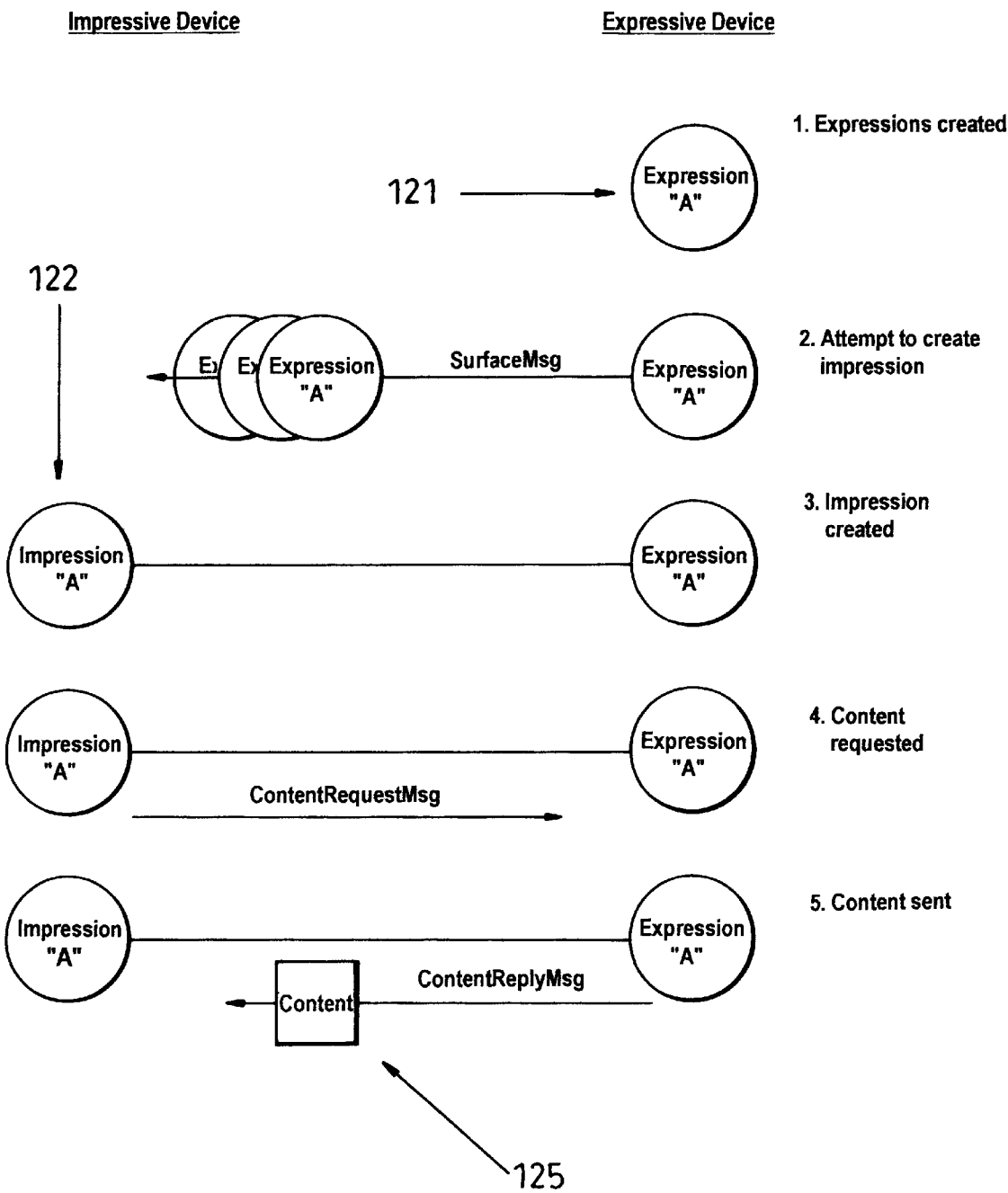

A series of examples illustrating use of the messages of the JIP is provided below, with reference to FIGS. 12*a* to 12*k*. FIG. 12*a* is essentially similar to FIG. 1, but is provided as FIG. 12*a* for convenience.

EXAMPLE 1

FIG. 12*a*

An expressive device wishes to create an unrequested impression. First, a surface expression 121 is created. This is then impressed on the impressive device with SurfaceMsg and an impression 122 of the surface exists at the impressive device.

EXAMPLE 2

FIG. 12*b*

An expressive device creates a surface expression for information that it wishes to exchange with other appliances. In this example, the expression already exists before it is requested, but this is not necessarily the case (for example, child surfaces may not in some cases be created until they are actually requested). The expressive device then receives a request for a surface impression in a SurfaceRequestMsg from the impressive device, and in response attempts to create the impression with a SurfaceMsg. The end result is as in Example 1, with an impression 122 created at the impressive device.

EXAMPLE 3

FIG. 12*c*

An expressive device creates a surface expression and attempts to create an unrequested impression on an impressive device, as in Example 1. The impression 122 is created, but is then immediately released 129 with a SurfaceReleaseMsg from the impressive device to the expressive device. The end state is with an expression 121 of the surface at the expressive device, but with no impression of the surface at the impressive device.

EXAMPLE 4

FIG. 12*d*

As in Example 1, an unrequested impression 122 is successfully impressed on the impressive device. The impressive device then can use the description in the impression 122 to determine what action to take next. In some cases, such as that in this example, the surface description contained in the original SurfaceMsg is not complete. The impressive device can then request more information from the expressive device with a DescriptionRequestMsg message. The expressive device replies to the DescriptionRequestMsg with a DescriptionReplyMsg, which contains the further surface description.

Example 5

FIG. 12*e*

A surface description may contain reference to sub-surfaces, or child-surfaces, of the top-level surface (for example e-material encoded as an association will in practice always contain child surfaces. Example 5 relates to a surface A which has a child surface A1. An expression 121, 123 of each surface is provided at the expressive device (alternatively, only an expression 121 of surface A may be provided at this point). Surface A is then impressed on the impressive device with a SurfaceMsg. The impressive device may then request an impression of the child surface A1 from the expressive device with a SurfaceRequestMsg. This request can be rejected, or accepted, in which latter case the expressive device sends a further SurfaceMsg (after first creating an expression of child surface A1 if such an expression does not already exist). The end state is with an expression 121 of surface A and an expression 123 of child surface A1 at the expressive device, and corresponding impressions 122, 124 of surface A and child surface A1 at the impressive device.

EXAMPLE 6

FIG. 12*f*

Once an impression of a surface is provided at an impressive device, the impressive device may request content with a ContentRequestMsg. On receiving a ContentRequestMsg, the expressive device may reject the request or provide content 125 in the format requested. This content may be sent as a ContentReplyMsg message (as here), a series of ContentReplyMsg messages, or through another means such as a stream.

EXAMPLE 7

FIG. 12g

Figure 12G:
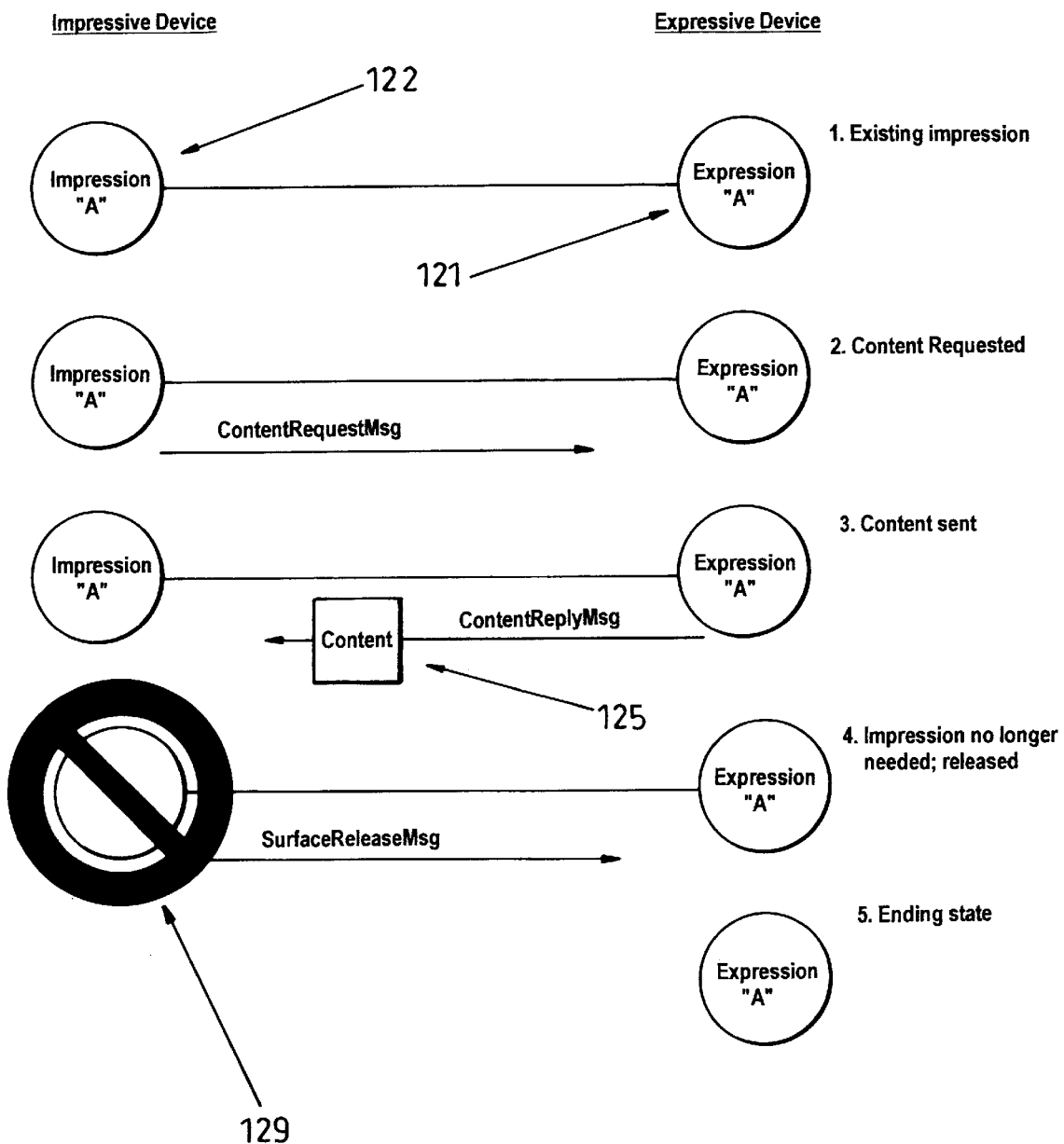
Figure 12H:
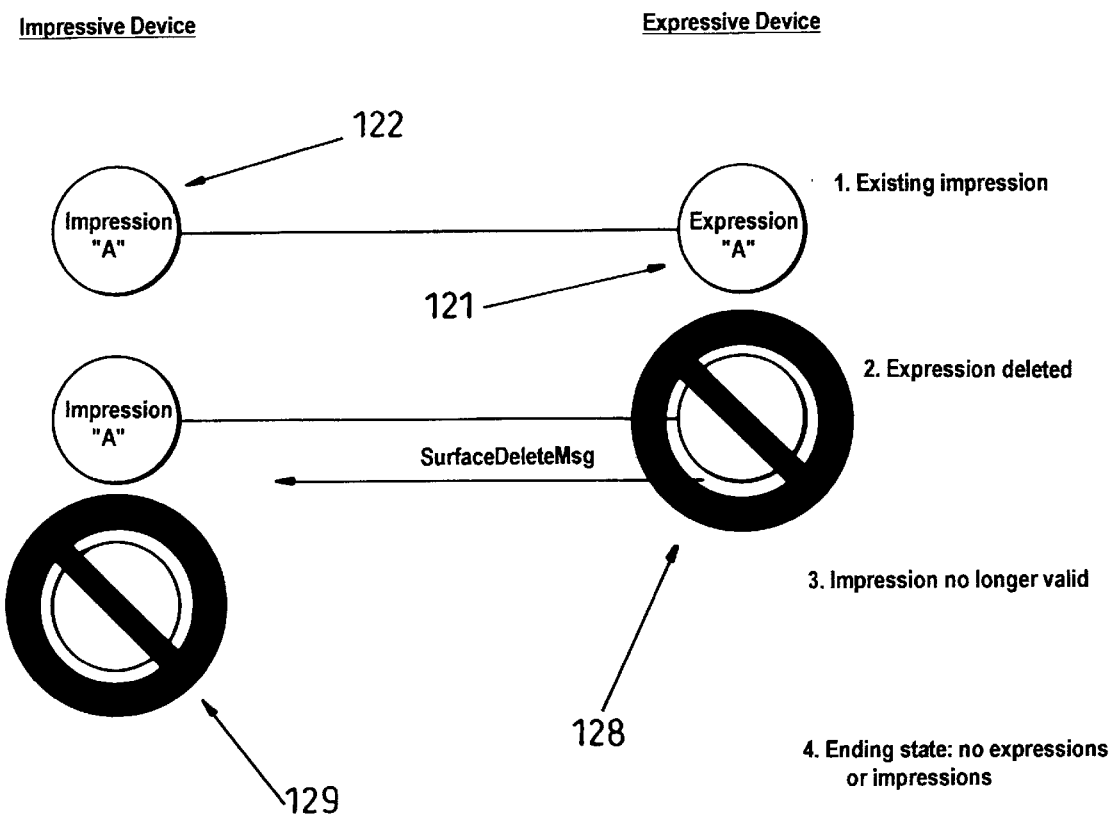

When an impressive device decides that it no longer needs an impression (for example, it is a printer, and it has confirmed that the surface represents a document which it has now successfully printed), it can release the impression by sending a SurfaceReleaseMsg to the expressive device. This situation is shown in FIG. 12g, which follows on from the situation of Example 6: after content has been requested by the impressive device and received, a SurfaceReleaseMsg is sent back to the expressive device to tell the expressive device that the impression is being "unimpressed". The expressive device will then ignore any subsequent messages that relate to the unimpressed surface.

EXAMPLE 8

FIG. 12h

An expressive device can itself delete an expression 128. It does this by sending a SurfaceDeleteMsg to all impressive devices which have an impression 122 of the original expression 121: the message indicates that the expression has been deleted, and the expressing device will then ignore any messages relating to the deleted expression surface.

EXAMPLE 9

FIG. 12i

Figure 12I:
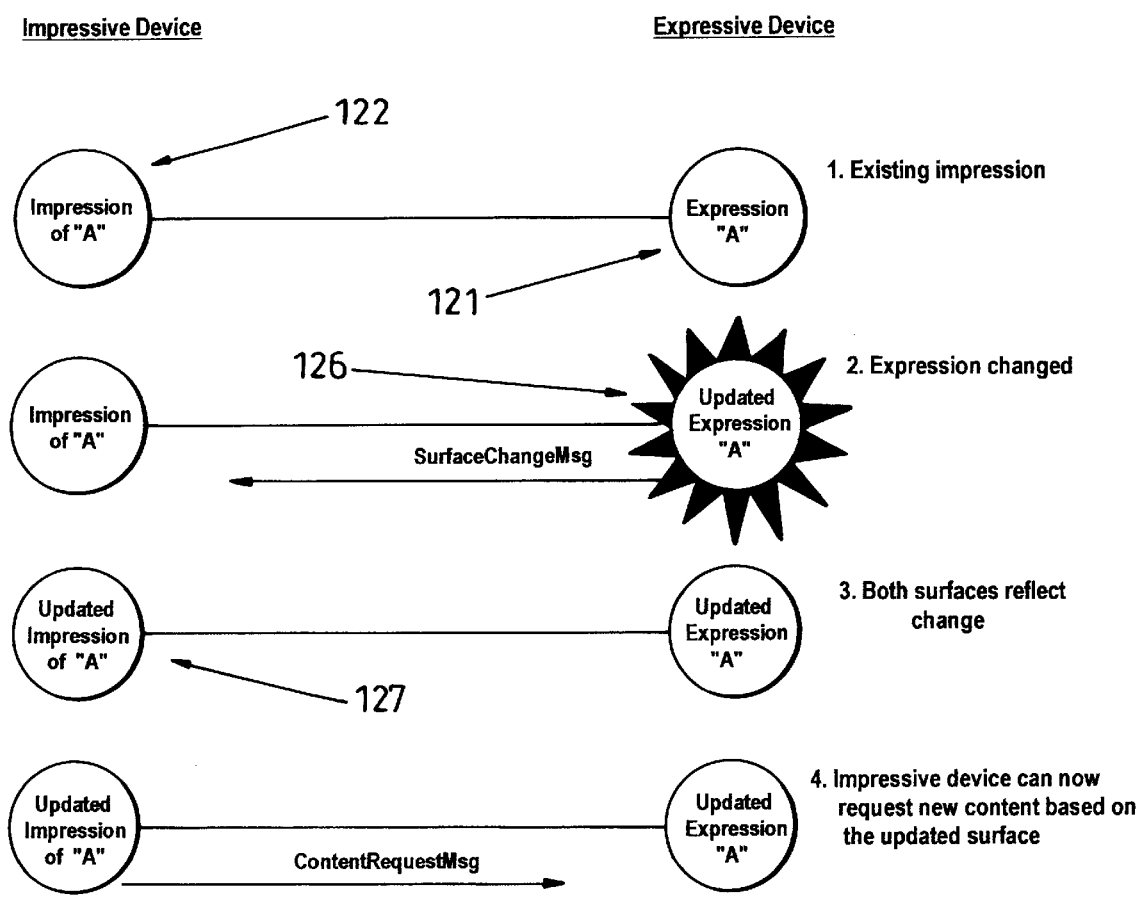
Figure 12J:
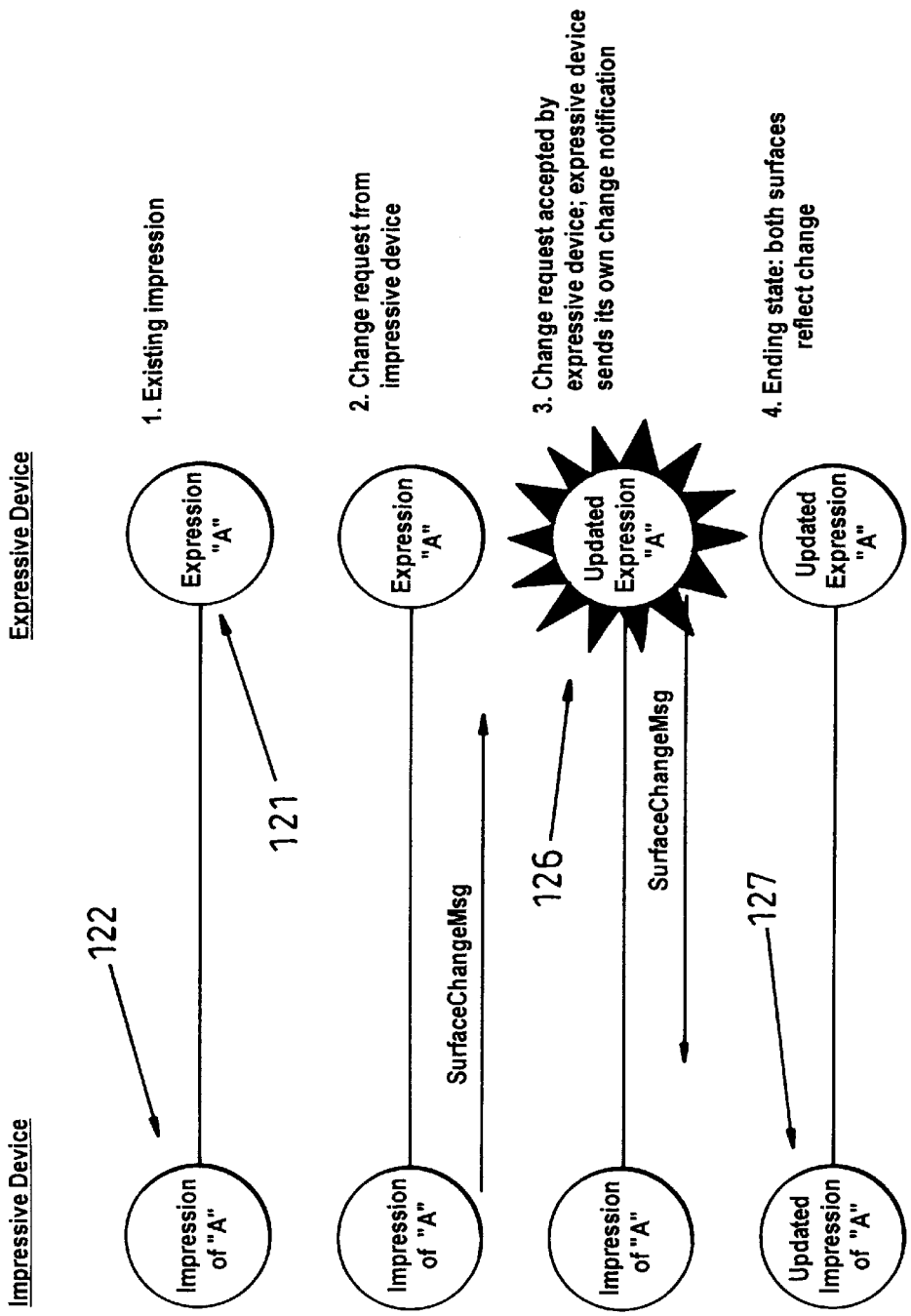

The properties of an expression surface may be set so that the impressive device may or may not be able to change the expression surface (the expressive device can always do this). FIG. 12i shows a change of expression surface 126 by the expressive device. The change of expression surface is reflected by the sending of a SurfaceChangeMsg message from the expressive device to all impressive devices to indicate that there has been a change to the original expression. This will be followed, typically, by new content requests, and possibly even new description requests.

EXAMPLE 10

FIG. 12j

In this example, the impressive device requests a change to the original expression. Again, this is done by means of a SurfaceChangeMsg. This can be either allowed or rejected by the expressive device. If the change is accepted, the expressive device sends a further SurfaceChangeMsg to all impressive devices confirming the change to the requesting impressive device and notifying the remaining impressive devices. If the change is rejected, the expressive device notifies the requesting impressive device that the request failed.

Where a requesting impressive device has successfully requested a change to the expression, it will generally not need to request updated content (though other impressive devices may well need to do so). This is because the impressive device will normally be able to update its own content based on the description change that it asked of the expressive device.

EXAMPLE 11

FIG. 12k

Figure 12K:
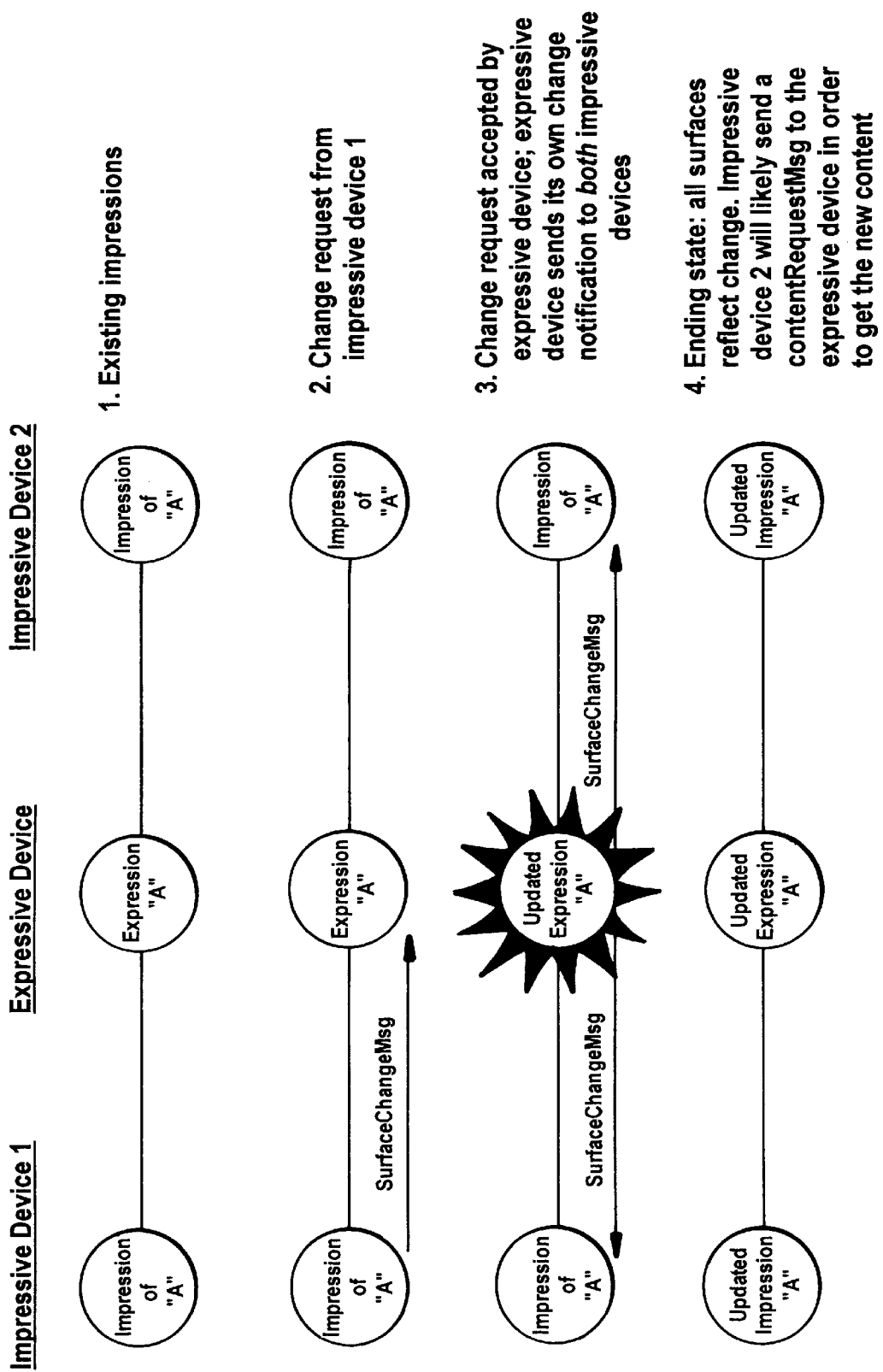

FIG. 12k shows explicitly a case in which there are two impressions of an expression, and a change request is made by one of the impressive devices and accepted by the expressive device. The same SurfaceChangeMsg message is generally sent by the expressive device to both impressive devices (although if the expressive device is sufficiently aware of the preferences of the impressive devices, it is possible that SurfaceChangeMsg messages specifically adapted to the requirements of each impressive device could be provided), and the ending state is that all surfaces reflect the change: the second impressive device (which did not request the change) will probably send a ContentRequestMsg to the expressive device to obtain new content.

The JIP runs over the JetSend Session Protocol (JSP). As discussed above, the JSP manages all aspects of a session between two devices including creating and deleting sessions as well as deciding when a session has become unusable. The JSP also provides access to the basic addressing, reliable message transport protocols, and any other transport protocols used by the JIP.

An appliance can have a session started passively or it can actively start a session with another. In order for the JIP to have a session started passively, it must first instruct the JSP to listen for a session on a specific transport. Once the JSP is listening on that transport, another appliance can then actively start a session by instructing the JSP to call that device on the specific transport. If a connection is made, the remote and local JSPs will negotiate to a supported version of the JSP and at that point both JIPs should be notified that a session has been established. JSP will provide the JIP with session-handles that map to this session. These session-handles should be used whenever the JIP specifically needs to reference the session, such as when the JIP wishes to end the session.

An implementation of the JIP will potentially maintain quite a lot of state about surfaces related to a given session. Under some circumstances the JSP may terminate a session whilst devices still have outstanding impressions, requests and content data. This may occur, for example, when a device is powered down or when there is a network failure that causes the JSP to delete the session. When the JIP is unexpectedly notified of the end of a session it must then clean up its local state relating to that session so that no artefacts that have meaning only in the context of the session remain. For instance, the local JIP will not receive any SurfaceReleaseMsgs telling it that its outstanding impressions have been released and thus will have to clean up its internal state. The same is true of any outstanding ContentRequestMsgs, DescriptionRequestMsgs, etc.

The JIP exchanges its messages over channels provided and maintained by the JSP. These message channels must be reliable and ordered. An implementation of JSP may provide various other types of channels, such as a stream-channel.

The message channels can be created once a session has been established between two appliances. Once a session has been established, it is the responsibility of the active JIP to request that the first message channel be opened. Accordingly, it is the responsibility of the passive JIP to be listening for a channel. Thus, it is suggested that the passive JIP instruct the JSP to listen for a channel as soon as a connection is established. The functionality of calling, closing, and listening for channels is provided by the JSP. Note that an active call to open a channel should not be issued by the JIP until the JSP gives notification that the remote device is passively listening for a channel.

Once the JSP has negotiated for and opened a message channel, it will provide a handle to this channel to the JIP. The JIP can then use this channel to send and receive messages. This channel is valid until it has been closed, either by a network failure or by an explicit call to do so. Once a session has been established and a message channel has been opened, either side of the connection can request that additional channels be opened. These additional channels may be opened on any of the transports supported by the JSP.

In addition to sending content-data across the message channel, the JIP allows for content-data to be sent across any specific channel supported by the two appliances. Both the ContentRequestMsg and the ContentReplyMsg contain a field that relates to the choice of channel over which the content-data will flow. The JSP's CEXTLSN message contains information specifying which types of channels are available for opening.

To illustrate, take the example of the JIP/JSP running on an IP network. Here, two types of channels could be supported by the JSP: message channels using RMTP and stream channels using TCP. After the session is established and a message channel has been created, various JIP messages may be sent back and forth. The ContentRequestMsg can specify that the actual content-data be sent over a specific existing channel, any message channel, or any channel of any type.

The sequence is as follows. First, the receiving appliance issues a ContentRequestMsg to the source appliance. If the receiving device wants to receive data on an already existing channel with the source device, it can specify this in the request by including the source device's channel identifier that maps to that specific channel. (This identifier can be found in the JSP's CASYN message related to the creation of that channel.) If instead it wants to receive the content on any message channel, it uses a 0 as the channel identifier. Lastly, if it does not care what channel or channel type the data should come over on it uses a −1 value as the channel identifier.

The source device receives the ContentRequestMsg. If the request specifies a specific channel, the source device must send its content over that JSP channel. If the request specifies that the data come over a message channel, the data must be sent over an existing message channel. Lastly, if the request indicates the receiver does not care what channel the data is to be sent over, the source device can then either use an existing channel (of any type) or open a new channel (of any type) with the receiver and send the data over it.

The way JIP sends content across JSP stream channels is different from the way in which it sends content across message channels. All content-data sent by the JSP across message channels is sent in the form of CHN messages. When sending content across as messages, the JIP uses ContentReplyMsg that includes the actual content-data. This ContentReplyMsg is passed down to the JSP. The JSP in turn sends it out in the form of CHN messages. Based on the total size of the content, JIP may send one or more of these ContentReplyMsg messages in order to complete the requested delivery of content.

In the case where the JIP is to send the content over a stream channel, however, no ContentReplyMsg is used. Rather, JIP passes the raw content down to the JSP in order to be sent out.

This mechanism of specific channel selection allows devices full control over when special channels, such as stream channels, are used and when they get set up. Devices can use and reuse any open channel for content transfers, and are not forced to open separate channels for each request, page, job or the like.

To allow for proper data exchange between appliances, it is required that all JIP messages be sent and received on a 4-byte boundary. This constraint will force NULL-padding to be added to the end of certain JIP message headers. For certain variable-length JIP message-headers, such as the SurfaceMsg, this padding-size will vary. However, the JIP message fields themselves are not required to fall on 4-byte or even-byte boundaries within the header. This forces the implementation of the JIP to perform its packing/unpacking of messages in such a way as to avoid any problems that odd alignment might present.

Certain message headers contain variable-length ASCII-string values. There is a maximum value defined for each of these fields, and this value will be given in the appropriate message description below. For every message field which contains a numeric value, the said value shall be in network byte order (i.e. big-endian). Lastly, in every message header there is a Protocol Version field.

Each message of the JetSend Interaction Protocol will now be specified in detail SurfaceMsg (Impress)

This message is used in three situations: first to initiate a transfer of a surface from the expressive device to another device. Secondly it is used as the response to a SurfaceRequestMsg from another device. Thirdly it is used to reject a SurfaceMsg from an expressive device. A status field is set to indicate which interpretation is to be used.

When this message is used either to initiate a surface transfer or as a response to a surface request, the sending device creates an entry in its surface table, so the impressive device can be notified of any changes.

On receipt of the message, if the destination chooses to accept the impression, it creates an entry in its surface table associating the impression with the expression. This allows it to notify the expressive device subsequently of when it wants to request changes to the surface or when it has finished with it. If the destination chooses not to accept the impression, then it should send back a release message to reject it and not create a table entry. Any subsequent messages relating to the "impression" should then be ignored.

When a sending device receives a release message for an impression it should delete the entry relating to the impression from its table. This ensures that the device which released the impression will not receive any messages related to the impression.

There is a short period between the sending of an impression and the receipt of a release message rejecting it. During this period the expressive device may consider the impression to exist. This will not cause any practical problem, as the issue will be resolved at the receiving end: the "impressing device" is required to ignore messages relating to impressions which it has not accepted, or which it no longer has.

Message fields are as follows:

TABLE 3

SurfaceMsg message fields

| Field | Type | Use |
| --- | --- | --- |
| Message type | Unsigned 8-bit integer | Type of message |
| Protocol version | Unsigned 8-bit integer | Interaction-Protocol version number |
| Source surface identifier | Unsigned 32-bit integer | Identifier of expression |
| Source surface class | Unsigned 32-bit integer | Class of expression |
| Source surface version | Unsigned 32-bit integer | The current version number of the surface |
| Source surface properties | Unsigned 32-bit integer | The properties of the surface A bit mask. |
| Target surface identifier | Unsigned 32-bit integer | Identifier of target expression |
| Reserved | 2-byte | Reserved for later use. Must be set to NULL. |
| Status | Unsigned 16-bit integer | The status for impresses and impress requests |
| Request identifier | Unsigned 16-bit integer | The request identifier if this impress resulted from a request |
| Reserved | 2-byte | Reserved for later use. Must be set to NULL. |
| Impress identifier | Unsigned 32-bit integer | A unique identifier for this impress message |
| Source surface name length | Unsigned 16-bit integer | Length of expression name in bytes |
| Source surface name | Sequence of bytes | Name of expression |
| Target address length | Unsigned 16-bit integer | Length of the target address in bytes |
| Target address | Session Protocol address (sequence of bytes) | Address of target device |

These fields will now be briefly discussed, where not obvious or previously discussed. Message type: the message type uniquely identifies this message from the other messages in the protocol. The message type field for the impress message should be set to 0x00.

Source surface identifier: this is an identifier allocated by the expressive device to the surface which is unique for the time between when the first impression is created and the last impression is unimpressed. This identifier is used by the protocol to identify a surface uniquely. The values 0 and 1 reserved: 0 meaning a NULL surface and 1 being used to designate the "default target" surface expression (used for the work surface, as discussed above).

Source surface class: this is the class of the source surface. Class is used to determine the use of the surface. The legal class values are indicated in Table 4 below.

TABLE 4

Class values for surfaces

| Value | Symbol | Meaning |
| --- | --- | --- |
| 1 | OTHER | Other surface |
| 2 | SELF | Self surface |
| 3 | IN | In surface |
| 4 | STAT | Status surface |
| 5 | ADDR | Address surface |

The use of each class is addressed further below in the discussion of interaction policies. Future embodiments (versions) of the protocol may add new values to this field. It is possible that devices will not be able to handle specific classes of surface: such devices may be configured either to ignore all such surfaces or to treat all surfaces of that class as surfaces of a different class which the device is configured to handle.

Source surface version: this is the current version of the surface. The protocol maintains a version number for each surface in use. This is updated each time the expressive device changes the surface.

Source surface properties: these are the properties of the surface being impressed. The values for this field and their associated meanings are set out in Table 5 below.

TABLE 5

Properties of surface impressed with SurfaceMsg

| Value | Meaning |
| --- | --- |
| 1 | The expressive device will respond to a SurfaceMsg on this surface |
| 2 | The expressive device will accept a SurfaceChangeMsg from an impressive device |

This could be extended in other implementations by adding a value of 3, for which the expressive device will both respond to a SurfaceMsg and accept a SurfaceChangeMsg.

Target surface identifier: this field contains the surface identifier for the target surface. If this value is set to 1, then the target is assumed to be the default target surface, or work surface, of the destination. Otherwise, this field must contain the surface identifier from an earlier impression of a target surface.

Reserved: bytes reserved for possible later use must in this implementation be set to NULL.

Status: this field identifies the status of this SurfaceMsg. The following values are defined:

TABLE 6

Defined values for SurfaceMsg status

| Value | Meaning |
| --- | --- |
| 0 | This is an unsolicited SurfaceMsg |
| 1 | This is an impress in response to a SurfaceRequestMsg. The request identifier field is set to the corresponding request identifier |
| 2 | This is a rejection of a previous SurfaceRequestMsg. The request identifier field is set to the corresponding request identifier |

Request identifier: for a SurfaceMsg which is a result of a previous SurfaceRequestMsg, this field will be set to the request identifier contained in the corresponding surface SurfaceRequestMsg. For all other situations this field should be set to 0.

Impress identifier: this is a unique identifier that is allocated by the expressive device. It can be used to distinguish between different impressions of the same surface. Note that this identifier need only be unique for each impression of a surface. Impressions of other surfaces may use the same identifier. Thus, while expression identifiers are unique across all local surfaces, an impress identifier need only be unique within the set of impressions related to a specific local surface.

Source Surface Name Length: this is length in bytes of the Null-terminated ASCII string source surface name (including the NULL byte). The maximum value for this field is 64.

Source Surface Name: this is the surface name of the surface being impressed. The name must be a NULL-terminated sequence of Ascii characters.

Target Address Length: this is the length in bytes of the NULL-terminated target address string (including the NULL byte). The maximum vale for this field is 256.

Target Address: the target address is the Session Protocol address of the target device. Impress operations always have a target device and a target surface. In most transactions only a source and a target are involved. However the protocol allows one device to impress an impression from a second device onto an impression from a third device. In this case the third device can only be identified by its JetSend Session Protocol address. Hence the protocol allows an explicit specification of the target devices Session Protocol address. In the case where the target address is the same as the destination of the SurfaceMsg the address length field should be set to 0 and no target address should be included.

The use of SurfaceMsg in response to other messages is summarised in Table 7 below.

TABLE 7

SurfaceMsg in response to other JIP messages

| In response to: | Purpose | Explanation |
| --- | --- | --- |
| No Message | Create an impression | An expressive device can create an impression on another device by sending an unsolicited SurfaceMsg. The impressive device may then either keep the impression, or it can reject it by immediately releasing it with a SurfaceReleaseMsg reply. |
| SurfaceRequestMsg | Create an impression | An expressive device may create an impression by sending a SurfaceMsg to an impressive device in response to a SurfaceRequestMsg from that impressive device. |
| SurfaceRequestMsg | Reject a request for impression | An expressive device may reject a SurfaceRequestMsg by responding with a SurfaceMsg whose status reflects that this is a rejection. |

SurfaceDeleteMsg (Delete)

This message is used by an expressive device to notify impressive devices that the expression has been deleted. When an expressive device deletes an expression, it must notify all impressive devices which hold an impression of the delete. It should also delete the entries for the expression and all impressions of it from its surface table. It must ignore any subsequent messages relating to the expression or any of its impressions.

When an impressive device receives a delete message, it should delete all entries relating to impressions of the deleted surface from its surface table. It should no longer generate any messages relating to these impressions.

There will be a short period between the expressive device issuing this message and the impressive device receiving it and deleting the impression from its surface table. The impressive device may therefore send messages relating to the expression during this period, but no practical difficulty results as the expressive device will ignore any messages relating to expressions that it has deleted.

The fields of the message are set out in Table 8 below.

TABLE 8

Message fields for SurfaceDeleteMsg

| Field | Type | Use |
| --- | --- | --- |
| Message type | Unsigned 8-bit integer | Type of message |
| Protocol version | Unsigned 8-bit integer | Interaction Protocol version number |
| Deleted expression identifier | Unsigned 32-bit integer | The identifier of the deleted expression |

Message type: the message type field for the SurfaceDeleteMsg should be set to 0x01.

Deleted expression identifier: this is the surface identifier of the surface which the expressive device is deleting. The expressive device will ignore any subsequent messages containing this surface identifier. As the protocol is asynchronous, there may be messages referring to this surface which are still in the network.

SurfaceReleaseMsg (Unimpress)

This message is used by an impressive device to notify the expressive device that the impression has been unimpressed. When an impressive device no longer requires an impression, it deletes it from its surface table and sends the expressive device a SurfaceReleaseMsg message. The impressive device must then ignore all messages relating to the deleted impression. It is possible that a device has multiple impressions of the same surface: in this case, the impressive device will only ignore messages where they relate specifically to the unimpressed impression.

When an expressive message receives such a message, it should delete the entry relating to that specific impression from its surface table. It should no longer send any messages relating to that impression to the relevant impressive device.

There will be a short period between the impressive device issuing this message and the expressive device receiving it and deleting the entry from its surface table. The expressive device may therefore send messages relating to the impression during this period, but no practical difficulty results as the impressive device will ignore any messages relating to expressions that it has unimpressed.

TABLE 9

Message fields for SurfaceReleaseMsg

| Field | Type | Use |
| --- | --- | --- |
| Message type | Unsigned 8-bit integer | Type of message |
| Protocol version | Unsigned 8-bit integer | Interaction Protocol version number |
| Unimpressed expression identifier | Unsigned 32-bit integer | The identifier of the unimpressed expression |
| Unimpressed impress identifier | Unsigned 32-bit integer | The impress identifier from the original SurfaceMsg that created the impression. |

Message type: the message type field for the SurfaceReleaseMsg should be set to 0x02.

Unimpressed expression identifier: this is the surface identifier for the expression of which an impression has been unimpressed by the impressive device. If this is the last remaining impression of the expression on the impressive device, then that device will ignore all subsequent messages involving this surface identifier.

Unimpressed impress identifier: each SurfaceMsg is allocated a unique identifier by the expressive device. This allows devices to distinguish between multiple impressions of the same surface. When an impression is being unimpressed, the use of the impress identifier in the SurfaceReleaseMsg allows the expressive device to determine which impression was unimpressed.

The use of SurfaceReleaseMsg in response to other messages is summarised in Table 10 below.

TABLE 10

SurfaceReleaseMsg as response to other messages

| In response to: | Purpose | Explanation |
|---|---|---|
| SurfaceMsg | Releases an impression | An impressive device can notify the expressive device that it is no longer interested in the impression. The impressive device may send this message at anytime after receipt of the corresponding SurfaceMsg that "created" the impression. |
| SurfaceMsg | Rejects an impression | An impressive device can "reject" an impression by immediately responding to the SurfaceMsg with a SurfaceReleaseMsg. |

SurfaceRequestMsg (Surface Request)

This message is used by a device to request an impression from another device. The message requests one device to create an impression on the requestor. The name may or may not be a valid surface name on the remote device. If the name is valid, the remote device should create an impression on the requester: if the name is not valid, the request should be rejected. The target surface identifier must be a valid identifier for an expression of which the remote device has an impression: otherwise, the request will be rejected.

When an expressive device receives a surface request, it should if necessary create the requested surface and use the impress message to impress it on the requesting device. Alternatively if the request is invalid, the expressive device should reject the request. The request identifier in the impress or reject message must be the same as the request identifier in the original request message.

TABLE 11

Message fields for SurfaceRequestMsg

| Field | Type | Use |
|---|---|---|
| Message type | Unsigned 8-bit integer | Type of message |
| Protocol version | Unsigned 8-bit integer | Interaction Protocol version number |
| Source surface name length | Unsigned 16-bit integer | The length of the following name |
| Source surface name | Sequence of bytes | The name of the expression for which an impression is being requested |
| Source surface class | Unsigned 32-bit integer | The class of the expression for which an impression is being requested |
| Target surface identifier | Unsigned 32-bit integer | The identifier of the target surface |
| Request identifier | Unsigned 16-bit integer | A unique identifier to identify this request |
| Reserved | 2-bytes | Reserved for later use. Must be set to NULL. |

Message type: the message type field for the SurfaceRequestMsg should be set to 0x03.

Source surface name length: this is the length in bytes of the NULL-terminated ASCII string source surface name (including the NULL byte). The maximum value for this field is 64.

Source surface name: this is the name of the surface of which the device wants an impression. The name is a NULL-terminated ASCII string.

Source surface class: this is the class of the surface of which the device wants an impression. Two expressions may have the same name, and be distinguished by their respective classes.

Target surface identifier: this is the identifier of the surface to be used as a target for the SurfaceMsg, or impression, being requested. The expressive device must have an impression of this surface to be able to impress the requested surface successfully. This target-surface identifier may be set to the "default" target surface (1), for which all devices implicitly have an impression.

Request identifier: this identifier is allocated by the protocol and uniquely identifies this SurfaceRequestMsg from any other requests for the same surface.

Use in relation to other JIP messages is summarised in Table 12.

TABLE 12

SurfaceRequestMsg as response to other messages

| In response to: | Purpose | Explanation |
|---|---|---|
| No Message | Request an impression | An impressive device can solicit an impression by sending a SurfaceRequestMsg to another device. The device that receives this message may respond with a SurfaceMsg that either grants the request or rejects it. |
| SurfaceMsg | Request an impression of a "child-surface" | The surface description of an impression may contain references to sub-surfaces or "child-surfaces." The impressive device can request that these child-surfaces be impressed by sending a SurfaceRequestMsg to the expressive device. |

DescriptionRequestMsg (Description Request)

This message is used by an impressive device to request the description for a surface of which the device has an impression. The impression identifier must be a valid impression held by the requesting device. When the expressive device receives a request for further description it should use the description reply to return the requested description. Description requests may not be rejected, although the resulting reply may contain no data.

TABLE 13

Message fields for DescriptionRequestMsg

| Field | Type | Use |
|---|---|---|
| Message type | Unsigned 8 bit integer | Type of message |
| Protocol version | Unsigned 8-bit integer | Interaction Protocol version number |
| Impression surface identifier | Unsigned 32-bit integer | The impression identifier of the surface for which a description is being requested |
| Request identifier | Unsigned 16-bit integer | A unique identifier allocated to this request by the device making the DescriptionRequestMsg |
| Reserved | 2-byte | Reserved for later use. Must be set to NULL. |

Message type: the message type field for the DescriptionRequestMsg should be set to 0x04.

Impression surface identifier: this is the impression identifier to the surface for which a description is being requested.

Request identifier: this is a unique identifier allocated by the requesting device to identify this DescriptionRequestMsg from other requests for descriptions it may issue,

TABLE 14

DescriptionRequestMsg as response to other messages

| In response to: | Purpose | Explanation |
|---|---|---|
| SurfaceMsg | Request the description of the surface | Once a device has an impression, it may request that the expressive device provide the description of that surface by sending a DescriptionRequestMsg. This message is generally sent by the impressive device in the case where the description contained within the original SurfaceMsg was not complete. However, this message can be sent at any time after creation of an impression. |

DescriptionReplyMsg (Description Reply)

This message is used to return a description for a surface in response to a DescriptionRequestMsg message. The result of a bad request should contain no data, indicating that there is no more description for that specific request. There is no possibility of "rejecting" a description request, as a device which provides an impression of a surface has to be prepared to provide a complete description of that surface. The description reply must contain the request identifier from the description request to which it is a response.

TABLE 15

Message fields for DescriptionReplyMsg

| Field | Type | Use |
|---|---|---|
| Message type | Unsigned 8-bit integer | Type of message |
| Protocol version | Unsigned 8-bit integer | Interaction Protocol version number |
| Impression surface identifier | Unsigned 32-bit integer | The impression identifier for the surface for which a description is being supplied |
| Request identifier | Unsigned 16-bit integer | The Request identifier from the corresponding DescriptionRequestMsg |
| Reserved | 2-byte | Reserved for later use. Must be set to NULL. |

Message type: the message type field for the surface request message should be set to 0x05.

Impression surface identifier: this is the impression identifier of the surface for which a description is being returned.

Request identifier: this is the request identifier from the DescriptionRequestMsg to which this message is a response.

TABLE 16

DescriptionReplyMsg as response to other messages

| In response to: | Purpose | Explanation |
|---|---|---|
| DescriptionRequestMsg | Sends the description of a surface. | An expressive device may receive a DescriptionRequestMsg from a device that has an impression. The DescriptionRequestMsg is generally sent in the case where the description contained in the original SurfaceMsg was not complete. Upon receipt of a DescriptionRequestMsg, the expressive device will respond with a |

TABLE 16-continued

DescriptionReplyMsg as response to other messages

| In response to: | Purpose | Explanation |
|---|---|---|
| | | DescriptionReplyMsg containing the description of the surface whose description was requested. |

ContentRequestMsg (Content Request)

This message is used by an impressive device to request some content data from an expressive device. The impression identifier must be a valid impression held by the requesting device.

The sending device may request the content data to be exchanged over a stream connection. When a device receives such a content request it should create the new stream if requested, and then send the content back on that stream. If the receiving device does not support streams, it may instead revert to sending back the content as a series of content reply messages. Accordingly, if the requesting device requests transfer over a stream, it must be prepared to receive the content either over a stream or as a series of content reply messages.

TABLE 17

Message fields for ContentRequestMsg

| Field | Type | Use |
|---|---|---|
| Message type | Unsigned 8-bit integer | Type of message |
| Protocol version | Unsigned 8-bit integer | Interaction Protocol version number |
| Source surface identifier | Unsigned 32-bit integer | The expression identifier of the surface for which content is being requested |
| Request identifier | Unsigned 16-bit integer | A unique identifier allocated to this request by the requesting device. |
| Reserved | 2-byte | Reserved for later use. Must be set to NULL. |
| Channel Request identifier | Signed 16-bit integer | A handle to use for stream based content transfer |

Message type: the message type field for the ContentRequestMsg should be set to 0x06.

Source surface identifier: this is the expression identifier of the surface for which the content is being requested.

Request identifier: this is a unique identifier which is allocated by the requesting device to identify this ContentRequestMsg from other requests for content it may issue.

Channel Request Identifier: this is the identifier for a specific channel, such as a stream channel, on the remote device, which should be used to write the reply to this content request. A positive number indicates a valid channel, which already exists. This number should be the actual channel identifier of the remote device. 0 indicates that the content data should be sent via content messages over an existing message channel. A negative number indicates the receiver would like the content data sent over a new stream.

Use of this message in response to other JTP messages is summarised in Table 18 below.

TABLE 18

ContentRequestMsg as response to other messages

| In response to: | Purpose | Explanation |
| --- | --- | --- |
| SurfaceMsg | Requests content from a surface | Once a device has an impression, it may request that the expressive device provide the content "contained" by that surface. The impressive device does this by sending a ContentRequestMsg to the expressive device. This message can be sent at anytime after receipt of a SurfaceMsg that creates an impression. |

ContentReplyMsg (Content Data)

This message is used by an expressive device to send some content data to an impressive device. There may be a sequence of content data messages in response to a single content request. This message is also used to reject a request for content data.

If the content provider is providing the data over a stream, it sets the stream field to the stream identifier and leaves the content length and data empty. If the content provider does not support streams, or is unable to use a stream for this purpose, it sets the stream identifier to 0 and transmits the content data as a series of content reply messages: in this case, the content length and data are used to convey the contents of the message.

Typically, the ContentReplyMsg will only be used to reject a content request if the content provider can no longer satisfy the request for internal reasons, or if the request is invalid.

In all cases, the request identifier in the reply must be set to the request identifier contained in the original request.

When a device receives a content reply it must first determine if the reply is a rejection. If so, the device has to make a decision as to its next action. If the reply is not a rejection, then the device must determine if the content is being supplied over a stream or not. If the content is being supplied over a stream, it should be read from there: if not, then the content should be read from this and subsequent replies which have the same request identifier (as transport is ordered such replies will be in sequence, and the status field will identify the final reply in the series).

TABLE 19

Message fields for ContentReplyMsg

| Field | Type | Use |
| --- | --- | --- |
| Message type | Unsigned 8-bit integer | Type of message |
| Protocol version | Unsigned 8-bit integer | Interaction Protocol version number |
| Source surface identifier | Unsigned 32-bit integer | The expression identifier of the surface for which content is being sent |
| Request identifier | Unsigned 16-bit integer | The request identifier from the corresponding ContentRequestMsg |
| Reserved | 2-byte | Reserved for later use. Must be set to NULL. |
| Reserved | 2-byte | Reserved for later use. Must be set to NULL. |
| Status | Unsigned 16-bit integer | The status of this message |

TABLE 19-continued

Message fields for ContentReplyMsg

| Field | Type | Use |
| --- | --- | --- |
| Channel identifier | Signed 16-bit integer | The receiver's channel identifier on which the data is being sent |

Message type: the message type field for the ContentReplyMsg should be set to 0x07.

Source surface identifier: the expression identifier of the surface whose content data this is.

Request identifier: this is the request identifier from the original ContentRequestMsg for which this is a reply.

Status: this field indicates the status of the message. The legal values are set out in Table 20 below.

TABLE 20

Legal values of the status field for ContentReplyMsg

| Value | Meaning |
| --- | --- |
| 0 | This is a ContentReplyMsg containing content data - there will be more blocks coming for this request |
| 1 | This is the last ContentReplyMsg with data for this request id. |
| 2 | This is a ContentReplyMsg rejecting the corresponding content request. The content data will be empty. |

Channel identifier: the channel identifier of the receiver on which the content data is being sent. A positive number indicates a specific channel, while a 0 or a negative number indicates that content data is being sent as messages over an arbitrarily selected message channel.

Use of ContentReplyMsg in response to other JIP messages is set out in Table 21 below.

TABLE 21

ContentReplyMsg as response to other messages

| In response to: | Purpose | Explanation |
| --- | --- | --- |
| ContentRequestMsg | Sends content to requesting device | An impressive device requesting content will send a ContentRequestMsg to the expressive device. If the ContentRequesMsg signals that the data should come over a message channel, the expressive device can then send the requested content through the use of the ContentReplyMsg. The expressive device may send one or more ContentReplyMsgs to satisfy the request. |
| ContentRequestMsg | Rejects the request for content | An expressive device may reject the request for content by sending a ContentReplyMsg with the status value field of the header set to 2 across the message channel. Note that this is the procedure used for rejecting all content-requests, including those requesting that the data be sent over a stream channel. |

When JIP sends content over JSP stream channels, ContentReplyMsg is not used for sending the content. Instead, the JIP passes the raw content to the JSP for sending across the specified stream channel.

In a stream content-transfer, when the JIP has sent the last block of data that corresponds to the content-request it then closes the stream to signal the end of content transfer for that request.

Figure 13:
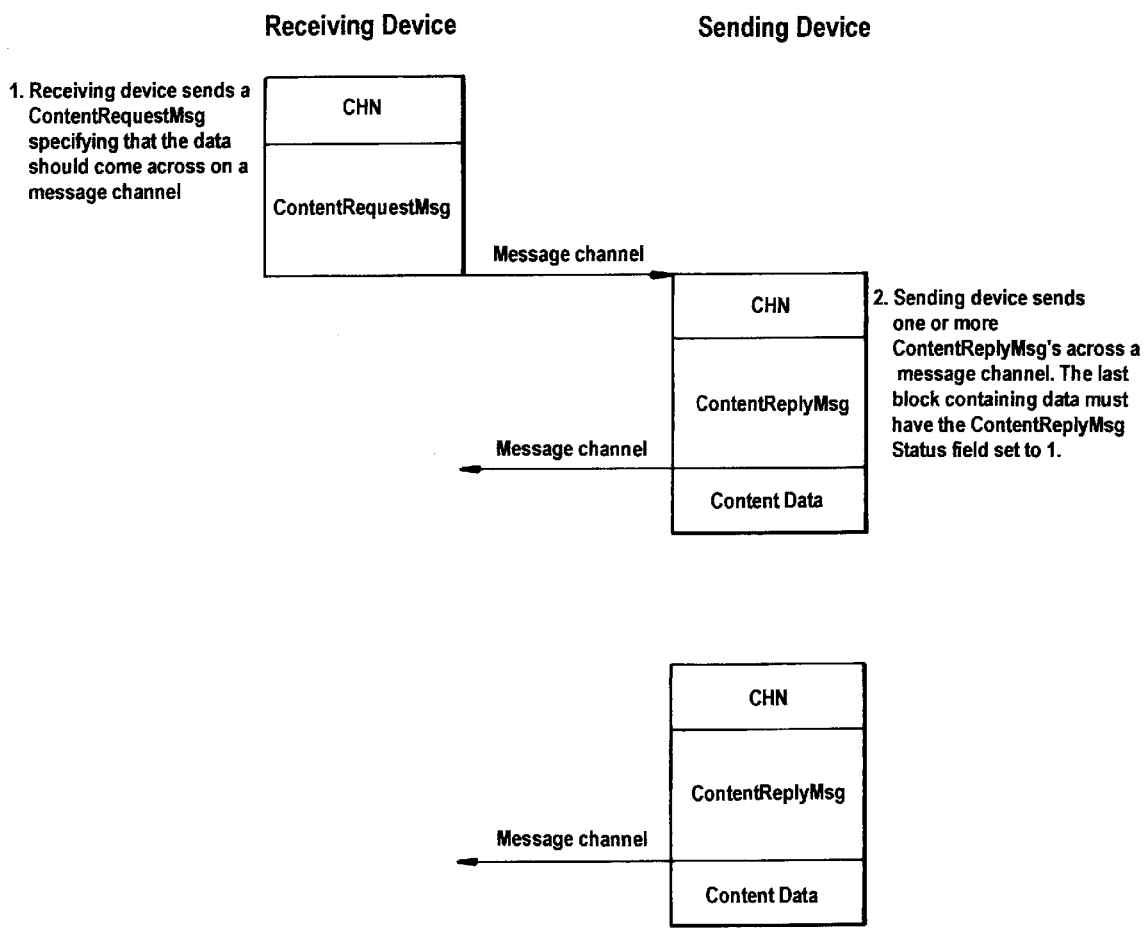
FIG. 13 shows content provision on a message channel.
Figure 14:
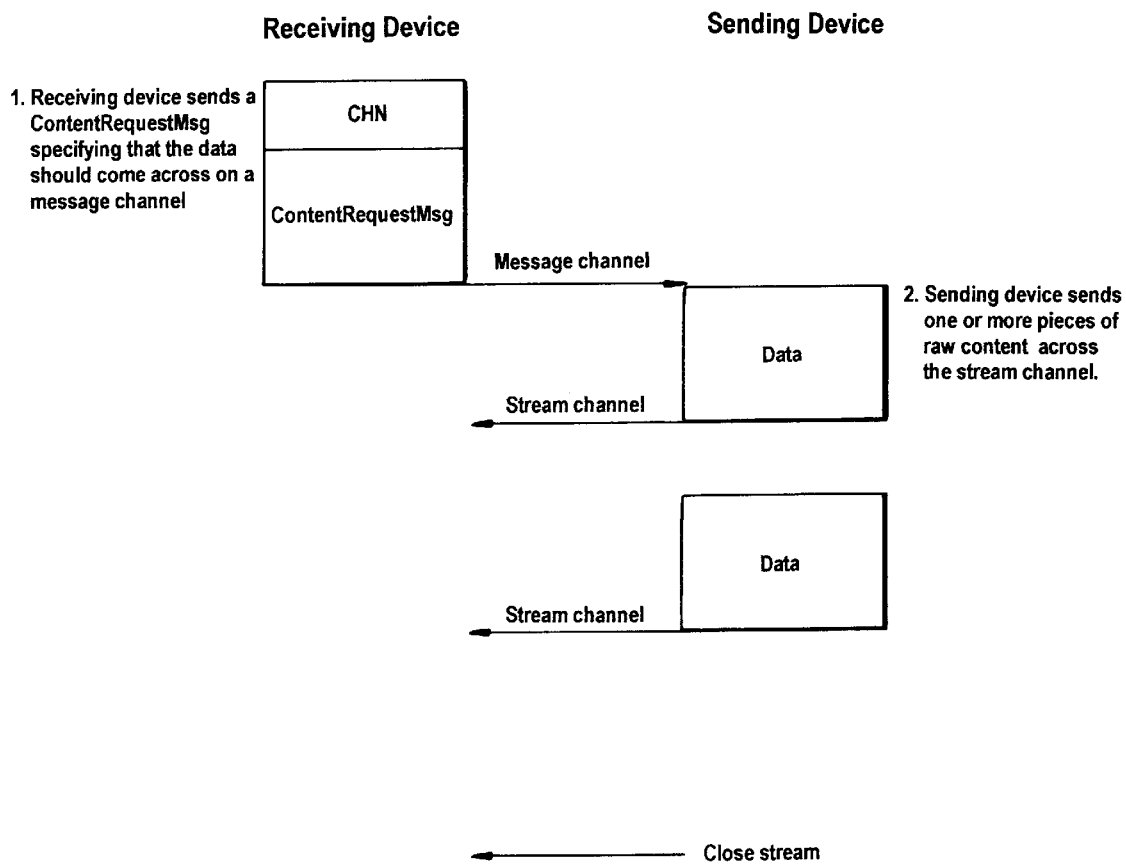
FIG. 14 shows content provision on a stream channel.

Content provision on a message channel is illustrated in FIG. 13. Provision of content on a message channel is requested by the receiving device, and is provided by a series of ContentReplyMsg messages, of which the final one has the status field set to 1. Content provision on a stream channel is shown in FIG. 14. Provision of content on a stream channel is requested by the receiving device, and is provided as raw content over the stream channel. The end of the content is signalled by the sending end closing the stream.

SurfaceChangeMsg (Change)

This message is used for three purposes: first, by an expressive device to notify impressive devices of a change to a surface; second, by impressive devices to request a change to an expression; and third, to notify an impressive device of a failed request to change an expression.

When an expressive device makes a change to one of its expressions, it must notify all impressive devices of the change. It does this by looking up the impressions in its surface table and sending each impressive device a change message. Where a device has multiple impressions, it is not necessary for a change message to be sent for each impression: the impressive device maintains a link between the expression and the impressions.

When an impressive device receives a change message, it needs to perform the change on each of its impressions of the changed expression. In some cases the change message contains the change itself, whereas at other times the message may only contain a notification and the impressive device has to re-fetch the content for the changed surface. If the expressive device knows the encoding of content required by each impressive device, then the expressive device can be configured to provide separate change messages each containing the content in the form required by the relevant impressive device.

When an impressive device wants to make a change to one of its impressions, it must use the change message to send a request for the change to the expressive device. The impressive device must include in the message the version of the expression to which the requested change applies.

On receiving a change request message, an expressive device must decide whether to accept the change or reject it. The decision can be based on the version and the nature of the request. An expressive device notifies the requestor as to whether the change is accepted or rejected through a change message with the appropriate status set. The expressive device also notifies all the impressive devices of an accepted change using the change message, as previously described.

An impressive device which issues a successful change request will thus receive two notifications of the change, one being the change acceptance (sent specifically to it), and the other is the change notification, which is sent to all devices with impressions of the expression. These messages can be identified as relating to the same change from either the request identifier or the version information.

TABLE 22

Message fields for SurfaceChangeMsg

| Field | Type | Use |
| --- | --- | --- |
| Message type | Unsigned 8-bit integer | Type of message |
| Protocol version | Unsigned 8-bit integer | Interaction Protocol version number |
| Changed surface identifier | Unsigned 32-bit integer | The expression identifier of the surface being changed |
| Original surface version | Unsigned 32-bit integer | The version number of the surface at the time the change was made |

TABLE 22-continued

Message fields for SurfaceChangeMsg

| Field | Type | Use |
| --- | --- | --- |
| New surface version | Unsigned 32-bit integer | The version number of the surface after the change has been made |
| Reserved | 2-byte | Reserved for later use. Must be set to NULL. |
| Status | Unsigned 16-bit integer | The status of the change message |

Message type: the message type field for the SurfaceChangeMsg should be set to 0x08.

Changed surface identifier: this is the expression identifier of the surface being changed.

Original surface version: each surface has a version number to allow an expressive device to determine what version of a surface is being changed and what state impressions of a surface are in. This field contains the version number of the surface before this change was applied New surface version: when an expressive device issues a SurfaceChangeMsg to notify impressive devices of a change to a surface, this field contains the new version number of the surface after the change was applied. This allows the expressive device to skip version numbers. Otherwise this field should be set to 0.

Status: this field specifies the status of this change message. Legal values and their meanings are set out in Table 23.

TABLE 23

Legal values of status for SurfaceChangeMsg

| Value | Meaning |
| --- | --- |
| 0 | This is a notification from an expressive device of a change to the surface. |
| 1 | This is a request from an impressive for a change to a surface. |
| 2 | This is a rejection of a previous SurfaceChangeMsg. The change request can be identified from the surface identifier and the original version number. |

The use of SurfaceChangeMsg in response to other JIP messages is summarised in Table 24 below.

TABLE 24

SurfaceChangeMsg as response to other messages

| In response to: | Purpose | Explanation |
| --- | --- | --- |
| No Message/ SurfaceChangeMsg | Notifies impressive devices that an expression has changed | When an expressive device changes a local expression, it needs to notify all impressive devices that currently hold impressions of the surface that there has been a change. It does this by sending out a SurfaceChangeMsg to each impressive device. (Note that the expressive device may be changing the surface due to an earlier request for change described in a SurfaceChangeMsg sent from an impressive device.) |
| SurfaceMsg | Notifies expressive device that a change is requested. | The properties of an impression may be set such that the holder of the impression can request that the original expression be changed. The impressive device makes this request by sending a SurfaceChangeMsg to the expressive |
| SurfaceChangeMsg | Rejects an impressive device's | device. An expressive device may not wish to make the requested change described in a SurfaceChangeMsg that |

TABLE 24-continued

SurfaceChangeMsg as response to other messages

| In response to: | Purpose | Explanation |
|---|---|---|
| | change request | it has received. If this is the case, then it rejects the change-request by responding to the impressive device with a SurfaceChangeMsg of its own whose status value field has been set to 2. |

Interaction Policies are defined for certain common usages of the JIP. These Interaction Policies are not essential to function of the JIP, but are advantageous in that they allow for consistent and well-understood handling of a number of processes key to useful application of the information exchange rendered possible by the JIP.

The following policies are defined in the present implementation.

Session Policy—When to establish and disconnect sessions between devices.

Job Policy—How to send documents between senders and receivers.

Self Policy—How to exchange global information about a device such as label, icon and passwords.

Status Policy—How to give status about a device and about jobs.

Address Policy—How to program devices with new destination addresses.

Not all policies make sense for all devices. The discussion of individual policies indicate the types of device to which each apply. Policies are generally optional (with the exception that some form of Session Policy is required to ensure that two devices can connect and exchange information at all). If two devices support a particular policy they will exchange information implementing that policy. If only one device involved in a session supports a policy, that policy will be ignored.

A preferred minimum device implementation will involve a device supporting at least the Job Policy. It will be generally advantageous for devices to support at least the Self Policy and the device status part of the Status Policy also.

Typically, each policy relates to a group of surfaces of a given class (for example, the surfaces described in the Self Policy are of class SELF (value: 2). Within a given policy, surfaces of a given class are distinguished by name or by the context in which they appear. Such surfaces are here termed "well-known surfaces" because they have a known meaning to devices that exchange them.

For a given well-known surface, the policies define rules about the encoding that it must contain (for example, the "label" surface of the Self Policy must contain the vText encoding). Further details of such encodings are provided in the discussion of e-material further below. Each well-known surface can be represented graphically in summary form. Such a representation for a self surface is provided in FIG. 15. The representation indicates that the surface name must be "self", its class SELF and the surface encoding vplane. Clearly, this is simply a summary of key attributes: the SurfaceMsg used to impress such a surface will contain far more data.

Individual Interaction Policies are now described.

Session Policy

Devices open and close sessions using the JetSend Session Protocol. The Session Policy specifies when devices will open and close sessions. The basic principle is that the device opening the session also closes it. Typically, a session will be opened by a device initiating a transfer. JetSend can be used to establish sessions over a variety of transport protocols. The Session Policy adopted will be highly dependent on the underlying transport layer and the characteristics of its protocol. Direct connect protocols (such as IrDA and IEEE1284) are straightforward, as sessions are established by proximity or physical connection in an automatic manner and are closed when the devices are no longer in proximity. Similar considerations apply on small networks or busses (such as IEEE1394 or SCSI): all devices on the bus will automatically have a session established with each other, and explicit opening and closing of sessions is unnecessary. On large networks such as LANs and WANs where IP is used as transport protocol, it is necessary for sessions to be opened and closed explicitly when required. The considerations discussed below apply mainly to such networks.

Senders

Typically senders of information (such as a scanner seeking to send out information to say, a printer) will open sessions to receivers. This can be as a result of user action or for other reasons. The typical scenario is that the sender opens a session with a receiver, exchanges initial information, starts a job and when data has been transmitted, will close the session. While senders control opening and closing of sessions in this way, this is typically under the control of a user. The default session behaviour is that a sender will open a session just before commencing a job. The session is closed either when the job is done, or when the sender has finished observing the job status provided by the receiver. In some cases, sessions may be left open to allow the sender to monitor device status of a remote device.

Most senders will also listen for sessions and thus accept sessions from remote devices. For example, remote devices may wish to connect to observe the status of the sender. In the case of a pull operation (discussed further below under Job Policy), the receiver will open the session, request a document, and close the session: consequently, senders that allow devices to pull information must be listening for sessions to enable this behaviour.

Receivers

Typically, receivers will listen for sessions initiated by sending devices. They will exchange information with the sender when the session is established and wait for the remote device to start a job and end the session. In some cases, no job will be started (for example, the sender may merely be monitoring receiver device status), in which case the receiving device will wait until either the sender does send a job or closes the session. Receivers that pull information will open and close sessions as needed, as indicated above.

There may be resource management issues in acceptance of sessions from remote devices: receivers may have restrictions in the number of sessions that can be accepted. Receivers will thus generally need to ensure that access to other senders is not blocked: for example, the number of open sessions could be limited. If there is a resource management problem, when a new device requests to open a session and a currently connected device is not in the process of sending a job, the receiver may close the existing sessions and initiate the new one—however, if the currently connected device is sending a job, the receiver may reject the session request from the new device.

Some devices act as both sender and receiver, and will both listen for sessions and initiate sessions as described above. Some devices may neither send nor receive, but simply provide or observe status, exchange addresses or similar: such devices will open and close sessions as required by their operation.

Job Policy

The Job Policy is advantageous in allowing efficient sending of a document between devices. The Job Policy supports two ways of initiating a job between a sender and a receiver: "push", a sender initiated job, and "pull", a receiver initiated job. Apart from the initiation of a job, in either case the receiver essentially controls all subsequent aspects of the transfer, and the sender simply satisfies requests from the receiver.

A session must already have been established before the Job Policy can be used. The Job Policy involves a well-known surface termed the "in-surface", which the receiver provides to the sender. Whether the job is initiated by "push" or "pull" all receivers must at some point impress an in-surface onto devices that connect to them, which signals that they are able to receive documents. Devices that wish to send documents to receivers must wait until they receive the in-surface. Once they have received the in-surface, they use the surface handle of the in-surface as a target for the top-level surface of the document that needs to be sent. This operation is also known as starting a job. The job is considered finished when the sender or the receiver releases the top-level surface, or if the session between the two is closed.

FIG. 17 shows a pictorial representation of an in-surface. The class of an in-surface must by IN (3). Its name and encoding are determined by the transmitter of the in-surface (the transmitter of the in-surface will be the receiver of the document). The in-surface is sent with a SurfaceMsg, and devices receiving this SurfaceMsg use the surface id indicated therein as a target id when starting jobs. Devices that support in-surfaces must support the SurfaceRequestMsg message. When a device requests an in-surface it will not necessarily specify a name in the request, but if it does the owner of the in-surface should only grant the request if the name is recognized. The surface description for the in-surface can be anything, and will typically be NULL.

A sample document transmission according to the Job Policy is indicated in FIG. 16. The steps involved are as follows:

1. The receiver impresses its in-surface on to the sender with SurfaceMsg. The surface has a surface id of id1, a name of "in" and a surface class of IN (0x03). The surface properties field is 1, the target is NoTarget. The sender recognizes this as an in-surface because of the surface class.
2. This only applies to a "pull". The receiver requests the surface in which it is interested. The target surface id of the SurfaceRequestMsg must be set to the in-surface, and the source surface name (and/or class) can be set according to what is to be received: the name and/or class of the requested surface must already be known. If an empty name is specified, the receiver will send its default data.
3. In a "push", this step is the starting of a job by the sender through impressing the top-level surface of the job on to the receiver's in-surface. In a "pull", this step is also the starting of a job through the same means, but in this case in response to the surface request from the receiver. The surface target is set to the surface id of the receiver's in-surface.
4. In this example, the top-level surface contains references to other surfaces and the receiver starts requesting one of those references by name. The receiver includes a request id (req1) so it can match the reply to this request.
5. The sender impresses the requested surface. Its surface id is id3.
6. The receiver now requests content for the surface.
7. One or more content replies are sent by the sender.
8. The receiver releases the requested surface (this indicates that no more content is needed).
9. The receiver releases the top-level surface, signifying that the job is finished. The receiver may not have processed the data received at this point, but the sender is nonetheless free to release the surface.

The example above describes a single job transfer. The Job Policy allows for multiple on-going jobs from a given sender or to a given receiver. This is possible because job elements are distinguished by their surface ids. Senders can simply impress multiple surfaces on to the in-surface of receivers that they are connected to.

It is a device choice how multiple jobs are handled. Some sending devices will only be able to send one job at a time, and some receiving devices will only be able to process a single job or a limited number of jobs. It is a receiver choice how to handle new incoming jobs when jobs are already being processed. Choices are:

to process the new job in parallel with existing jobs;
    to queue the new job and process it when resources allow (set job status, if implemented, to JobPending); and
    to reject the new job (release top-level surface and set job status, if implemented, to JobFailed) Job status is discussed further below under the Status Policy.

Devices can be either a receiver, a sender or both. Devices that are neither will not implement the Job Policy. Sending devices, such as scanners, PCs and cameras, will wait for in-surfaces from receivers and use them as targets for starting new jobs. Receiving devices, such as printers, PCs and TVs, will send in-surfaces to devices that connect to them and wait for the remote devices to start new jobs.

Some devices will act as push devices—i.e. either as the sending or receiving end of a sender initiated transfer. Other devices will act as pull devices. Some devices will act as both.

Self Policy

The Self Policy is used to enable devices to exchange general information about themselves. The overall structure of the self-surface of a device is set out in FIG. 18.

FIG. 18 shows five surfaces: a top-level surface 181 (the self-surface) and a number of child surfaces 182, 183, 184, 185: self-surface is a vPlane encoding with references to the sub-surfaces. Each sub-surface contains a specific piece of information, as is discussed further below. A device can include whichever sub-surfaces it finds it appropriate to support: it is desirable that at least the label sub-surface is supported. The pin sub-surface 185 is a child of the self-surface in this implementation, but need not be. This is discussed further below.

The self-surface is intended to act as a "business card" for devices. When two devices "meet" they will exchange self-surfaces containing certain top-level information in essentially the same manner in which people exchange business cards. It is also possible for a device to send its self-surface to the in-surface of another device (eg for viewing, storage or printing). An advantageous implementation is for devices to exchange the top-level self-surface and then request the child surfaces they need.

For most devices it will be appropriate to support the self-policy. Devices that have limited resources to store or communicate the self-surface components may decide not to implement it. However, if the resources are present, all devices should preferably implement the address, label and icon components. Depending on device user interface capabilities, some devices will request none, some or all of the components from a remote device. For example, devices with only a textual display will only request the label, not the icon, from a remote device. Receiving devices that use expensive resources can decide to implement support for requesting the pin component of remote devices. Sending devices that have the user interface capability to enter PIN numbers should implement the pin-surface on their self-surface. A further important practical feature is that devices should be able to ignore subsurfaces of the self surface that they do not understand: this allows for the possibility of developing the self policy in the future by adding further fields.

The component surfaces are discussed further below.

Self-surface (181)

Figure 19A:
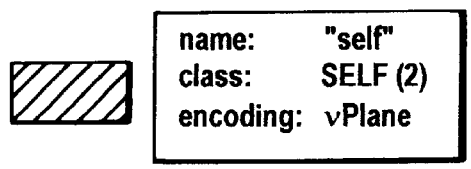
FIGS. 19a to 19e show graphical representations of a self-surface and its sub-surfaces.

This is illustrated schematically in FIG. 19a. It contains references to a number of sub-surfaces that contain global information about a device. The name of the surface must be "self", and the class SELF. The owner of a self-surface must impress it when new sessions start with receivers. It must also be prepared to receive SurfaceReleaseMsg messages from receivers and SurfaceRequestMsg messages so that child surfaces can be provided. If a receiver requests a self-surface with name set to NULL but class set to SELF, the sender must reply with its self-surface (even if it does not have a NULL name): this is clearly desirable given the early stage of the communication process the self policy applies to.

The surface must be a vPlane encoding. The self components must be children on the front of the plane and must be arbitrarily accessible (this is discussed further below in the discussion of e-material). It can contain reference to various named surfaces (currently "label", "icon" and "pin", also "address" though others could be included, for example for exchange of proprietary information), and these sub-surfaces must be requested separately. A device can only be expected to grant a request for a sub-surface if it has listed that sub-surface as a child.

A valid e-material encoding for the self-surface is the following. The significance of this encoding can be assessed with reference to the discussion of e-material, and in particular of the vPlane encoding, which follows at a later point. The receiver of this information (in a SurfaceMsg message) can decide which self-surface components to request.

| Level | Attribute | Value |
|---|---|---|
| | vEncoding | vPlane |
| vPlane | vChildFront | 3 vArbitrary "label" "address" "icon" |
| vPlane | vSize | (612000,792000) |
| vPlane."label" | vPosition | (90000, 90000) |
| vPlane."label" | vAttachment | vFixed |
| vPlane."address" | vPosition | (288000, 72000) |
| vPlane."address" | vAttachment | vFixed |
| vPlane."icon" | vPosition | (900000, 360000) |
| vPlane."icon" | vAttachment | vFixed |

Label-surface (183)

Figure 19B:
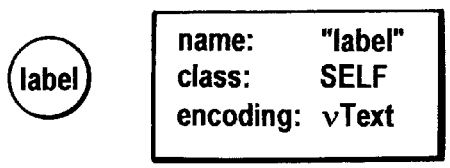

The label-surface is represented in FIG. 19b. Its name is "label", class SELF, and encoding vText. As labels are sub-surfaces requested by devices that want them, devices providing this surface must respond to SurfaceRequestMsg and SurfaceReleaseMsg. There is no need to support DescriptionRequestMsg, DescriptionReplyMsg, ContentRequestMsg or ContentReplyMsg if the text string is placed in-line (this is discussed later in the e-material description). SurfaceChangeMsg can be used to inform a remote device of a change of label (and must contain a completely updated surface description). What the label represents, and whether it is user configurable, is a device choice. A valid example e-material encoding is set out below.

| Level | Attribute | Value |
|---|---|---|
| | vEncoding | vText |
| vText | vSize | (7200, 108000) |
| vText | vSymbolSet | vAscii vUnicode |
| vText.vAscii | vData | "Soeren's Printer" |
| vText.vUnicode | vCodeSet | 0x0000..0x0 1FF |
| vText.vUnicode | vData | "Søren's Printer" |

Icon-surface (184)

Figure 19C:
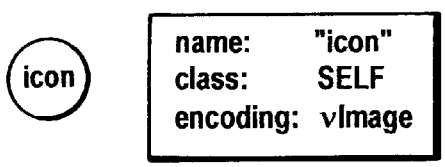

The icon-surface, represented in FIG. 19c, is a pictorial representation of the device. The name is "icon", class SELF and encoding vImage. As this is a sub-surface, similar considerations as for the label-surface apply in messaging. The e-material encoding must in the present implementation have a 32×32 bit uncompressed colour image with data in-line, though other offerings may also be provided.

PIN-surface (185)

Figure 19D:
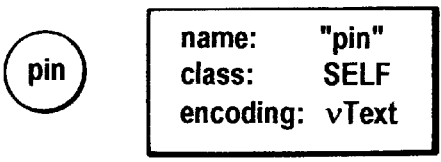

A device will include reference to a pin-surface if the device supports password functionality. The pin-surface contains a PIN number (personal identification number or password). A locked device will request the pin-surface of a remote device that tries to access it. The locked device will validate the contents of the remote pin-surface before permitting access to its resources. FIG. 19d shows a representation of a pin-surface. Its name is "pin", class SELF and encoding vText.

If a pin was sent but the requesting device invalidates it, the requesting device must send a SurfaceReleaseMsg followed by another SurfaceRequestMsg to indicate that the pin was invalid. The owner of the pin-surface must be careful to avoid that it does not send the same pin over and over again, but should reject the second request for the pin if it cannot provide a new one. It is not required that DescriptionRequestMsg-ReplyMsg and ContentRequestMsg-ReplyMsg are supported if the pin is put in-line with the SurfaceMsg message.

The pin-surface contains a text encoding in the ASCII symbolset. It is required in the specific implementation adopted that the text data is composed of numeric values (i.e. composed of characters in the range "0" . . . "9") because simple devices might not allow the user to enter alphanumeric characters. Devices that validate PIN numbers must then limit the validation to numeric values. To ensure that all devices are capable of entering the longest available PIN, it is also required in the specific implementation adopted that the string is limited to a maximum of 10 digits.

A basic sequence of events relating to PIN validation is set out in Table 25 below. The receiver is locked and asking the sender for a valid PIN. The receiver will only provide its in-surface after the sender has been validated.

TABLE 25

| | PIN validation using pin-surface | |
|---|---|---|
| Sender | | Receiver |
| 1 Establish session | <-> | |
| 2 | ← | Request "pin"sub-surface |
| 3 Provide "pin" surface with a text string in-line that specified a PIN. | → | |

TABLE 25-continued

PIN validation using pin-surface

| Sender | | Receiver |
|---|---|---|
| 4 | ← | Validate the PIN that the sender specified in the "pin" surface. Release the "pin" surface. |
| 5a | ← | If valid, impress in-surface on sender and wait for jobs. |
| 5b | ← | If invalid, request the "pin" surface again or close the session. |

It is a receiver's choice how to behave when a PIN is valid or invalid. If valid, the receiver can start opening its resources such as its in-surface and status-surfaces to the sender. It can close sessions on senders that do not provide a correct PIN within a certain time-out. It is also a receiver choice whether it will ask the sender for a password a second, or third, time in case the sender provides an invalid PIN. Other opportunties for PIN requests can also be employed: for example, devices can be allowed to request a PIN to be provided at the start of any job, or specific types of job. The PIN mechanism described here is not the only way to validate remote JetSend devices. A receiving (or sending) device can also validate remote devices based on their addresses. For example, a JetSend Internet device can implement IP filtering so that only devices with certain IP addresses can connect.

Address-surface (182)

Figure 19E:
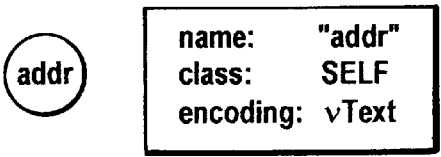

This surface, represented in FIG. 19e, contains the device's address: this is useful for passing on to third-party devices using the Address Policy, which is discussed below. Similar considerations as for label-surface and icon-surface apply in regard to messaging. This surface is most useful in the context of the Address Policy (as clearly a device connected and able to request the address-surface will also know this information from the transport layers used to connect to the device).

Status Policy

Surfaces of the class STATUS are used to exchange status information. There are two types of status: device status and job status: there can only be one device status for any given device, but there can be a plurality of job statuses. Each job status is associated with a job started using the job policy.

A status provider is here defined as a device which owns a status surface. A status observer is a device with one or more impressions of another device's status surface components. A device can be both a status provider and a status observer.

Figure 20:
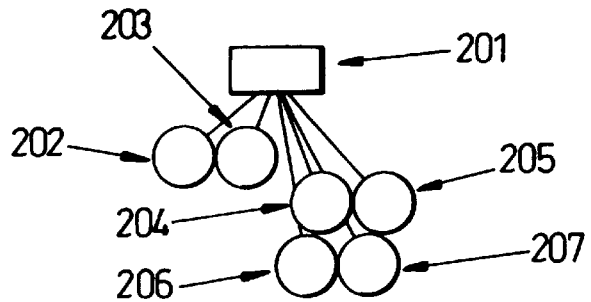
FIG. 20 shows the structure of a generic status-surface.

FIG. 20 shows the overall structure of the status-surface. The top-level surface 201 is a plane with references to status sub-surfaces that contain the actual status information in textual form. For a given device or job status there is a "t" and an "n" (e.g., "devt" and "devn") surface. "t" indicates textual status and "n" indicates numerical status, and they are both text encodings. The textual status is a human-readable string that can be localized, as is discussed below. The numerical status is a number, which indicates success, progress, or failure status.

The textual status is defined by the status provider and is specific to the function of that device. The numerical status values are a fixed set that are device independent and shared between all devices. The definitions of the numerical device and job status-surfaces follow below.

A device that receives status-surfaces should display the textual status strings to the user, but interpret the numerical status and either inform the user or perform an appropriate action automatically. For example, if a job failed to be processed successfully a device can decide to re-send the job, beep, flash a red light or notify its user with a more elaborate error message.

Textual status messages can be localised to the language of the user. This is achieved using the localisation mechanism described in copending patent application Ser. No. 08/896,236 entitled "A method for localization of information exchanged by devices" filed at the US Patent Office on Jul. 18, 1997, the content of which is incorporated by reference herein. Localization, which is optional, will only be effective if both devices in a communication support a given language and its symbol set. Support for English in the ASCII symbol set is required.

Although it will be advantageous for most devices to implement device status, this is not required. All devices that do support status must implement numerical device status, and most will implement textual device status also. Only receiving devices will implement job status: sending devices are observers of job status from receivers.

The individual status-surface components are discussed below.

Status-surface

Figure 21A:
FIGS. 21a to 21e show graphical representations of a status-surface and its sub-surfaces.

This surface, shown in FIG. 21a, contains references to status messages that indicate the overall status of a device or the status of jobs. Name is "status", class is STAT (4) and the encoding used must be vPlane.

Status providers (be it of job status or device status) will impress their top-level status-surface on other devices that connect to it by sending a SurfaceMsg message. It is now up to the remote device (the status observer) to request the components of the status-surface that are of interest. Only if a status provider has a given sub-surface (e.g. "devt") listed as a child in the status-surface can it be expected to grant a request for the data for that surface. The status provider must send a SurfaceChangeMsg for the top-level status-surface when a new component is added or removed from it. For example, if a new job is started and a job status is created, the status-surface is updated with one new component in its list of components. StatusChangeMsgs must only be sent to status observers that have not released the status-surface with a SurfaceReleaseMsg.

The surface encoding must be a plane encoding, and the same considerations generally apply as for the self-surface. However, it may be desirable for status providers to position components so that they are appropriate for rendering, and possibly also for status providers to add non-status elements (such as headings or logos) to improve readability.

A valid sample encoding is the following:

| Level | Attribute | Value |
|---|---|---|
| vPlane | vEncoding | vPlane |
| | vChildFront | 3 vArbitrary "devn" "devt" "jobn-44" |
| vPlane | vSize | (612000,792000) |
| vPlane."devn" | vPosition | (90000, 90000) |
| vPlane."devn" | vAttachment | vFixed |
| vPlane."devt" | vPosition | (288000, 72000) |
| vPlane."devt" | vAttachment | vFixed |
| vPlane."jobn-44" | vPosition | (900000, 360000) |
| vPlane."jobn-44" | vAttachment | vFixed |

Devt-surface (202)

Figure 21B:

This surface is depicted in FIG. 21b. If localisation of the text string is supported, so content requests and replies must also be supported: otherwise, information may be provided in-line. The text string must not contain newline or other control characters.

Most devices require the status field to be updated as the status of the device changes. This is done by sending the SurfaceChangeMsg to devices that have previously received a SurfaceMsg for this surface. When a device is not interested receiving updates for this surface anymore, it sends a SurfaceReleaseMsg.

Devn-surface (203)

Figure 21C:

This surface is depicted in FIG. 21c. Similar messaging requirements to the devt-surface apply. The surface must be encoded in text and offered in the ASCII symbol set. It must be given one of the following values:

"1"—Device is ok (and ready to send/receive jobs).

"2"—Device is busy (currently processing jobs).

"3"—Device needs attention (temporarily inactive or needs an operator to reload consumables)

"4"—Device is not functioning (internal error, device is unable to perform its function)

Jobt-surface (205, 207)

Figure 21D:

This surface is depicted in FIG. 21d. The requirements for this surface are generally similar to the devn-surface. The most significant difference is in the name. The #-character in the name must be substituted by the impress-id from the SurfaceMsg that started the job. This is the impress-id of the top-level surface that was first impressed on to the in-surface of the device that is receiving the job. The sending device uses this number to link job status with the appropriate job. A receiving device might have several jobs going at the same time with different devices, and the impress-id is used to distinguish the different jobs and job statuses.

Jobn-surface (204, 206)

Figure 21E:

This surface is depicted in FIG. 21e. Requirements are generally similar to jobt-surface, however the surface must be encoded as text and offered in the ASCII symbol set. The surface must contain one of the following values:

"1"—Job is done and was processed successfully.

"2"—Job is done but was not processed successfully.

"3"—Job is on hold and will be processed at some later stage.

"4"—Job is being processed now.

"5"—Job is being processed now and is 0% done.

"6"—Job is being processed now and is 1% done. (etc.)

"105"—Job is being processed now and is 100% done.

Value "4" is equivalent to values "5" through "105", except that it contains no information about job progress. Devices receiving these status values can display them in whichever way they find appropriate.

Address Policy

The Address Policy allows devices to exchange addresses of third party devices. The policy employs two types of surface, an address programming surface (or address in-surface) and an address card-surface. Devices that accept addresses from remote devices have an address in-surface, whereas devices that send out addresses to other devices have address card-surfaces that they impress on to remote address in-surfaces.

Typically, only devices that initiate sessions will have an interest in being programmed with addresses from remote devices. Initiators of sessions that have no adequate user interface capabilities for entering addresses have no sensible option but to implement the Address Policy to allow more sophisticated devices to add addresses to them. They will implement the address in-surface.

Devices that receive address cards can in principle do what they like with them. Typically, they will add incoming cards to their address book. Simpler devices can also pass on addresses that they receive from others. Devices that wish to program others with addresses will implement address card surfaces.

Figure 22A:
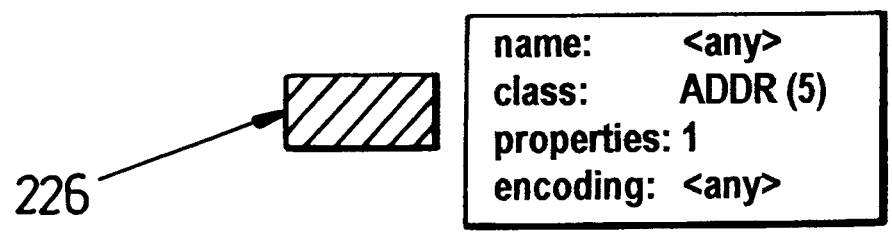
FIG. 22a shows a graphical representation of an address in-surface.

An address in-surface 226 is depicted in FIG. 22a. Devices that accept addresses from remote devices should impress the address in-surface on to any other device that connects to it. Devices that want to send addresses must set the impress target to the surface identifier of the remote device's address in-surface. The address in-surface is very similar to the in-surface used in the Job Policy, except surfaces impressed on it will be processed differently. The surface properties for this surface must be set to 1, to indicate that it can be used as a target for new impressions.

Figure 22B:
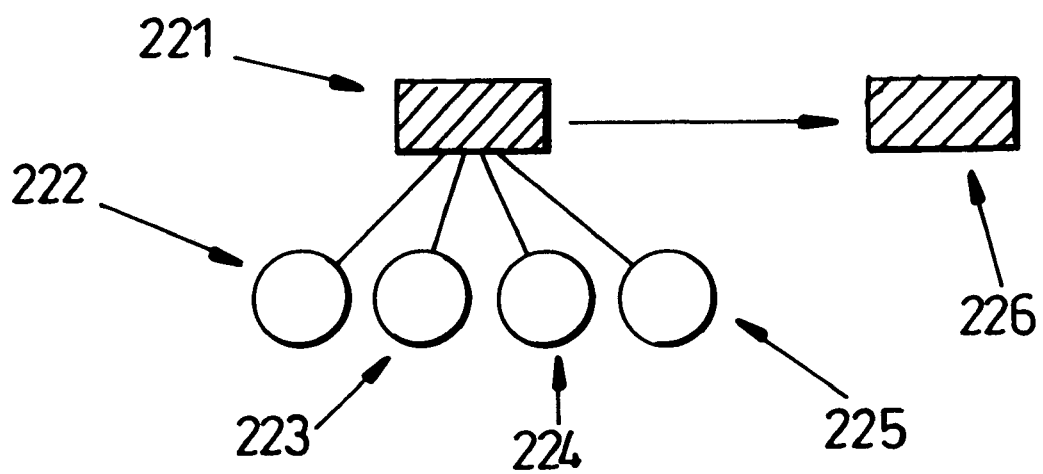
FIG. 22b shows the structure of an address card surface interacting with an address in-surface.

An address card surface is shown in FIG. 22b. This surface 221 is essentially the same in format as a self-surface, and the format and requirements for each sub-surface 222, 223, 224, 225 are also as in the Self Policy. The only distinction is that the class field of the address card surface and its sub-surfaces need not be set to SELF, but can be any class (including SELF and OTHER). Address card surfaces are impressed on to address in-surfaces. Clearly, the address card surface must have at least the "addr" surface as a child surface: other sub-surfaces are optional.

There are further useful conventions which are not part of any specific Interaction Policy. These are as follows.

Unexpected Surface Messages

A device will receive surface messages it did not expect. For example, if a device has no support for self-surfaces, other devices will still send a SurfaceMsg with the top-level self-surface right after a session is established. In addition, a device might get requests for surfaces that it cannot provide. The response to unexpected surface messages is fairly simple: they must be rejected. The message for rejection depends on the original message:

SurfaceRequestMsg—must be rejected with a SurfaceMsg with the status set to 3 (request reject).

SurfaceMsg—must be released with a SurfaceReleaseMsg.

ContentRequestMsg—must be rejected with a ContentReplyMsg with the status set to 2 (request reject) and the data field set to NULL.

SurfaceChangeMsg—only if the message is of status value 1 (request for change) must this be rejected with a SurfaceChangeMsg with a status value of 2 (change reject).

DescriptionRequestMsg—must be rejected with a DescriptionReplyMsg with a data field set to NULL.

If these messages are not sent as a reply to unexpected requests, the sender of them will have to time-out waiting for the expected reply. It will be more efficient if the receiver explicitly signals that a reply will never come using the above rejection mechanisms.

Surface Requests with Empty Surface Name

This convention has been described in part under each policy. When surface requests are made the requester specifies a name and a class. If the name is NULL (length field=0), this does not indicate a request for a surface with no name, rather it means that the device should provide the default surface within the specified class. For example, a request for a surface within the SELF class and an empty name should yield a reply containing the top-level default self-surface.

Inventing Device-specific Policies

A device can create its own policies by using surfaces with the class NOCLASS (1). A device can distinguish special surfaces by looking at the surface name. Devices that do not know about this special policy will simply reject SurfaceMsgs and surface requests for the surfaces with these special names.

The nature and format of e-material will now be described, together with examples of its use for different document types.

As previously indicated, e-material is the form in which a surface is expressed. E-material comprises both description and content. The description is used by JetSend to negotiate the exchange of content. The description sets out the attributes of the surface. These attributes typically form a hierarchy of choices encompassing a number of attribute levels. These attributes indicate how information can be conveyed: the content itself is the perceivable information to be transferred.

A successful exchange of a surface between appliances requires that each attribute level describing the surface be identified and processed. The process of identifying and processing these levels between the appliances is called negotiation. Once the complete surface description has been negotiated, the surface content is exchanged.

The exchange of a surface between two JetSend appliances involves surface interaction messages as defined in the JIP. A surface description may be completed using description requests and description replies. The surface content exchange is completed using content requests and content replies. Under limited circumstances, surface content may be included in the surface description; this is called in-line content. With in-line content and a small description, an exchange may require only a single message. More commonly several messages are exchanged.

E-material is provided in the form of e-material blocks. The byte format for such blocks is discussed further below, but at one level an e-material block can be represented in a two column table with attribute names in the first column and attribute values in the second column. An attribute name is a single specific keyword such as vResolution or vCompression. An attribute value is one or more values associated with an attribute such as (300,300) pixels per inch or vRLE (run length encoding). When an attribute value is specified as a list of values, they appear as a space-separated list in the value field.

The attribute-value pairs which appear in the e-material block are applicable to some portion of a JetSend surface. These attribute-value pairs may apply to the whole surface or to a specific portion of the surface. All attributes and some values are drawn from a limited set of predefined keywords. These are denoted in this specification by a "v" prefix such as vEncoding. Some values are drawn from a set of data types. These are denoted in this specification by an "em" prefix such as emListType. In this specification, there are a number of representational types defined to simplify the discussion of the grammar-like structure of JetSend surfaces: these will be indicated by appropriate identifiers, generally in the value field.

Certain attributes are associated with a set of values which offer a selection. Each set of values is called a selection list. Selection lists appear as a space-separated list in the value column of a two-column table. For example a vResolution attribute may have a selection list which contains values such as (300,300) pixels per inch or (150,150) pixels per inch. During the negotiation process, each attributes takes one value from the selection list. The selection of each value lends to the identification and processing of each attribute level of the surface description. In the e-material block shown in Table 26, the attributes vEncoding, vColorSpace, vPixelDepth, vResolution, and vCompression take selection lists as values. The attribute vSize does not. For convenience in this implementation, it is made a rule that attribute data that can be lists must be encoded as lists—even if they contain only one value.

That means that the attribute "vEncoding=vText" has to be encoded as a list with one element, vText. This makes interpreting attribute data slightly easier but composing it slightly harder.

TABLE 26

| E-material block example | |
|---|---|
| Attribute | Value |
| vEncoding | vImage vText vFile |
| vColorSpace | vGray vSRGB |
| vSize | (72000,72000) |
| vPixelDepth | 1 8 24 |
| vResolution | (300,300) (150,150) |
| vCompression | vRLE vNone |

As the levels are identified and processed, the attributes which take selection lists and the selected values are enumerated in an e-material block. Attributes which do not take selection lists are omitted. This e-material block is called a decision block, since it represents the decisions as to the specific attributes of the e-material. The description request and content request include an e-material block which indicates the attributes of the e-material being requested. Table 27 shows one possible decision block selected from the table above.

TABLE 27

| Sample decision block for Table 26 e-material block | | |
|---|---|---|
| Encoding Hierarchy | Attribute | Value |
| "" | vEncoding | vImage |
| vImage | vSize | (576000,756000) |
| vImage | vColorspace | vGray |
| vImage.vGray | vPixdDepth | 1 8 |
| vImage.vGray.1 | vResoludon | (300,300) |
| vImage.vGray.1.(300,300) | vPixels | (2400,3150) |
| vImage.vGray.1.(300,300) | vCompression | vRLE |
| vImage.vGray.8 | vResolution | (150,150) |
| vImage.vGray.8.(150,150) | vPixels | (1200,1575) |
| vImage.vGray.8.(150,150) | vCompression | vRLE |

An attribute block is an e-material block which sets out all the attribute-value pairs pertaining to a specific attribute level of the surface description. A surface description block is an ordered set of attribute blocks. A surface description block may be represented as a three-column table with attribute blocks occupying the last two columns. The first column of the table contains a decision path applicable to each attribute block. A decision path is constructed using the values from the decision block. These are concatenated together in a dot notation in the same order as the attribute blocks. Thus an attribute block applicable to an image might be qualified by a decision path such as vImage.vGray.8.(300, 300).vRLE, indicating that it is a run-length encoded image with 300 by 300 dpi resolution and 8 bits per pixel gray scale. This notation describes the composition of the surface which is called the encoding hierarchy. The root of this hierarchy is called the null level.

TABLE 28

Sample surface description block

| Encoding Hierarchy | Attribute | Value |
|---|---|---|
| " " | vEncoding | vImage |
| vImage | vSize | (576000,756000) |
| vImage | vColorSpace | vGray |
| vImage.vGray | vPixelDepth | 1 8 |
| vImage.vGray.1 | vResolution | (300,300) |
| vImage.vGray.1.(300,300) | vPixels | (2400,3150) |
| vImage.vGray.1.(300,300) | vCompression | vRLE |
| vImage.vGray.8 | vResolution | (150,150) |
| vImage.vGray.8.(150,150) | vPixels | (1200,1575) |
| vImage.vGray.8.(150,150) | vCompression | vRLE |

Figure 33:
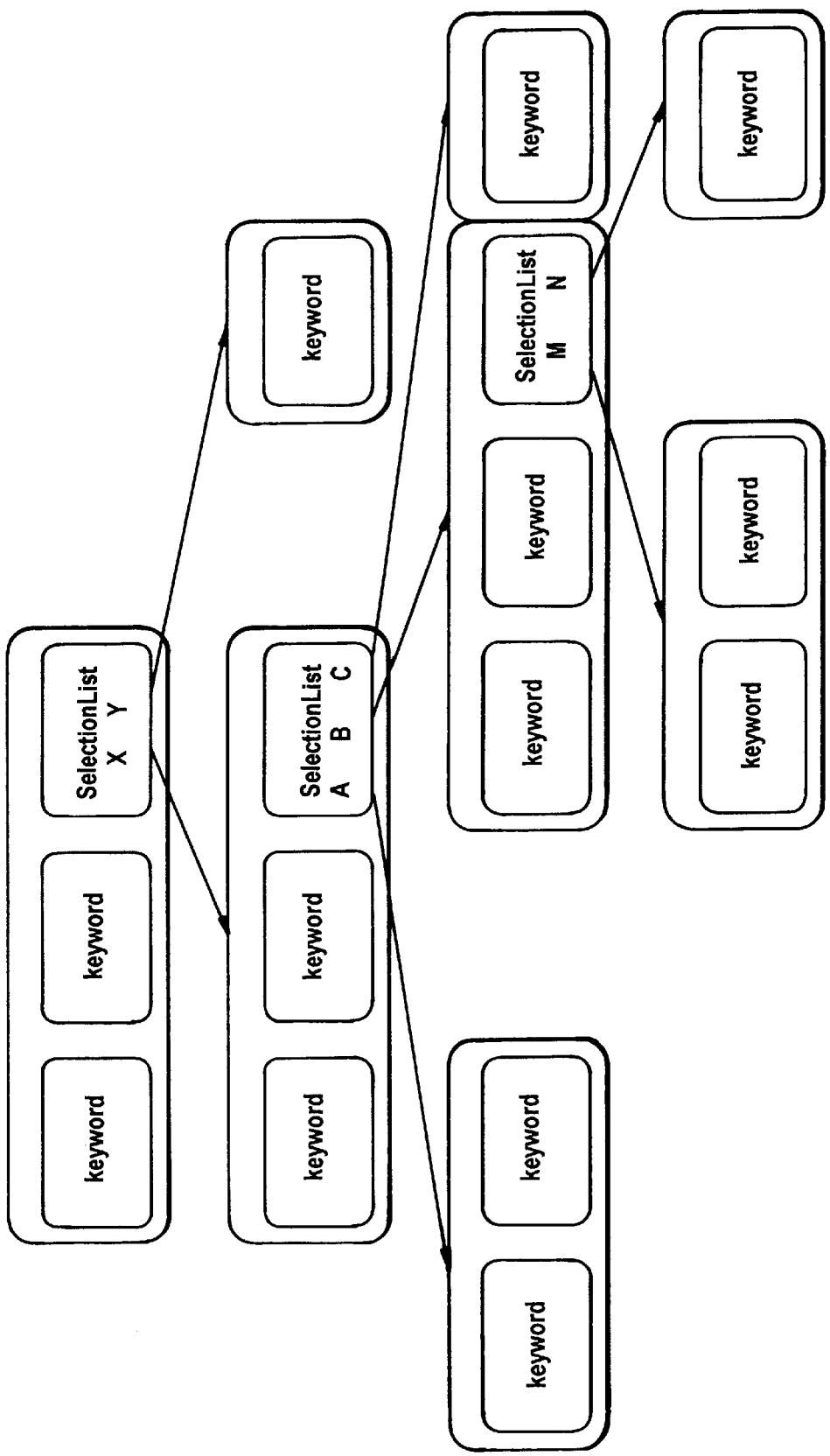
FIG. 33 shows a schematic representation of a surface description encoding hierarchy.

For example, in the case shown in Table 28 the null level of the encoding hierarchy is the attribute value pair showing that the value of attribute vEncoding is vImage. The encoding hierarchy forms a tree-like structure. Each node in this structure is an attribute level. At the next attribute level, the attribute block indicates that the attribute value pairs applying to this level are that vSize must take the value (576000, 756000) whereas vColorSpace must take the value vGray. A level is terminal if none of the attributes that it contains takes selection lists or requires further description. This level is not a terminal one, as vGray itself has an attribute, vPixelDepth, and this takes a selection list of values. The decision path gives the set of decisions down the tree to the level indicated in the encoding hierarchy field. Each value in the decision path indicates descent to a next level down the encoding hierarchy tree, and the last value in the decision path is the name of the attribute level. A surface description is known to be complete when the level in the encoding hierarchy is known to be terminal. This form of hierarchy is shown in FIG. 33. Levels such as X.A, X.B.M, and Y can be seen to be terminal: no further description beyond these levels is available.

A document is composed of one or more surfaces. Each surface may be given a name such as "mySurface" or "doc/plane3/image2". A document can be fully described using a four-column table with the last three columns occupies by surface description tables. The first column contains the name of the surface being described. An example of such a table is shown in Table 29.

TABLE 29

E-material document description

| Encoding Hierarchy | Attribute | Value |
|---|---|---|
| Surface "Top" | | |
| " " | vEncoding | vPlane |
| vPlane | vChildFront | 2 vSequential "A" "B" |
| vPlane | vSize | (612000,792000) |
| vPlane.A | vPosition | (18000,18000) |
| vPlane.A | vAttachment | vFixed |
| vPlane.B | vPosition | (288000,72000) |
| vPlane.B | vAttachment | vFloat |
| "A" | | |
| " " | vEncoding | vImage |
| vImage | vSize | (576000,756000) |
| vImage | vColorSpaee | vGray |
| vImage.vGray | vPixelDepth | 1 8 |
| vImage.vGray.1 | vResolution | (300,300) |
| vImage.vGray.1.(300,300) | vPixels | (2400,3150) |
| vImage.vGray.1.(300,300) | vCompression | vRLE |
| vImage.vGray.8 | vResolution | (150,150) |

TABLE 29-continued

E-material document description

| Encoding Hierarchy | Attribute | Value |
|---|---|---|
| vImage.vGray.8.(150,150) | vPixels | (1200,1575) |
| vImage.vGray.8.(150,150) | vCompression | vRLE |
| "B" | | |
| " " | vLanguage | "en" |
| en | vEncoding | vText |
| en.vText | vSize | (72000,18000) |
| en.vText | vSymbolSet | vAscii |
| en.vText | vData | Hello |

The surfaces in a document are organized in a tree-like structure. A document is composed of pages; the pages are composed of blocks of text or images; and so forth. Certain attributes of a given surface describe the arrangement of child surfaces of the level below. These attributes give rise to the surface hierarchy. The root of this hierarchy is called the top-level surface.

Some surfaces within the surface hierarchy have one or more child surfaces. These child surfaces are organized in one or more ordered child lists which are distinct for each parent surface. A child list may be well characterized, such as a list of images and text blocks on one side of one page. However it may not be fully available at any given time. Consider a stack of pages being scanned by a multi-page scanner. While a number, designation, and content exists for each page, the child list which reflects the composition of the stack is not so readily available at any given time. Such surfaces may not be created until they are requested, or at some other future time appropriate for relevant device operation.

The child list when characterized gives the names of the child surfaces related to a parent surface. In the surface description table, this is called a reference list.

The formal structure for e-material surface descriptions is set out in detail below. E-material is specified in tables, with the elements of each cell treated in a grammar-like fashion to determine the construction of a description from attributes and values. Low-level data types such as predetermined keywords, or null-terminated ASCII strings, would be terminal symbols in a grammar: here they relate to data types in e-material byte format (discussed further below).

E-material notational conventions are set out in Table 30 below.

TABLE 30

E-material notation conventions

| Symbol | Interpretation |
|---|---|
| ::= | may be replaced by |
| \| | An operator, designating an EXCLUSIVE OR, meaning to chose one among the vertical bars. |
| [] | The contents of the brackets are optional |
| {} | The contents of the braces delineate a set from which choices are made when the operators defined above are used and the scope is ambiguous. |
| Bold | Any symbol expressed in a bold typeface is an explicit symbol. |
| Italic | Any symbol expressed in an italic typeface is a predefined keyword, defined for use in this document. |
| BoldItalic | Any symbol expressed in a bold/italic typeface is an explicit predefined keyword. |
| null | A decision path of zero length. A reference to the root level of the encoding hierarchy. |

TABLE 30-continued

E-material notation conventions

| Symbol | Interpretation |
|---|---|
| . | period character |
| # | pound character |
| () | parenthesis characters |
| " " | quote characters |

E-material data types (corresponding to e-material byte format data types, which are discussed further below) are set out in Table 31.

TABLE 31

E-material data types

| Assignment | Example |
|---|---|
| emIntType ::= 32 bit signed integer | 10 |
| emIntPairType ::= (emIntType, emIntType) | (100, 200) |
| emRangeType ::= (emIntType..emIntType) | (100..600) |
| emRangePairType ::= (emIntType..emIntType, emIntType..emIntType) | (100..600, 200..600) |
| emStringType ::= null-terminated ASCII string | "string" |
| emKeyType ::= 16-bit integer representing predefined keywords that identify specific attributes and values. | vImage |
| emListType ::= emKeyType \| emIntType \| emIntPairType \| emRangeType \| emRangePairType \| em.StringType [[ emlistType]...] | 10 (100,200) (100..600) (100..600, 200..600) "string" vImage |
| emDataType ::= 8-bit binary data | 0xdeadbeef |

Attribute blocks are of the type set out in Table 32.

TABLE 32

Attribute block types

| Assignment |
|---|
| attribute ::= emKeyType |
| value ::= emListType \| emKeyType |
| keyword ::= emKeyType |

Many values are represented as e-material lists. "General lists" are simply values which are most easily handled together: the number of elements in the list is variable. "Selection lists" contain individual values which are selected during the negotiation process. "Reference lists" contain names of surfaces which are linked together to form pages or documents.

E-material general list specification types are set out in Table 33 below.

TABLE 33

E-material general list specification types

| Assignment | Example |
|---|---|
| keywordList ::= emKeyType [[ emKeyType]...] | vGray vSRGB vRGB |
| intTripleListType ::= emListType containing an emIntType triple | 255 255 255 |
| rangePairListType ::= emListType of one or more emRangeType | (100..600) (200..600) (500..600) |

The selection list can be a large number of token combinations as defined by emListType. Legal combinations are limited by the specific attributes with which the selection list is paired. While individual values in the selection list must match the attribute, there is no practical limit on the number of values in the list. Commonly occurring specification types are shown in Table 34.

TABLE 34

E-material selection list specification types

| Assignment | Example |
|---|---|
| selection ::= emKeyType \| emIntType \| emIntPairType \| emStringType selectionList ::= emListType | vImage vText vFile |
| keySelectionList ::= emKeyType [[ emKeyType]...] | vPlane vAssociation |
| stringSelectionList ::= emStringType [[ emStringType]...] | "special1" "special2" |
| keyStringSelectionList ::= {emKeyType \| emStringType} [[{emKeyType \| emStringType}]...] | vPlane "special" |
| rangeSelectionList ::= emRangeType [[ emRangeType]...] | (100..600, 200..600) (200..1200, 200..1200) |
| intPairRangeTypeSelectionList ::= { emIntPairType \| emRangeType }[[{ emIntPairType \| emRangeType }]...] | (300,300) (100..600, 200..600) |
| languageSelectionList ::= stringSelectionList | "en" "en-us" "en-gb" "en-um" "fr" "ge" "it" "sp" "da" "ja" |
| encodingSelectionList ::= keyStringSelectionList | vPlane vImage "special" |

The vLanguage attribute may be included in any encoding hierarchy if reference to language and country is desired. This is required for the vText encoding and optional for other encodings. The vLanguage attribute requests a specific selection list. It identifies the languages and optionally the countries for which applicable characteristics are available. The expected format is languageCode[-countryCode]. It is a requirement that a language code be identified as a unique value even if the country code may following the language code as a distinct value. It is optional that the country code may be added to a unique language code if the country code would add further clarification to the value.

An encoding selection list generally only offers one or more emKeyType values such as vImage or vText. A special encoding may be added by defining an emStringType in the selection list associated with the vEncoding attribute and using it uniformly. It is considered independently of the keywords defined as emKeyType, so the emKeyType vAssociation is not the same as the special encoding emStringType "vAssociation".

The order of combinations within the selection list indicates the preference of the sending appliance.

A decision path is constructed from the values in a decision block. These values are in turn taken from selection lists. The encoding hierarchy is expressed in terms of these decision paths. The decision paths are used to identify the level of each attribute block. Decision path specification types are set out in Table 35 below.

TABLE 35

E-material decision path specification types

| Assignment | Example |
|---|---|
| slKeyword ::= emKeyType from a selectionList. | vColorSpace |
| slInt ::= emIntType from a selectionList. | 8 |

TABLE 35-continued

E-material decision path specification types

| Assignment | Example |
|---|---|
| slPair ::= emIntPairType from a selectionList. | (300,300) |
| slString ::= emStringType from a selectionList. | "special" |
| selectionHierarchy ::= slKeyword \| slInt \| slPair \| slString | (100..600), (200..600), (500..600) |
| decisionPath ::= " " \| null \| selectionHierarchy [[ .selectionHierarchy]...] | vImage.vGray.8. (300,300).vRLE |

The null level provides an entry point for the encoding hierarchy of a JetSend surface. At the null level the decision path is null. The null level takes on any of three distinct forms depending on the situation:

- The null level may contain only the vEncoding attribute. This is the most common type of null level. Most surfaces begin with such a null level.
- The null level may contain only the vLanguage attribute. The vLanguage attribute is required for vText surfaces. It is occasionally seen with other surface encodings as well.
- When a surface description is incomplete, a description request and description reply must be done to complete the exchange of the surface description. The description request and description reply together must act on every attribute level to complete the surface description. Those attributes which take selection lists along with the values already selected appear in the decision block of the description request. Those attributes which take selection lists which have not been addressed appear in the decision path of the description reply. Since the break in the ordered list of attributes which take selection lists is established dynamically, any level may become the null level in the description reply.

The surface hierarchy arises from the use of reference lists. A reference list indicates the structure of the child surfaces in the child list which are linked to this parent surface. When a child list is available, the child surfaces in this list correspond directly to the childCount number and the child surface names in the reference list. At times, the child list is not available so the reference list indicates an incomplete picture.

The reference list is a simple e-material list, emListType. Most often the list takes the form of childCount, the keyword vSequential or vArbitrary, and a list of child surface names. A reference list may link together elements on a single page (in the case of the vPlane encoding) or other pages within a document (in the case of the vAssociation encoding). Each surface is a separately negotiated job element.

A reference list is only associated with the vPlane or vAssociation surface encodings. The other encodings (vImage, vText, vFile) can only be terminal levels in the surface hierarchy. A vPlane encoding may have two (vChildFront for the front and vChildBack for the back) child surface lists, one (vChildFront or vChildBack) or none. A vAssociation encoding must have exactly one (vChild) child surface list. E-material reference list specification types are set out in Table 36.

TABLE 36

E-material reference list specification types

| Assignment | Example |
|---|---|
| childCount ::= emIntType | 1 |
| reference ::= emStringType | "A" |
| referenceList ::= reference[[ reference]...] | M3 M4 M7 |
| shortReferenceList ::= childCount {vArbitrary \| vSequential } referenceList The positive integer childCount matches the number of references in referenceList. | 3 vArbitrary M3 M4 M7 |
| longReferenceList ::= childCount {vArbitrary \| vSequential } The childCount is a large positive value. | 207 vSequential |
| unknownReferenceList ::= childCount {vArbitrary \| vSequential} The childCount is a negative value. | −3 vSequential |
| zeroReferenceList ::= 0 | 0 |
| anyReferenceList ::= shortReferenceList \| longReferenceList \| unknownReferenceList \| zeroReferenceList | |
| planeReferenceList ::= referenceList \| vFrontFirst \| vFrontLast \| vBackFirst \| vBackLast | vFrontLast |
| assocationReferenceList ::= referenceList \| vFirst \| vLast | M3 M4 M7 |

The childCount value may be negative, zero, or positive. Small positive values for childCount include a corresponding list of references, enumerating the full contents of the child list. Large positive values of childCount indicate that the child list is known but the reference list too long to be included. Other childCount values indicate the child list is unknown or zero length. In either case no references are included.

The vSequential and vArbitrary keywords are used to indicate whether there are any limitations on the order in which the sending appliance can send surfaces. This allows the receiving appliance to fully control the order of surfaces requested. It lets the receiving appliance know, in what order information, both content and child surfaces, may be requested. Content information about a child may be in-line, or the content information may be requested for one or more children at a time; however the surface description of a child must be requested one at a time.

The value vArbitrary indicates that the sending appliance can access, and send content information, and impress the child surfaces on the receiver in any order that is requested. The value vSequential means that the children may be requested only in a predetermined order because of limitations of the sending device.

The remainder of the reference list gives names of other surfaces. These names are present if the complete child list is known and relatively short. When references are included the following interpretation applies:

- The reference names must be unique.
- The # (pound sign) is a reserved symbol.
- The references indicate the children that are to be rendered on the plane.
- The order of the children is the order (in the z direction—discussed below with reference to vPlane) in which they should be rendered.
- When references are listed then the number of references must match the number of children specified under the childCount value. A partial listing of references is not allowed. If all cannot be listed, or the references are unknown, then they must be "discovered" through the mechanisms available in the content request.

It is possible that the content information for some children may be in-line. This is only allowed when a referenceList value is included with the vChildFront, vChildBack, or vChild attribute. For content that is not in-line, a content request is used.

To ensure that JetSend appliances communicate under all circumstances, specific decision paths must be present. These are called default encodings. Sending appliances must be able to produce e-material with the attributes described by these default decision paths. Similarly receiving appliances must be able to interpret e-material with these characteristics. An example is vImage.vGray.1.(300,300).vRLE, which is a default encoding for vImage.

Default encodings are present to ensure that appliances will exchange e-material under normal conditions. These encodings are the lowest common characteristics. Base encodings are recommended decision paths which permit appliances to exchange e-material with a higher degree of fidelity. Other attributes and values are considered optional. Examples of base encodings for vImage are vImage.vGray.8.(150,150).vRLE, vImage.vGray.8. (150, 150).vNone, and vImage.vSRGB.24.(150,150).vNone.

The default encodings are decision paths, each element of which comes from a selection list. Associated with each selection list is an attribute. Each of the attributes whose values make up a default encoding must be present in the surface description.

Encodings for different types of surface will now be discussed, and examples provided.

vImage

A static image is generally thought of as raster information, a bitmap, which when rendered is viewed as a picture. An image may be rendered as dots on a page, even though those dots visually appear as text, tables, pictures, characters, and so forth. An image may also be rendered as pixels on a computer screen. An image may be pixels from a camera, scanner, or any similar device. Images are generally categorized by color space, pixel depth, resolution, and compression technique. The decision paths within the encoding hierarchy are used to handle this information.

Figure 23:
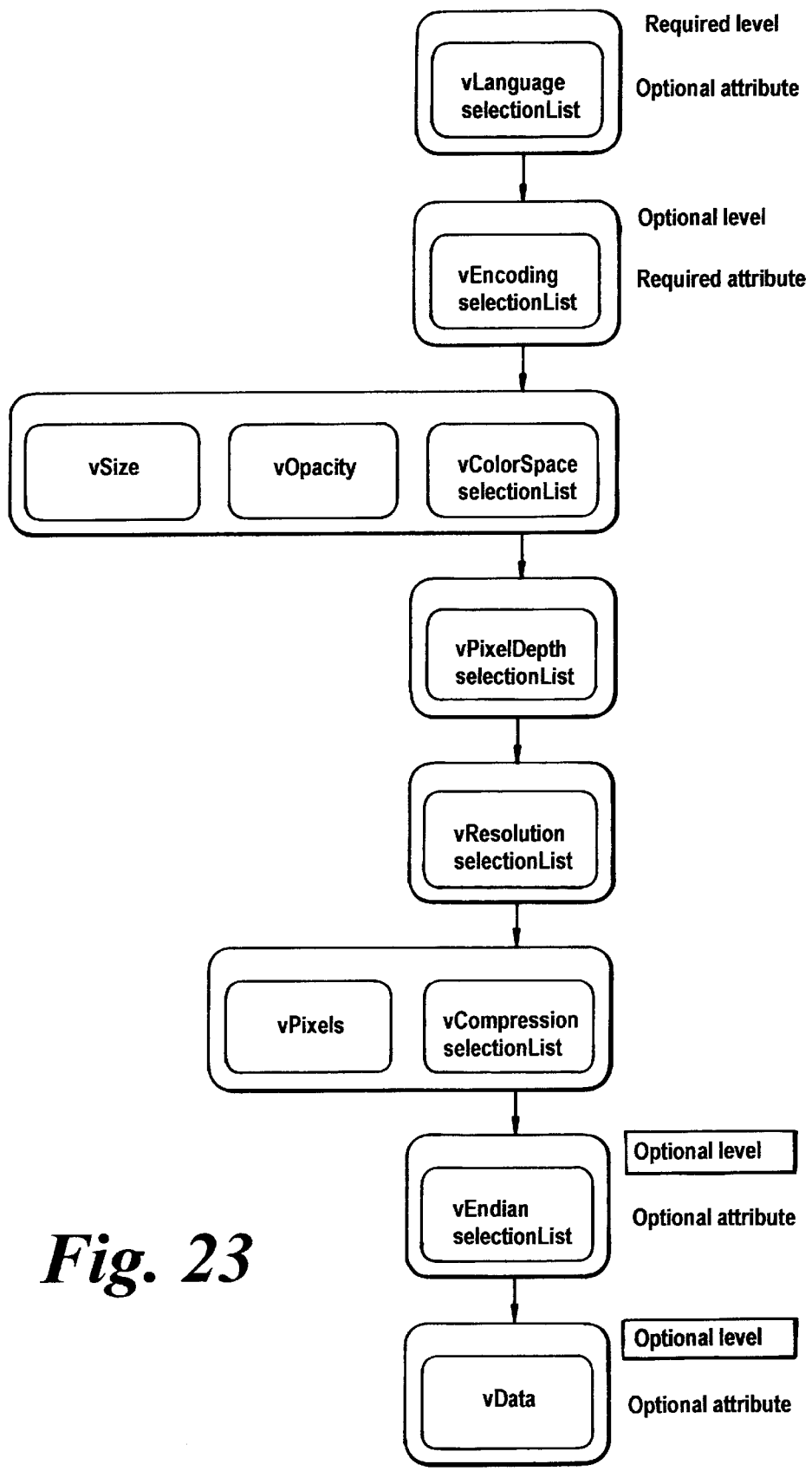
FIG. 23 shows a hierarchy of attributes for the vImage encoding.

A hierarchy of attributes for vImage is shown in FIG. 23. The significance of each different attribute shown is briefly discussed:

vLanguage: The vLanguage attribute may be included if reference to language and country is desired. A default language value is not specified.

vEncoding: This section defines the vImage encoding specifically. The other encodings, vText, vFile, vPlane, vAssociation, and any unique emStringType encodings may also be present. A vImage is defined as a collection of bits representing a rasterized static image. The image composition is defined by the attributes of this encoding.

vSize: Designates the size of the image relative to the display surface. The first value is the dimension along the x-axis, and the second value is the dimension along the y-axis based on 72000 units per inch. The receiving device should know about the display region that it is going to use to render the image, the relative size information, and its own capabilities. This attribute gives the receiving device information that may be used in deciding the best way to receive the image data, knowing the image size and the resources that may be required to render it.

vOpacity: Designated by an unsigned integer value in the range of 0–255. A value of 0 is interpreted as completely transparent; 255 is interpreted as completely opaque. If vOpacity is omitted, the default value is 255.

vColorSpace: Used to offer the color spaces available for the image associated with this surface description. Default is vGray (grayscale), base is vSRGB, and optional are vRGB, vCIELAB, vCMY, vYCC, vYUV and vXYZ, where in each case the name of the encoding indicates a relevant (known) colour space: other colour spaces could of course be provided as optional encodings.

vPixelDepth: Used to offer the pixel depth encoding for the colour space selected. The values available are the number of bits per pixel that identify the colour value for that pixel: appropriate default and base encodings are determined for the different colourspaces (eg 1 as default and 8 as base for vGray).

vResolution: Offers one or more "real-world" resolutions that can be used for encoding the associated images' pixel data.

vPixels: Indicates the image width and image height in pixels specified at the resolution indicated by the vResolution attribute value.

vCompression: Represents compression schemes that are available with various color spaces selected. In each case vNone is an option which means no compression. Compression is optional, but it is advantageous for standard compression schemes to be provided as options (eg vRLE, vTIFF, vJPEG). Where a number of implementation options can be chosen for a compression scheme, then any implementation consistent with the e-material format can be adopted. The skilled man will be aware of standard reference sources for any desired compression scheme (such as ISO 10918-1 JPEG Draft International Standard and CCITT Recommendation T.81 for JPEG).

vEndian: This is optional, but may be included if reference to endian is desired (default is big endian).

It is possible that the number of options available for representing a given surface will exceed the available description size. When this occurs the description must be split between the (initial) surface description block and subsequent surface description replies. A description request may be issued by the receiving appliance to initiate an exchange.

The receiving appliance will know that there is more description available if one or more selections from a selection list are not further described in a subsequent decision path. In extracting the information from the description block, it may be found that there is no further information below a certain point in the decision tree that has been followed. Upon finding that no further description exists (and no in-line data is available—in-line data will be discussed further below), if the receiving appliance is prepared to receive more description, a description request is made to the sending appliance. The response to the request would be a continuation of the description block, offering subsequent choices, and data.

A description request is constructed by listing each attribute from the description already received along with the selection from each selection list. The encoding hierarchy is not used. Thus the receiver identifies the selections made by the receiver while processing the surface description. The structure of a description request and the corresponding description reply are tightly coupled because the decision paths which form the encoding hierarchy of the description reply dependent on the attributes included in the description request.

A generic description request block for vImage is shown below in Table 37.

TABLE 37

Generic description request block for vImage

Description Request Block

| Encoding Hierarchy | Attribute | Value | Comments |
|---|---|---|---|
| (Not Used) | (Optional): vLanguage | slLanguage | Include if available. |
| | (Required): vEncoding | vImage | Include if available. |
| | (Required): vColorSpace | slColorSpace | Include if available. |
| | (Required): vPixelDepth | slPixelDepth | Include if available. |
| | (Required): vResolution | slResolution | Include if available. |
| | (Required): Compression | slCompression | Include if available. |
| | (Optional): Endian | slEndian | Include if available. |

A description reply is formed by processing the request, recognizing the selections and therefore the partial decision path, and building a reply based on the hierarchy below the selected level. The decision path which forms the encoding hierarchy is dependent on the attributes included in the description request block. Every level included in the description request is omitted from the description reply, but otherwise the structure of the description reply block is identical to the structure of the original description block. A generic description reply block for vImage is shown in Table 38.

TABLE 38

Generic description reply block for vImage

| Description Reply Block | | | |
|---|---|---|---|
| Encoding Hierarchy | Attribute | Value | Comments |
| null | (Optional): vLanguage | stringSelectionList | As described earlier. |
| [vLanguage] | (Required): vEncoding | keyStringSelectionList | As described earlier. |
| [[vLanguage.]vImage] | (Required): vSize | emIntPairType | As described earlier. |
| [[vLanguage.]vImage] | (Required): vColorSpace | keySelectionList | As described earlier. |
| [[vLanguage.]vImage] | (Optional): vOpacity | emIntType | As described earlier. |
| [[[vLanguage.]vImage.]s1ColorSpace] | (Required): vPixelDepth | intTripleListType | As described earlier. |
| [[[[vLanguage.]vImage.]s1ColorSpace.]s1PixelDepth] | (Required): vResolution | intPairRangeSelectionList | As described earlier. |
| [[[[[vLanguage.]vImage.]s1ColorSpace.]s1PixelDepth.]s1Resolution] | (Required): vCompression | keySelectionList | As described earlier. |
| [[[[[[vLanguage.]vImage.]s1ColorSpace.]s1PixelDepth.]s1Resolution.]s1Compression] | (Optional): vEndian | keySelectionList | As described earlier. |
| [[[[[[[vLanguage.]vImage.]s1ColorSpace.]s1PixelDepth.]s1Resolution.]s1Compression.]s1Endian] | (Optional): vData | emDataType | As described earlier. |

As will be discussed further below, image content data can be included in the surface description. In most cases, content data will not be provided with the description, in which case it must be requested with a separate content request.

The receiving appliance will provide the sending appliance with all of the selections that were made from the surface description to indicate to the sending device what selections were made. In addition, the receiving appliance will also provide the sending appliance with the start location to reference the image data. The sending appliance can then return the image data associated with the request. The content reply consists of the number of items sent to the receiver as well as that number of image data items.

The content request is similar in structure to the description request. A content request is constructed of attributes and values in a manner similar to that of the description request. To this, other information is added which allows the receiving appliance to specify which portions of the full content are needed. The encoding hierarchy portion of the table is not used in a content request.

The first section is used to identify the selections made by the receiver while processing the surface description. The purpose is so that any data returned is consistent with the selections. The second section is used to specify the information requested. The attribute-value pairs in the first of the content requests are defined based on the encoding, the selections made, and the values from the parent description. In some instances there may be no additional attribute-values pairs defined, so the request would be used only to identify the selections made, and to request the data necessary to render, if it is not provided in-line. The attribute-value pairs in the first section are defined as part of the content request for each encoding. An example of a generic content request block is shown in Table 39 below.

TABLE 39

Generic content request block for vImage

| Description Request Block | | | |
|---|---|---|---|
| Encoding Hierarchy | Attribute | Value | Comments |
| (Not Used) | (Optional): vLanguage | s1Language | Include if available. |
| | (Required): vEncoding | s1Image | |
| | (Required): vColorSpace | s1ColorSpace | |
| | (Required): vPixelDepth | s1PixelDepth | |
| | (Required): vResolution | s1Resolution | |
| | (Required): vCompression | s1Compression | |
| | (Optional): vEndian | s1Endian | Include if available. |
| | (Optional): vStartByte | emIntType | Acts an an index to the first byte of the data wanted. The first byte of data in the image data has index 0. Either the vStartByte or vStartLine attribute must be specified |
| | (Optional): vStartLine | emIntType | Used as scan line oriented index. The data returned is in scan lines. The index to the first line is 0. Used only if the compression scheme selected is vNone. Either the vStartByte or vStartLine attributed must be specified. |
| | (Optional): vNumber | emIntType | Indicates the number of bytes (or lines) requested. The sender will send no more than vNumber bytes (or lines), but it might send less. If the vNumber attribute is omitted, then the sender may send any number of bytes (or lines). |

A content reply is used to deliver the renderable data to the receiving appliance. For vImage, a content reply is composed of raw content data. The data is formatted as one or more blocks of data.

The general description for a content reply of this data format consists of two parts. The first part is a variable length header that exists as part of the first block (and only the first block) of content data. The second part is the actual data formatted according to the various applicable attributes. The header information is included in the first block of data for each content request to which the sending device is responding.

The format of the header is as follows: bytes 0 and 1 identify the length of the header; byte 2 identifies the version (initially 0); byte 3 is reserved and initialized to 0; and bytes 4–7 (4 bytes) identify the total number of bytes in the image. This may not be the same as the number of bytes in the block (or the number of bytes that are transferred): if the number of bytes in the image size exceeds the number of bytes in the block, then that indicates that another transfer is required to complete the image. The header information is in Big Endian. The data portion may be in Little Endian as is indicated in the vEndian attribute.

Content data may however be provided "in-line": that is, as part of the description with no need for a separate content request and reply. This may not be appropriate for, say, a large image available in a variety of encodings, but may be very efficient when the quantity of content data is small. Data provided in-line is provided with the attribute vData: the value forming an attribute value pair with vData is simply the data itself. In this implementation, in-line content must fit completely within a description block, so "partial in-line" data cannot be provided.

Some examples of vImage e-material and negotiation are provided below.

EXAMPLE 1

Two inch square image offered only as a monochrome image, no compression or RLE compression, using defaults wherever possible with none of the data in-line.

| | | |
|---|---|---|
| | vEncoding | vImage |
| vImage | vSize | (144000, 144000) |
| vImage | vColorSpace | vGray |
| vImage.vGray | vPixelDepth | 1 |
| vImage.vGray.1 | vResolution | (300,300) (150,150) |
| vImage.vGray.1.(300,300) | vPixels | (600,600) |
| vImage.vGray.1.(300,300) | vCompreseiom | vRLE vNone |
| vImage.vGray.1.(150,150) | vPixels | (300,300) |
| vImage.vGray.1.(150,150) | vCompression | vNone |

EXAMPLE 2

One inch square image offered as i) monochrome, two resolutions, no compression or RLE compression; ii) fourbit grayscale, only one resolution, two compressions; and iii) vSRGB with 8 bits per channel (vSRGB has three channels, so this is 24 bits per pixel) in three resolutions, none compressed. Only four bit grayscale with 100×100 resolution and RLE compressed is available in-line.

|  | vEncoding | vImage |
|---|---|---|
| vImage | vSize | (72000, 72000) |
| vImage | vColorSpace | vGray vSRGB |
| vImage.vGray | vPixelDepth | 1 4 |
| vImage.vGray.1 | vResolution | (200,100) (300,300) |
| vImage.vGray.1.(200,100) | vCompression | vNone vRLE |
| vImage.vGray.1.(300,300) | vCompression | vNone vRLE |
| vImage.vGray.4 | vResolution | (100,100) |
| vImage.vGray.4.(100,100) | vPixels | (100,100) |
| vImage.vGray.4.(100,100) | vCompression | vNone vRLE |
| vImage.vGray.4.(100,100)vRLE | vData | (the data.....) |
| vImage.vSRGB | vPixelDepth | 24 |
| vImage.vSRGB.24 | vResolution | (150,150) (300,300) (600,600) |
| vImage.vSRGB..24.(150,150) | vPixels | (150,150) |
| vImage.vSRGB.24.(150,150) | vCompression | vNone |
| vImage.vSRGB.24.(300,300) | vPixels | (300,300) |
| vImage.vSRGB.24.(300,300) | vCompression | vNone |
| vImage.vSRGB.24.(600,600) | vPixels | (600,600) |
| vImage.vSRGB.24.(600,600) | vCompression | vNone |

EXAMPLE 3

Negotiation for an image offered in the mandatory encoding and 24-bit sRGB. the sRGB is available in a variety of formats, of which only pixel depth 24 bits, resolution (150, 150) and JPEG compressed is available in-line.

→ To receiving device

|  | vEncoding | vImage |
|---|---|---|
| vImage | vSize | (72000, 72000) |
| vImage | vColorspace | vGray vSRGB |
| vImage.vGray | vPixelDepth | 1 |
| vImage.vGray.1 | vResolution | (300,300) |
| vImage.vSRGB | vPixelDepth | 24 |
| vImage.vSRGB.24 | vResolution | (150,150) (150..600, 150..1200) |
| vImage.vSRGB.24.(150,150) | vPixels | (150,150) |
| vImage.vSRGB.24.(150,150) | vCompression | vNone vJPEG |
| vImage.vSRGB.24.(150,150).vJPEG | vData | (the data.....) |

In this case, vSRGB 24-bit with JPEG is selected. The default resolution is not selected, but a resolution within the range offered is selected. Offerings within a range cannot be offered as in-line data (and consequently were not in this case): a Content Request must therefore be made. The amount of data requested is unknown, so the amount of data requested is not specified: the default is to send as much as possible. The content request contains the following e-material.

← To sending device

| vEncoding | vImage |
|---|---|
| vColorSpace | vSRGB |
| vPixelDepth | 24 |
| vResolution | (300,600) |
| vCompression | vJPEG |
| vStartByte | 0 |

The Content Reply is 5500 bytes of data, which in e-material has the following form.

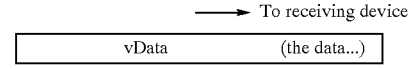

The receiving device does not know whether this is all the data, so sends a further content request as below, asking for data after the first 5500 bytes.

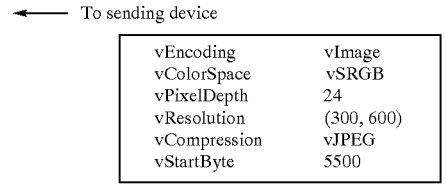

The Content Reply is that there is no more data to send.

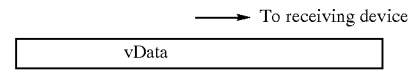

The image can now be rendered.

EXAMPLE 4

This is similar to Example 3, but only a partial description is available in the initial send. An additional Description Request and Description Reply is therefore required to convey the same message as the initial send in Example 3. The opening sequence of messages is as follows.

|  | vEncoding | vImage |
|---|---|---|
| vImage | vSize | (72000, 72000) |
| vImage | vColorSpace | vGray vSRGB |
| vImage.vGray | vPixelDepth | 1 |
| vImage.vGray.1 | vResolution | (300,300) |
| vImage.vSRGB | vPixelDepth | 24 |
| vImage.vSRGB.24 | vResolution | (150,150) (150. .600,150. .1200) |

No information is provided below the resolution level. If the receiving device wishes to continue to receive description for this surface, it now provides a Description Request based on the attributes provided along with selections from the selection list. This includes providing a resolution in the range.

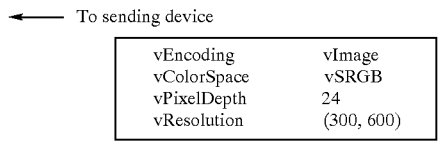

← To sending device

| | |
|---|---|
| vEncoding | vImage |
| vColorSpace | vSRGB |
| vPixelDepth | 24 |
| vResolution | (300, 600) |

The Description Reply is the remainder of the description seen in Example 3 (or rather, the relevant parts of this description). The decision paths which appear in the encoding hierarchy are truncated.

| | | |
|---|---|---|
| | vPixels | (150,150) |
| | vCompression | vNone vJPEG |
| vJPEG | vData | (the data.....) |

The following factors should be considered in use of vImage.

1. The vLanguage attribute is an optional attribute where the default value has not been specified. The receiving device may determine not to select a value from the selectionList. In this case the libraries will select the first value described in the level, not in the emListType.
2. For all image encodings the data format, other than that specified in the hierarchy, is word packed, (4 bytes), with each scan line padded to a 4 byte boundary. Compression mechanisms will perform compression on the packed and padded data. This applies to monochrome, gray, and color data.
3. Image data is usually rendered upon some type of media. Please see the guidelines for the vPlane encoding. This does not mandate that a device must make a vImage encoding a child of a vPlane, but it is highly recommended that it do so.
4. An image may also live outside of the physical boundaries of a device's medium. In such cases the device must render the data based upon the constraints of the device. In some cases the device may be able to reformat, or resize the image data. Another device may be able to select a different size media. Another device may be constrained to clip the data. The device must determine the most appropriate action for the device and the image.

vText

The encoding vText contains attribute-value pairs associated with textual content. Fundamental attributes include the character set and language associated with the text stream. Usually consisting of a character representation (symbol set), and a renderable format (font), text can be visually rendered on a page, screen, or display (plane). Text also has a size which can be described as an area in which it must live. The "size" or area also implies size (height and width) to the text. These fundamental attributes can be used to describe a number of test representations. Other attributes for describing text may be added.

Figure 24:
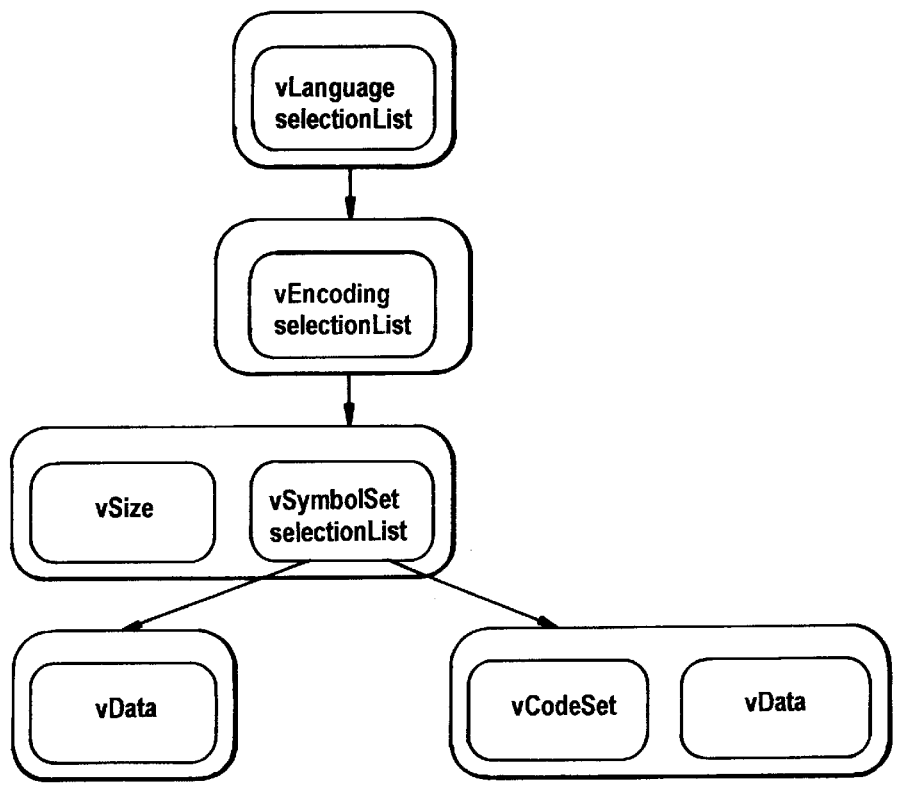
FIG. 24 shows a hierarchy of attributes for the vText encoding.

A hierarchy of attributes for vText is shown in FIG. 24. The significance of each different attribute shown is briefly discussed:

vLanguage: The vLanguage attribute must be included in this implementation.

vEncoding: A vText surface is used to communicate textual information. The attributes of vText are defined in this encoding.

vSize: Designates the size of the text relative to the display surface. The first value is the dimension along the x-axis, and the second value is the dimension along the y-axis, based on 72000 units per inch. The receiving device should know about the display region that it is going to use to render the data, the relative size information, and its own capabilities. This attribute gives the receiving device information that may be used in deciding the best way to render the text data.

vSymbolSet: Used to determine the appropriate mapping between text values and human readable symbols, or glyphs. The vAscii symbol set is a mandatory value. This keyword value means that the symbol set to use in interpreting and displaying an eight-bit text value is the default vAscii symbol set. vUnicode is also highly recommended.

vCodeSet: Required when the vUnicode value is associated with the vSymbolSet attribute. The attribute vCodeSet applies only when vSymbolSet takes on the value of vUnicode. Otherwise it should not be included. emRangeType values define the code sets from the Unicode definition that the device supports.

vData: Provides in-line content.

Description requests and replies, content requests and replies, and provision of in-line data are constructed in the same way as for vImage. In-line data is likely to be a particularly favoured option for vText, when a readable message is sent from one appliance to another. The following factors should be considered in use of vText.

1. When the vText value for the vEncoding attribute is specified, the vLanguage attribute must also be specified with the "en" value becoming mandatory. Within the vText encoding is a vSymbolSet attribute in which the vAscii symbol set also becomes required. This is to ensure communication between devices. Text and Language are forms of communication that are difficult to specify to ensure a communications mechanism under all circumstances. Not all devices (and the people who view the rendered data) speak the same language. Specifying a specific language and symbol set is the only means of achieving this goal.
2. The emRangeType values associated with the vCodeSet attribute are used to define the Unicode code sets that a device supports. The devices should specify these ranges as general sets of blocks rather than specific individual character codes.
3. Text data are usually rendered upon some type of medium. Typically, this will mean that vText encodings are child surfaces of a vPlane encoding. While there is nothing to require that a device must make a vText encoding a child of a vPlane, it is highly recommended that it do so for most cases.

An example of vText is now indicated.

EXAMPLE 5

Simple text, more than one encoding with data in-line, with vLanguage attribute inserted (English, American English and French all available: en, en-us, fr).

| | | |
|---|---|---|
| | vLanguage | en en-us fr |
| en | vEncoding | vText |
| en.vText | vSize | (7200, 108000) |
| en.vText | vSymbolSet | vAscii vUnicode |
| en.vText.vAscii | vData | This☐is☐the☐text. |
| en.vText.vUnicode | vCodeSet | (0000,007F) |
| en.vText.vUnicode | vData | This☐is☐the☐text. |
| en-us | vEncoding | vText |

-continued

| | | |
|---|---|---|
| en-us.vText | vSize | (7200, 108000) |
| en-us.vText | vSymbolSet | vAscii vUnicode |
| en-us.vText.vAscii | vData | This☐is☐the☐text. |
| en-us.vText.vUnicode | vCodeSet | (0000,007F) |
| en-us.vText.vUnicode | vData | This☐is☐the☐text. |
| fr | vEncoding | vText |
| fr.vText | vSize | (7200, 108000) |
| fr.vText | vSymbolSet | vAscii vUnicode |
| fr.vText.vAscii | vData | Ceci☐est☐le☐texte. |
| fr.vText.vUnicode | vCodeSet | (0000,007F) |
| fr.vText.vUnicode | vData | Ceci☐est☐le☐texte. | vFile

This is a provision to transfer information in file formats. vFile provides a mechanism to transfer data as well as any associated icon and naming information. A file is usually associated with a storage medium and is usually thought of in the abstract format of bits and bytes. In essence, the content of the file may or may not be known. The storage medium also applies a naming convention to the file, although it may not provide any significance to the content of the file. Also, in a computerized environment an icon is often associated with the file. Due to the nature of the content of the file, the vFile encoding may be used as a mechanism to transfer those bits from one device to another while maintaining the relationship of the name, icon and possible content information of the file.

Figure 25:
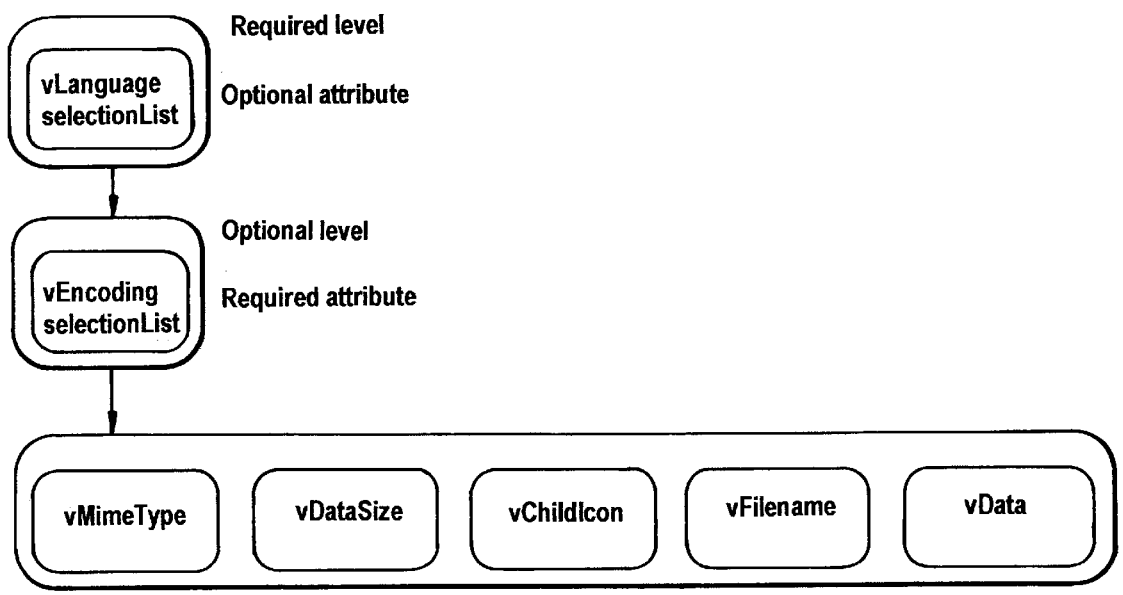
FIG. 25 shows a hierarchy of attributes for the vFile encoding.

A hierarchy of attributes for vFile is shown in FIG. 25. The significance of each different attribute (where not clear from previous discussion) shown is briefly discussed:

vLanguage: Optional.

vEncoding: vFile is defined as a raw collection of bits which represent any capturable information. Attributes of the file are defined in this encoding.

vMimeType: Identifies the characteristics of the vFile type. The label should adhere to normal guidelines for a mime type construct: eg, application/msword, audio/basic, image/tiff.

vDataSize: An unsigned integer indicating the size of the binary data.

vChildIcon: Links the file with an icon. The icon is on a separate surface denoted by a reference to that separate child surface: often the icon child surface will be encoded as vImage.

vFilename: Provides a file name as a null terminated text string encoded in the ASCII symbol set.

Description requests and replies, content requests and replies, and provision of in-line data are as for other encodings. Examples are indicated below.

EXAMPLE 6

The simplest file encoding

| | vEncoding | vFile |
|---|---|---|
| vFile | vDataSize | 12345543 |

The amount of data will generally (as here) be too large to fit in line, so must be requested in a series of content requests.

EXAMPLE 7

If a file represents a document, then a possibility is that it also be provided as a vAssociation document encoding (see discussion further below). This example illustrates this alternative for a six page document.

| | vEncoding | vFile vAssociation |
|---|---|---|
| vFile | vChildIcon | 12 |
| vFile | vDataSize | 12345543 |
| vFile | vFilename | "myfile" |
| vAssociation | child | 6 vArbitrary 1 2 3 4 5 6 | vPlane

The vPlane encoding is designed to represent certain types of information relevant to spatial aspects of physical objects or renderings. In particular, it can represent pages (including double-sided pages), the relationship between two-dimensional regions on a page, including regions categorized as image, text and annotation, and can also represent the media upon which to render.

The value vPlane indicates a top level encoding, and contains children to represent complex information types. It is largely used to describe the relationship between these various children.

A plane could represent a page which consists of a front side and a back side: the page has size and color; and images and text could represent children which would be rendered on the plane. A plane could also represent a computer screen. The screen layout in this case consists of a single side. The screen has size and color. Images and text could represent multiple children that represent windows with text, sticky notes, and icons.

Figure 27:
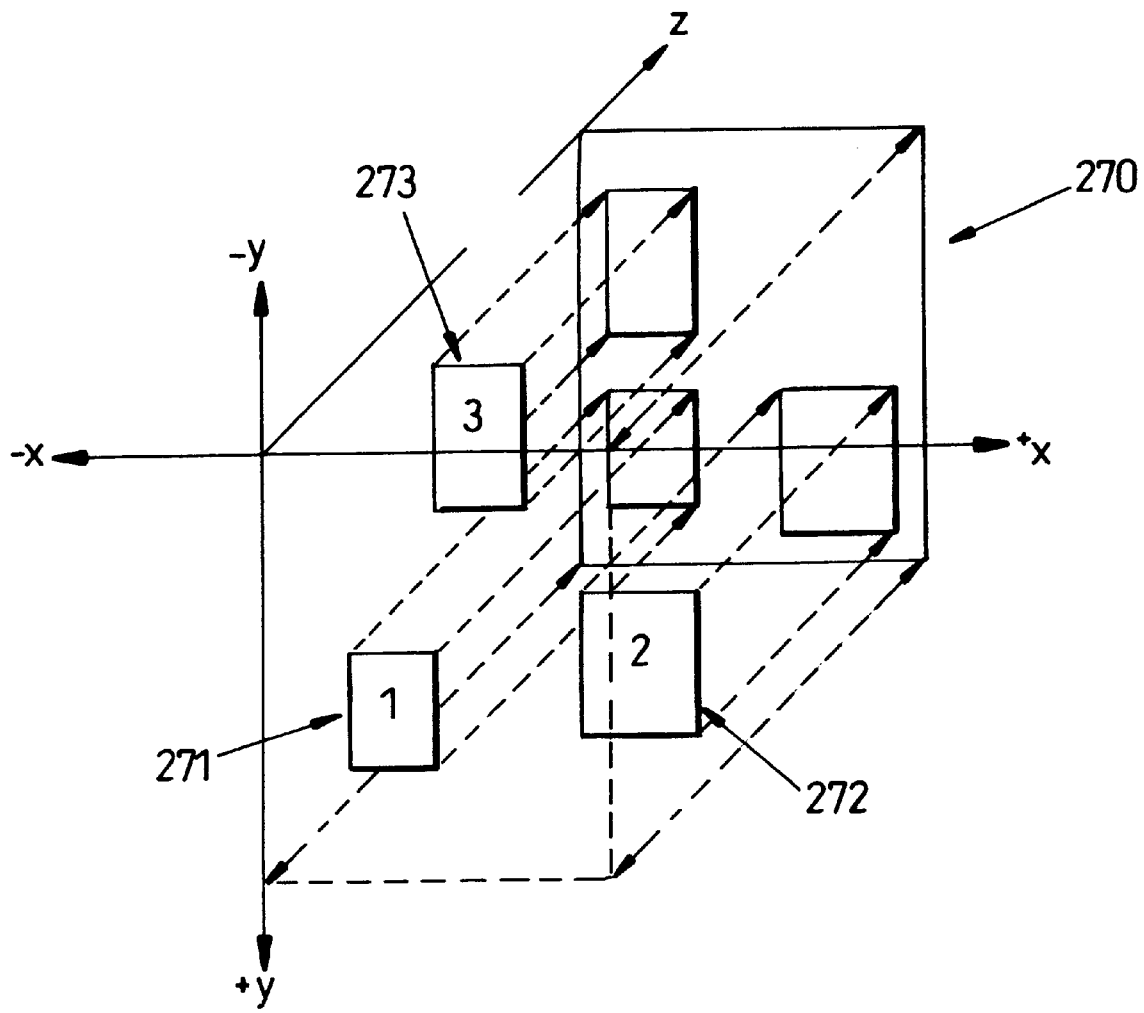
FIG. 27 illustrates schematically the assembly of elements for a vPlane encoding.

A graphical view of a vPlane encoding is provided in FIG. 27. This indicates a plane 270 representing a surface. The surface is defined, and then children representing images are placed on the surface. The order of children along the z axis indicates the order in which the children are placed, or rendered, on the surface.

Figure 26:
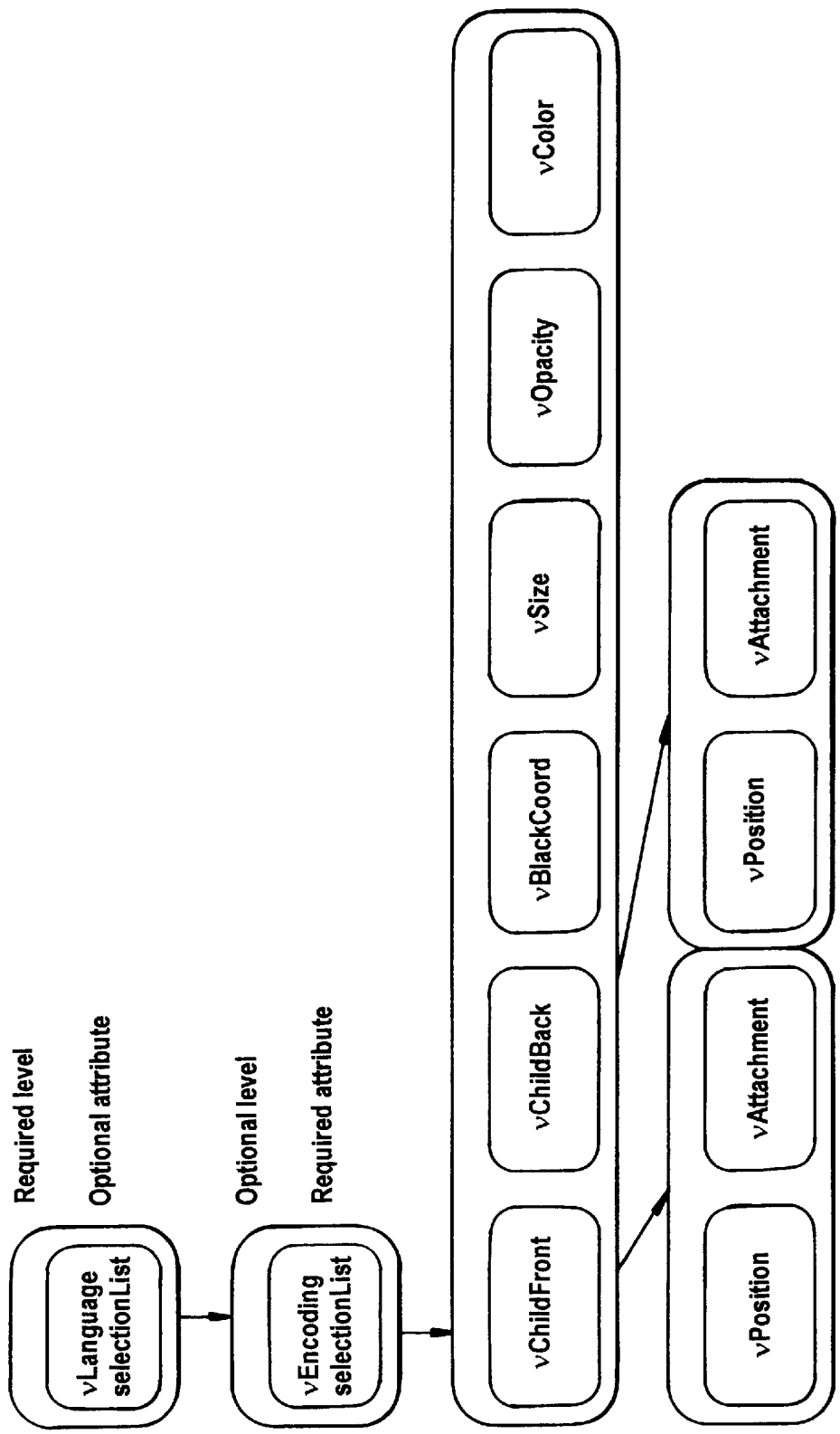
FIG. 26 shows a hierarchy of attributes for the vPlane encoding.

A hierarchy of attributes for vPlane is shown in FIG. 26. The significance of each different attribute (where not clear from previous discussion) shown is briefly discussed:

vEncoding: A vPlane is a page-like surface. It may have two sides, and usually has one or more sub-surfaces as children. The attributes are defined in this encoding.

vChildFront: Provides a reference list which links to any child surface on the front of the plane. A childCount value indicates the number of known child surfaces. It may be negative, zero, or positive. Small positive values of childCount are paired with a matching number of references. Other values are paired with no references. If there are limitations on the order in which the sending appliance can send the surfaces referenced, the vSequential keyword is used, otherwise the keyword is vArbitrary. This allows the receiving appliance to fully control the order of surfaces requested.

vChildBack: As for vChildFront, but the reference list links to any child surface on the back of the plane.

vBackCoord: Specifies the amount of rotation of the back plane coordinate system. The back plane must reflect the dimensions of the front. This attribute is optional if the vChildBack attribute is omitted. It may also be omitted if there are no changes to the back plane coordinate.

If the x and y values for the vSize attribute are equal (a square plane) the vBackCoord values supported are 0, 90, 180, and 270. If the X and Y values for the vSize attribute are not equal (a rectangular plane) the vBackCoord values supported are 0 and 180. Any child placed on the plane should be rendered with respect to this coordinate transform.

Figure 28A:
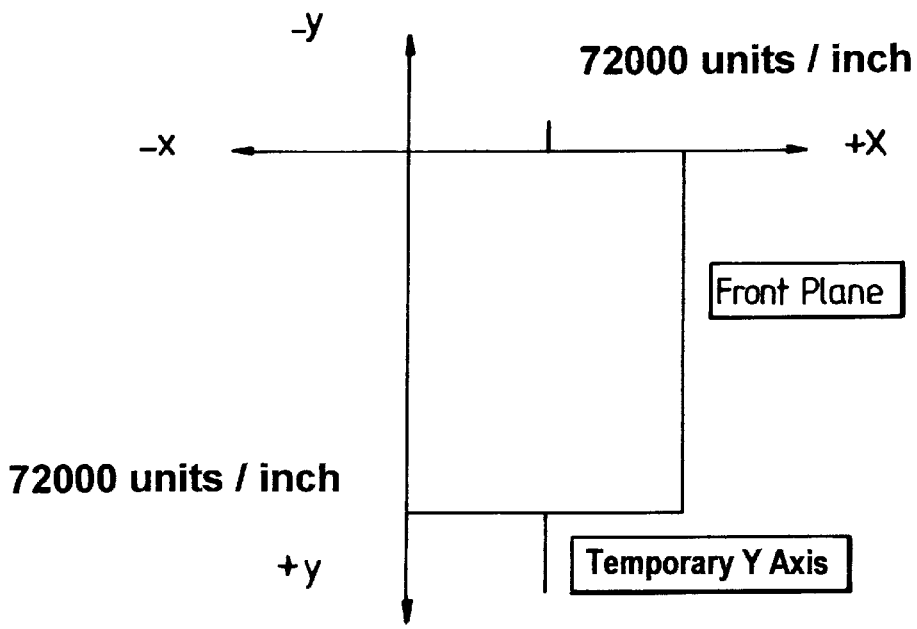
FIGS. 28a to 28d illustrate derivation of values for vBackCoord in the vPlane encoding.
Figure 28B:
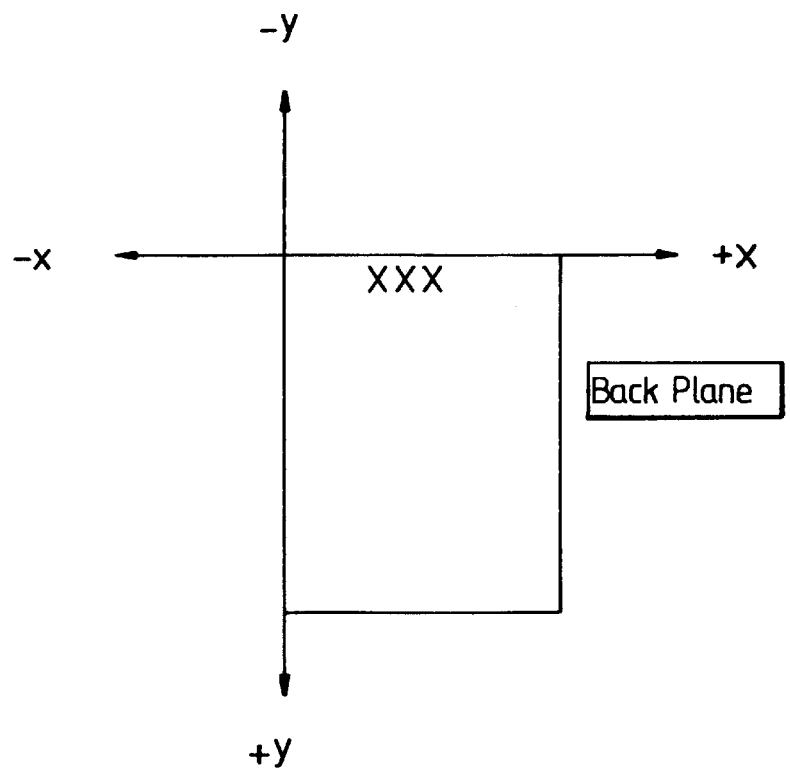
Figure 28C:
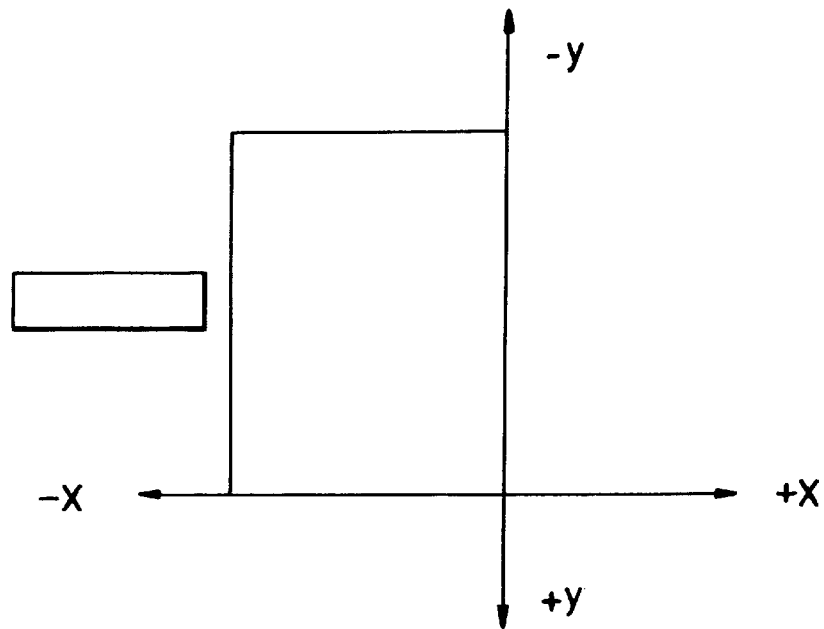
Figure 28D:
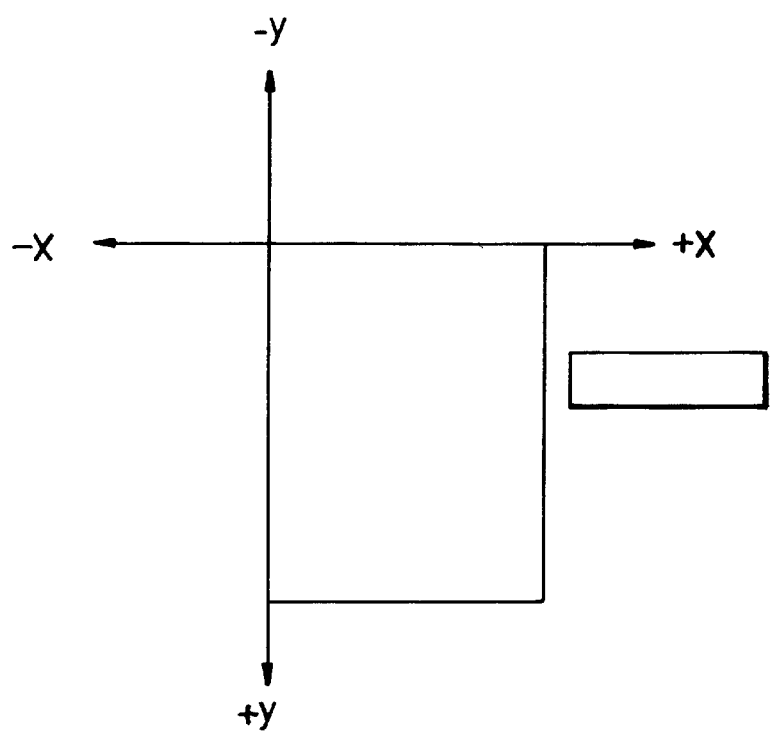

The vBackCoord is applied as follows: the back plane can be view as if it were flipped about the Temporary Y axis (reference FIG. 28a and FIG. 28b). The vBackCoord can then be applied as a rotation, counter clockwise, around the x, y intersection (reference FIG. 28c). The plane is then moved to the default coordinate position (reference FIG. 28d).

vSize: The attribute vSize designates rendering dimensions for the plane being described. FIG. 27 shows the coordinate system assumed. It is also assumes that the integer values used are in real world coordinates of 1/72000 inch (meaning there are 72000 units per inch). The first integer value is along the x-axis, and the second integer value is along the y-axis.

vOpacity: Indicates opacity of the plane to underlying information. Values are 0–255, with default of 255 (opaque).

vColor: Indicates the color of the plane. A list of three unsigned integer values, in the range 0–255. The first value is the Red component, the second the Green component, and the third is the Blue component. A 0 value indicates no intensity. 255 indicates full intensity. When the vOpacity value is 0, vColor values have no meaning.

vPosition: Represents the position of the child with respect to the parent plane. The first value in the pair is the x-coordinate, and the second value is the y-coordinate. This attribute may be included for the children referenced by the vChildFront and vChildBack attributes. This attribute must be listed, uniquely, for each child for which the information is to be provided. This attribute may be provided for any number of the referenced children.

vAttachment: Describes how the child may be manipulated relative to the parent.

The value vFixed indicates the child should remain fixed at the point specified by the vPosition attribute. The value vFloating indicates that the child may be repositioned relative to the parent by appliances capable of such manipulation.

The vAttachment attribute may be included for the children referenced by the vChildFront and vChildBack attributes. This attribute must be listed, uniquely, for each child for which the information is to be provided. This attribute may be provided for any number of the referenced children.

Description requests and replies are substantially as for other encodings. There are differences in connection with content requests and replies. A content request will be used by a receiving device in two situations: to request information about child surfaces when they are not included, and when description information associated with a child reference was not available.

An example when all of the information would not be found in the description block would be when the child name references are not available. Those references can be requested through the Content Request using indirect child references (values of vFirst and vLast) to indicate that child information is being requested. A second instance when a Content Request would be used would be to request content information related to a child but relevant to the plane. A child's content information for the encoding for vPlane consists of vPosition and vAttachment attributes and values that that indicate the relationship between the child and the plane.

The receiving device needs a reference to each child. These child references are typically part of the referenceList associated with the vChildFront or vChildBack attributes or will have already been received through a Description Request as mentioned above. (Typically the description information for a referenced child is "in-line" as few attributes are associated with the child at this level). When the content information is not in-line a Content Request is used to request the information. The receiving device will provide the sending device with all of the selections that were made from the surface description to indicate to the sending device what selections were made. In addition, the receiving device will also provide the sending device with an explicit list of child references, if available, or an indirect reference (the values of vFirst and vLast) to indicate a request for child information is being requested. The sending device can then return the description information associated with the child references.

A content request block will have optional attributes of vChild, vChildNext and vNumber.

vChild can take values such as vFrontFirst, vBackLast and similar or a reference list. If a child has previously been referenced using vFrontFirst, vFrontLast, vBackFirst, or vBackLast, these keyword values cannot be used again. If a single reference is made here, then it specifies a starting point for content information that is to be returned for one or more children: the number requested and the sequence, forward or backward from the reference is specified under the vNumber attribute. If a referenceList is specified, then it is an explicit request for the content of the children specified: the vNumber attribute is not used.

The keywords vFrontFirst and vBackFirst are indirect references to the first child in the structure. This applies when the name references are specified as well as when the name references are unknown. The keywords vFrontLast and vBackLast are used to refer to the last child in the same way. When, the number of children is unknown or access is sequential, the result of setting the child reference indirectly to the last one may not produce the results expected because the last one may not be accessible.

The sending device retains no status of previous requests made, so once vFrontFirst, vFrontLast, vBackFirst, or vBackLast are used, subsequent requests should use an explicit reference returned in the previous content reply or use the vChildNext attribute. The vChild attribute should never be used with the vChildNext attribute.

vChildNext can be used where a previous child has been referenced. vChildNext can be used to request content for the next child in the sequence, identified by the sending device. This attribute may not be used if a previous child has not been referenced. This attribute should be omitted if the vChild attribute is used with a reference name.

The reference value is the child name prior to the child information being requested. vChildNext can be used when the name of the next child is unknown. The number requested and the sequence, forward or backward from the reference is specified under the vNumber attribute.

vNumber is optional, being used only when a single reference is specified under the vChild attribute, or when the vChild attribute is set to vFrontFirst, vFrontLast, vBackFirst, vBackLast or when the vChildNext attribute is used. vNumber is associated with a value indicating the number of references for which the receiving device is requesting content. When vNumber is used with a reference associated with the vChild attribute the items returned will include the referenced child. When vNumber is used with a reference associated with the vChildNext attribute, the number of items returned will not include the referenced child but will include children following the reference child.

If possible, the sender will send the content information for the children requested, in the order requested. If this attribute is missing, or if the value is zero, then the sender will send the content of as many children as possible from the reference made.

The appropriate content reply is relatively straightforward. Attribute vNumber returns the number of children in the content reply. vNames returns child references in the order requested. vRemaining indicates a number of children for which no content request has yet been made. Values of vPosition and vAttachment should be provided for each of the references returned.

The following factors require consideration in use of vPlane.

1. The vPlane encoding, in many cases, could be viewed as the medium upon which images and text are rendered. Pages, computer displays, status displays, white boards, projection media, etc. are examples of such media. A renderable data encoding, such as image or text, should be applied to a medium as vPlane. An explicit description, (but not the rule) would be that vImage and vText should be children of vPlane.

2. Each reference associated with the vChildFront, vChildBack, vChild, vChildNext, or vNames attributes must be unique. A mechanism has been provided in which a single surface may be referenced multiple times. If the receiving device wishes to implement this mechanism the receiving device would have the option of requesting the surface multiple times, or maintaining the reference data internally. A "#reference" (pound sign)(reference) may be included when the surface information is used multiple times but the child content (vPosition, vAttachment) information is different. The "#reference" acts as an index to uniquely identify the child and child content 3. When the referenceList does not contain the names of the child surfaces, they must be obtained through inquiry.

4. When the value vSequential appears, the children may be requested only in a predetermined order because of limitations of the sending device. This implies a processing sequence of:

Request content information (which describes the attachment) of next child (using a content request and reply pair on the parent surface)

Request the surface description/impression of that child (using a description request and reply pair on that child surface)

Request the content of that child (using a content request and reply pair on that child surface)

Render that child

Request content (attachment) information of next child and so forth until no more children exist 5. There are a number of ways to request content data for children, one or more at a time, whether the child list is known or unknown. The following methods are applicable to access the child surfaces in a child list:

Use vChild with one or more reference names to access the various child surfaces.

Use vFrontFirst or vBackFirst to access the first child surface in the list.

Use vFrontLast or vBackLast to access the last child surface in the list if appropriate.

Use vChildNext with vNumber equal to one or more to access the next one or more child surfaces in the list. This cannot be the first access to a child surface in this child list.

Use vChildNext with vNumber zero or undefined to access the remaining child surfaces in the list. This also cannot be the first access to a child surface in this child list.

6. Random access to surfaces in the child list is achieved by the following sequence:

Using the surface name as the value to the vChildFront or vChildBack attribute in a content request. The surface name is returned in the content reply. In the case of vPlane, attachment information is also returned.

Using the child surface name to construct a description request. The surface description is returned in a description reply. A new job is initiated by issuing a SurfaceRequestMsg as described in the Interaction Policies section.

Using a content request to get the surface content of the child surface. The information is returned in a content reply.

Render the content information.

This process continues as required.

7. Serial access to surfaces in the child list is achieved by:

Using vFrontFirst or vBackFirst as the value to the vChildFront or vChildBack attribute in a content request on the parent surface. (The value vFrontLast or vBackLast may be used as the value to these attributes if childCount is positive and vArbitrary key is given.) The surface name of the specified child surface in the child list is returned in the content reply along with the number of remaining child surfaces in the child list. In the case of the vPlane encoding, attachment information is also returned.

Using the child surface name to construct a description request. The surface description is returned in a description reply. A new job is initiated by issuing a SurfaceRequestMsg as described in the Interaction Policies section.

Using a content request to get the surface content of the child surface. The information is returned in a content reply.

Render the child surface content information. In the case of vPlane encoding, use the attachment information.

Using the child surface name as the value to the vChildNext attribute in a content request on the parent surface. The surface name of the next child surface in the child list is returned in the content reply along with the number of remaining child surfaces in the child list. In the case of the vPlane encoding, attachment information is also returned.

This process continues no child surfaces remain.

8. The values of childCount and vArbitrary or vSequential key indicate the methods of access to the various surfaces in the child list:

A small positive childCount value and vArbitrary key indicates that the child surfaces may be accessed in any manner: serially forward, serially backward, or randomly. Random access is made possible using the surface names in the reference list. Additionally in-line content for some child surface may be included.

A small positive childCount value and vSequential key indicates that the child surfaces may only be accessed serially forward. The surface names are included, but do not permit random access.

A large positive childCount value and vArbitrary key indicates that the child surfaces may be accessed in either serially forward or serially backward.

A large positive childCount value and vSequential key indicates that the child surfaces may only be accessed serially forward.

A negative childCount value (regardless of the setting of the vArbitrary or vSequential key) indicates that the child surfaces may only be "discovered" serially forward.

A childCount value of zero means that no child surfaces exist in the child list. In the case of vPlane, if both child lists are empty, the vPlane surface is only a rudimentary surface with a few attributes such as vColor and vSize. In the case of vAssociation, if the child list is empty, the surface is useless.

9. Access to the child surfaces in the list may be direct through the reference name or indirect through other mechanisms. Each child surface in the child list has a reference name and an order position in the list. An order is present for all child surface lists, whether the sending appliance is constrained to offer the surfaces in that order (vSequential) or is capable of offering the surfaces in any order (vArbitrary). Each child surfaces in a vPlane surface also has a position on the surface (vPosition) and a method of attachment (vAttachment). Direct access of description or content information from child surfaces is always through the reference name. Indirect access of description or content information from child surfaces is though moving forward or backward serially through the list of children.

Examples of use of the vPlane encoding are indicated below.

EXAMPLE 8

One page plane, 8.5 inches by 11 inches, two children (probably images, but not included). Child content information is provided in-line.

|         | vEncoding    | vPlane          |
|---------|--------------|-----------------|
| vPlane  | vChildFront  | 2 vArbitrary 4 5 |
| vPlane  | vSize        | (612000,792000) |
| vPlane.4 | vPosition   | (72000,360000)  |
| vPlane.4 | vAttachment | vFixed          |
| vPlane.5 | vPosition   | (612000,612000) |
| vPlane.5 | vAttachment | vFixed          |

EXAMPLE 9

One page, two sides, the "front" side with two children and the "back" side with one child. Child content information is not provided in-line.

|         | vEncoding    | vPlane          |
|---------|--------------|-----------------|
| vPlane  | vChildFront  | 2 vArbitrary 6 7 |
| vPlane  | vChildBack   | 1 vArbitrary 8  |
| vplane  | vBackCoord   | 0               |
| vPlane  | vSize        | (8500,11000)    |

EXAMPLE 10

Figure 29:
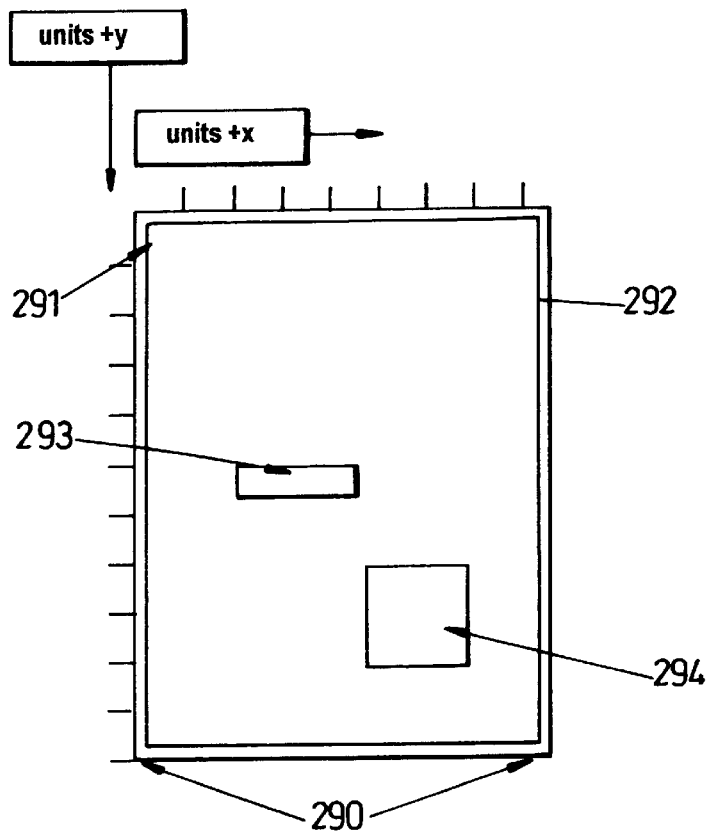
FIG. 29 illustrates an example of a document for encoding with vPlane incorporating four child elements.

Plane 290 having one scanned page 291, 8.5 inches by 11 inches, with one annotation 292, a yellow highlight 293 and a red "sticky" type note 294 with text. As the latter three would clearly have to have been added to the scanned image subsequently, the image is not generated dynamically and the number of children is known. FIG. 29 illustrates this example pictorially.

The plane encoding without children is

|           | vEncoding    | vPlane              |
|-----------|--------------|---------------------|
| vPlane    | vChildFront  | 4 vSequential 1 2 3 4 |
| vPlane    | vSize        | (612000,792000)     |
| vPlane.1  | vPosition    | (90000,90000)       |
| vPlane.1  | vAttachment  | vFixed              |
| vPlane.2  | vPosition    | (288000,72000)      |
| vPlane.2  | vAttachment  | vFixed              |
| vPlane.3  | vPosition    | (900000,360000)     |
| vPlane.3  | vAttachment  | vFixed              |
| vPlane.4  | vPosition    | (360000,540000)     |
| vPlane.4  | vAttachment  | vFloating           |

The first child represents one image (the background image).

|        | vEncoding | vPlane          |
|--------|-----------|-----------------|
| vImage | vSize     | (612000,792000) |
| vImage | . . .     | •               |
|        |           | •               |
|        |           | •               |

The second child represents a text annotation.

|       | vEncoding    | vText  |
|-------|--------------|--------|
| vText | vSymbolSet   | vAsCii |
| vText | . . .        | •      |
|       |              | •      |
|       |              | •      |

The third child represents the yellow highlighted area: this is available in two colour models.

|        | vEncoding | vPlane        |
|--------|-----------|---------------|
| vPlane | vSize     | (144000, 14400) |
| vPlane | vColor    | 255 255 0     |
| vPlane | vOpacity  | 110           |

The fourth child represents a separate, red sticky type note

|          | vEncoding    | vPlane          |
|----------|--------------|-----------------|
| vPlane   | vChildFront  | 1 vArbitrary 5  |
| vPlane   | vSize        | (144000, 144000) |
| vPlane   | vColor       | 255 0 0         |
| vPlane.5 | vPosition    | (0,7200)        |
| vPlane.5 | vAttachment  | vFloating       | vAssociation vAssociation is primarily designed to represent and describe documents and any correlation between similar and dissimilar encoding types. vAssociation is another top level encoding and is designed for containing children to represent complex information types. It is primarily used to describe relationships between children which are also top level encodings. Association could be used to describe a relationship between multiple pages (a document). It could also be used to represent a folder applying a relationship between documents.

Figure 30:
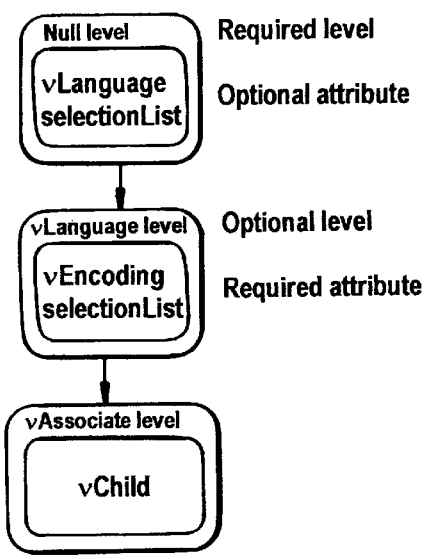
FIG. 30 shows a hierarchy of attributes for the vAssociation encoding.

A hierarchy of attributes for vAssociation is shown in FIG. 30. The significance of each different attribute is apparent from discussion of other top level encodings. vAssociation simply provides an associate relationship between child surfaces: it has no attributes of its own.

Description requests and replies are technically possible, but are unlikely to be required in practice. For content requests and replies, essentially the same considerations as raised for vPlane apply in respect of child surfaces.

Many of the general considerations relating to vPlane also apply. The main additional consideration which requires attention is in nesting of associations. The association can represent many different things, and those associations will grow as the number of encodings grows. Some devices may understand several levels of vAssociation as a child of a vAssociation encoding. The example where an association could represent a folder which applies a relationship between documents, which documents apply a relationship to the pages of the documents, may be understood by some devices and not understood by others. An attempt should be made by the devices to limit this type of nesting, but also to understand it when it is used. Devices that are not able to apply the nesting of non renderable levels may choose to discard them and render the final renderable portion. Devices may also choose to interpret the encoding as one they are unable to decipher. Nested levels with non renderable data requires memory, and the devices must determine the depth to which they are willing to work. It is desirable to require a certain level of nesting to be supported: in the present preferred implementation, it is required that up to 4 levels of plane or association nesting be supported.

EXAMPLE 11

An association representing a three page document. The children can be impressed in any order the receiver chooses, however the logical ordering of the children as 1,2,3 should be fixed.

| | vEncoding | vAssociation |
|---|---|---|
| vAssociation | child | 3 vArbitrary 1 2 3 |

A brief description of how an e-material block is encoded as bytes is provided below.

Each block consists of an ordered sequence of attributes. An attribute consists of a name and its data. Attribute names and attribute level names are simple values: however, attribute data can assume complex values (such as a list of simple values). Simple values can be keywords (short one byte keywords, or long two byte keywords which include a value type identifier), strings, integers, pairs (collections of two values) and integer ranges.

The byte format for encoding attributes is similar to the tabular form. The main difference is in the encoding of levels. These are stored more efficiently, as there is no requirement for the attribute level to be repeated for each attribute. Instead, levels are encoded like attributes, with a data type level (a complex value) that consists of an ordered sequence of other attributes and levels. An e-material block also comprises a header with general information about the block and one attribute, the null level. The null level contains attributes and sub-levels for the block.

Figure 31:
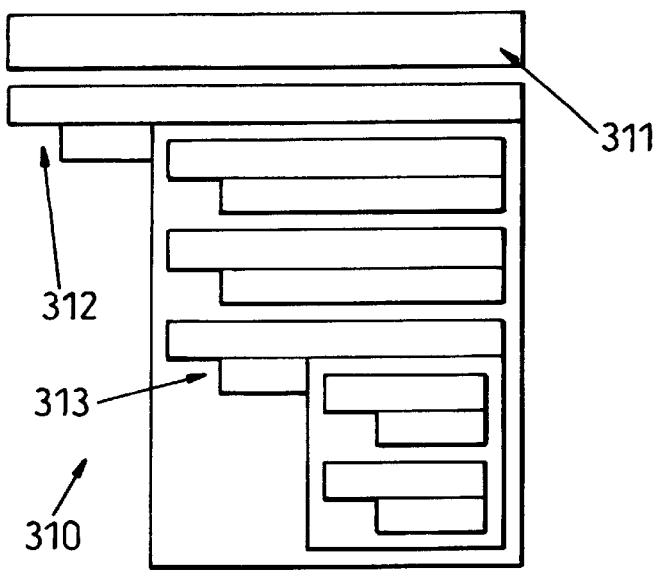
FIG. 31 shows a schematic diagram for a generic e-material block.

A schematic diagram of an e-material block 310 is provided in FIG. 31. The various elements are labelled and described below.

The header 311 contains information about the block as a whole. It has version information and size information. Potentially, more fields can be added. The total size field in the header can be greater than the size of the null level it contains. This is appropriate for use when e-material blocks are built up locally: the program allocates a block of memory, writes the header and the null level to it and sets the total size to the total size available in the memory block. This value can then be used to keep track of available space when the block is being built. However, when a block is sent over the network it is recommended that the total size is adjusted so that the block does not contain any slack.

The first entry 312 in the e-material block has to be the null level. The null level is the top level that contains all attributes and sublevels of the e-material block. Nothing can exist outside the null level. This level is in fact encoded as its constituent levels, except its name has to be set to the constant vNULL (0×40). The header for the level contains a size of the level and the name. The value type (LEVEL) follows to indicate that the data is a level, i.e. a collection of other attributes and levels. Then the attributes that are part of the null level follow in sequence.

Attributes consist of a size, the name of the attribute and some data. Both name and value are encoded the same way: as a value type followed by some data. The size is the number of bytes occupied by name and data together. A sub-level 313 is simply an attribute with its data type set to LEVEL. A sub-level consists of the level data, its name, a level type indicator and a sequence of attributes within the level.

Figure 32:
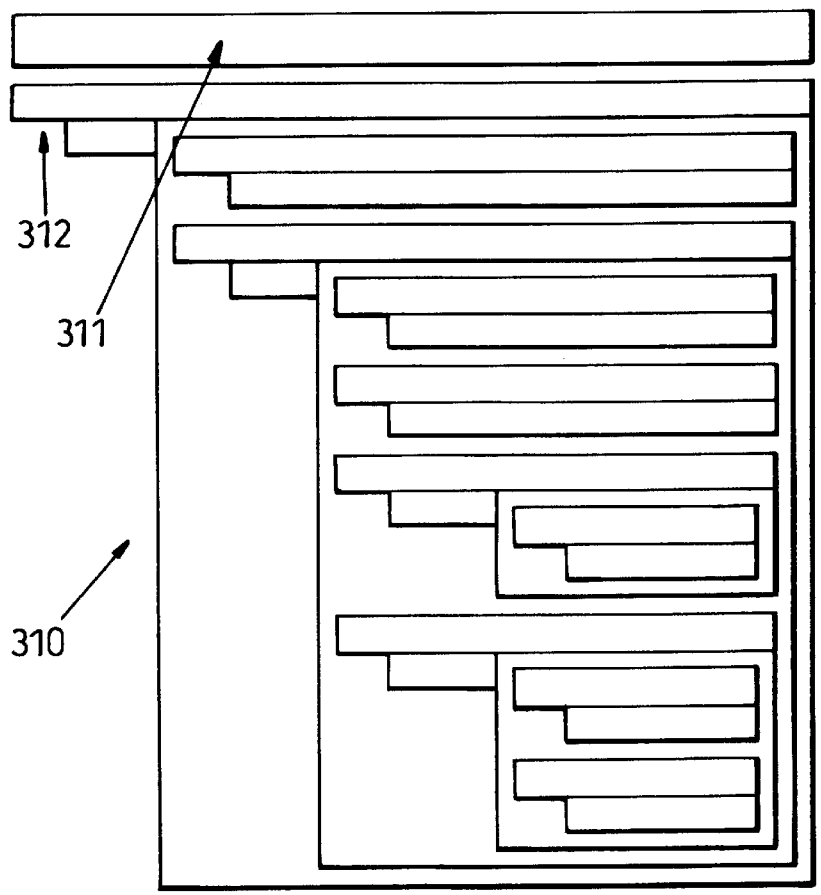
FIG. 32 shows a pictorial representation of a specific e-material block.

For example, the e-material block shown below can be represented pictorially as in FIG. 32.

| Level | Attribute Name | Attribute Value |
|---|---|---|
| | vEncoding | [vText] |
| vText | vSize | (1000,5000) |
| vText | vSymbolSet | [vAscii, vUnicode] |
| vText.vAscii | vData | "halloejsa" |
| vText.vUnicode | vCodeSet | [0000. .00FF] |
| vText.vUnicode | vData | "halløjsa" |

This could result in the following annotated hex dump.

Byte values

| | | | Element /Name | Vaue |
|---|---|---|---|---|
| 00 4D 00 00 5D | | | | |
| 00 56 | - 40 - | 01 | Header | total size 005D = 93 bytes |
| 00 05 | - 82 - | 05 00 01 D3 | null level | size 0056 = 86 bytes |
| 00 4B | - D3 - | 01 | vEncoding attribute | [vText] |
| 00 08 | - 86 - | 06 09 03 E8 09 13 88 | vText level | size 004B = 79 bytes |
| 00 06 | - D2 - | 05 00 02 D0 D4 | vSize attribute | (1000,5000) |
| 00 10 | - D0 - | 01 | vSymbolSet attribute | [vAscii, vUnicode] |
| 00 0C | - 81 - | 04 68 61 6C 6C 6F | vText.vAscii level | size = 16 bytes |
| | | 65 6A 73 61 00 | vString attribute | "halloejsa" |
| 00 23 | - D4 - | 01 | | |
| 00 09 | - D5 - | 05 00 01 0F 00 00 00 FF | vText.vUnicode | size = 35 bytes |
| 00 14 | - 81 - | 03 00 68 00 61 00 6C | vCodeSet attribute | [00..FF] |
| | | 00 6C 00 00 6F 00 6A | vData attribute | Unicode ("halløjsa") |
| | | 00 73 00 61 00 00 | | |

It can be seen that use of e-material allows extreme flexibility in encoding. However, it should be noted that standard encodings should be used as widely as possible to allow truly general communication.

Devices are free to decompose an e-material encoding in whatever manner is appropriate.

An attribute that is specified as optional, may include a value that is a selectionList from which the decision path is built. One of the values in the selectionList may be specified as the default value. The order in which the sending device builds the levels will determine the default. The default value must be the first value described in the selection list. These levels must be built correctly if the receiving device is to properly select the default.

The order of the values in an attribute-value pair can be used to identify preference or priority of the sending device. It is at the discretion of the receiving device to determine which value to select, regardless of the sending devices preference. A sensible approach is that the first element in a selection list should be the preferred selection of the sender.

There is an explicit order for child surfaces. In a vAssociation, one should expect to complete child surfaces one at time. The order is generally tied very strongly to the order of the physical media. In the vPlane, the vPosition attribute plays a more significant role in indicating a physical ordering. In both cases the ordering often constrains access to child surfaces.

An entire hierarchical level must be contained within a single description or reply, and may not stretch across replies.

What is claimed is:

1. A method of passing information between two or more information handling devices, there being a means for communication of information between said information handling devices, wherein each passage of information consists of one or more interactions from an interaction set, none of the interactions of the interaction set being dependent on the function to be carried out on the information by any of the information handling devices and each passage of information relates to sharing of a surface between a first device and one or more second devices, wherein the surface is a representation of an internal state of the first device, and wherein job receiving devices capable of processing information according to a device function possess a job receiving surface designated for receiving information for processing from a job sending device wherein processing of information by the job receiving device comprises the following steps:

sharing of the job receiving surface of the job receiving device with the job sending device;

sharing of a first surface containing job information of the job sending device with the job receiving device;

request by the job receiving device and provision by the job sending device of one or more of further surfaces containing job information, of hierarchies of choices for provision of data associated with the surface or surfaces containing job information, and of data containing job information; and processing of the job information by the job receiving device.

2. A method as claimed in claim 1, further comprising after the step of sharing of the job receiving surface and before the step of sharing of the first surface containing job information, the step of the job receiving device requesting a surface containing job information from the job sending device.

3. A protocol for communication between information handling devices, said protocol comprising interactions from an interaction set, none of the interactions of the interaction set being dependent on a function to be carried out on the information by any of the information handling devices, wherein each interaction relates to sharing of a surface between a first device and one or more second devices, wherein the surface is a representation of an internal state of the first device, and wherein job receiving devices capable of processing information according to a device function possess a job receiving surface designated for receiving information for processing from a job sending device, wherein processing of information by the job receiving device comprises the following steps:

sharing of the job receiving surface of the job receiving device with the job sending device;

sharing of a first surface containing job information of the job sending device with the job receiving device;

request by the job receiving device and provision by the job sending device of one or more of further surfaces containing job information, of hierarchies of choices for provision of data associated with the surface or surfaces containing job information, and of data containing job information; and processing of the job information by the job receiving device.

4. A protocol as claimed in claim 3, further comprising after the step of sharing of the job receiving surface and before the step of sharing of the first surface containing job information, the step of the job receiving device requesting a surface containing job information from the job sending device.

* * * * *